US008429017B2

(12) United States Patent
Ishibashi et al.

(10) Patent No.: US 8,429,017 B2
(45) Date of Patent: Apr. 23, 2013

(54) SALES APPARATUS, SALES METHOD AND PROGRAM

(75) Inventors: Yoshihito Ishibashi, Tokyo (JP); Susumu Kusakabe, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 1109 days.

(21) Appl. No.: 11/435,208

(22) Filed: May 17, 2006

(65) Prior Publication Data

US 2006/0277114 A1    Dec. 7, 2006

(30) Foreign Application Priority Data

May 17, 2005  (JP) .................................. 2005-144204
Dec. 16, 2005  (JP) .................................. 2005-363357

(51) Int. Cl.
*G06Q 30/00* (2012.01)
*G06K 5/00* (2006.01)

(52) U.S. Cl.
USPC .......................................... 705/26; 235/380

(58) Field of Classification Search ............... 705/26–28
See application file for complete search history.

(56) References Cited

U.S. PATENT DOCUMENTS

| | | | |
|---|---|---|---|
| 5,023,597 | A | 6/1991 | Salisbury |
| 5,164,707 | A | 11/1992 | Rasmussen et al. |
| 5,739,746 | A | 4/1998 | Shaffer et al. |
| 5,914,701 | A | 6/1999 | Gersheneld et al. |
| 5,987,438 | A | 11/1999 | Nakano et al. |
| 6,058,477 | A | 5/2000 | Kusakabe et al. |
| 6,195,008 | B1 | 2/2001 | Bader |
| 6,223,018 | B1 | 4/2001 | Fukumoto et al. |
| 6,446,862 | B1 * | 9/2002 | Mann ............................. 235/380 |
| 6,611,195 | B1 | 8/2003 | Manneschi et al. |
| 6,897,788 | B2 | 5/2005 | Khair et al. |
| 7,152,799 | B2 | 12/2006 | Nakabe |

(Continued)

FOREIGN PATENT DOCUMENTS

| | | |
|---|---|---|
| JP | 7-20249 | 1/1995 |
| JP | 10-229357 | 8/1998 |

(Continued)

OTHER PUBLICATIONS

"Method for Vending Commodities", JP 2002-020571, Ikezaki Junji, Jan. 29, 2002.*

(Continued)

*Primary Examiner* — Garcia Ade
(74) *Attorney, Agent, or Firm* — Finnegan, Henderson, Farabow, Garrett & Dunner LLP

(57) ABSTRACT

A sales apparatus for selling content to a purchaser wearing a communication terminal is provided. The apparatus includes a content selection section allowing selection of content for sale; a communication section built in the content selection section for communicating with the communication terminal; a detection section detecting a selection operation of the purchaser pressing the content selection section; an identifying section identifying content selected by the purchaser based on a detection result; a settlement section executing a settlement process for the content identified by the identifying section, with the communication terminal via the communication section and the human body of the purchaser who is depressing the content selection section; and a supply section adapted to supply the communication terminal with data of the content identified by the identifying section, via the communication section and the human body of the purchaser who is depressing the content selection section.

11 Claims, 46 Drawing Sheets

U.S. PATENT DOCUMENTS

| | | |
|---|---|---|
| 7,184,581 B2 | 2/2007 | Johansen et al. |
| 7,260,436 B2 | 8/2007 | Kilgore et al. |
| 2001/0035459 A1* | 11/2001 | Komai .................... 235/462.25 |
| 2002/0065711 A1* | 5/2002 | Fujisawa et al. ................ 705/13 |
| 2002/0146032 A1 | 10/2002 | Attimont et al. |
| 2003/0137989 A1 | 7/2003 | Nagai |
| 2004/0056811 A1 | 3/2004 | Pakray et al. |
| 2004/0111341 A1* | 6/2004 | Aikoh et al. .................... 705/35 |
| 2006/0045118 A1 | 3/2006 | Hyoung et al. |
| 2006/0077616 A1 | 4/2006 | Takiguchi |
| 2006/0136015 A1* | 6/2006 | Park et al. ....................... 607/60 |
| 2007/0021077 A1* | 1/2007 | Amtmann et al. ............ 455/119 |
| 2007/0221725 A1 | 9/2007 | Kawaguchi |
| 2007/0222599 A1 | 9/2007 | Coveley et al. |

FOREIGN PATENT DOCUMENTS

| | | |
|---|---|---|
| JP | 10-232283 | 9/1998 |
| JP | 11-509380 | 8/1999 |
| JP | 2000-285312 | 10/2000 |
| JP | A 2000-285312 | 10/2000 |
| JP | 2001-134890 | 5/2001 |
| JP | 2001-144662 | 5/2001 |
| JP | 2001-195368 | 7/2001 |
| JP | A 2001-195368 | 7/2001 |
| JP | 2002-9710 | 1/2002 |
| JP | 2003-063392 | 3/2003 |
| JP | 2003-132031 | 5/2003 |
| JP | 2003-163644 | 6/2003 |
| JP | 2003-223127 | 8/2003 |
| JP | A 2003-223127 | 8/2003 |
| JP | 2003-317042 | 11/2003 |
| JP | 2004-145873 | 5/2004 |
| JP | A 2004-145873 | 5/2004 |
| JP | 2004-214737 | 7/2004 |
| JP | 2004-282733 | 10/2004 |

OTHER PUBLICATIONS

U.S. Appl. No. 09/705,035.
U.S. Appl. No. 09/704,849.
Kiyoaki Takiguchi, "Communication System", Patent Abstracts of Japan, pp. 1 and 2, Oct. 7, 2004, of Japanese Publication No. 2004-282733, Japan.
Shigeru Tajima, "Signal Transmission System, Signal Transmitter, and Signal Receiver", Patent Abstracts of Japan, pp. 1 and 2, Jun. 6, 2003, of Japanese Publication No. 2003-163644, Japan.
Kaneyuki Doi et al., "Data Transmission System Utilizing Human Body as Signal Transmission Path", Patent Abstracts of Japan, pp. 1 and 2, Jan. 11, 2002, of Japanese Publication No. 2002-009710, Japan.
Haruo Oba et al., "Mobile Audio Listening Device", Patent Abstracts of Japan, pp. 1 and 2, May 25, 2001, of Japanese Publication No. 2001-144662, Japan.
Shigeru Tajima, "Voice Guiding Device", Patent Abstracts of Japan, pp. 1 and 2, May 18, 2001, of Japanese Publication No. 2001-134890, Japan.
Japanese Patent Office, Office Action, Dec. 6, 2011, 3 pages.

* cited by examiner

FIG. 3

| FREQUENCY f [Hz] | RECEPTION LOAD Rr [Ω] | CAPACITANCE [F] | EXECUTION VOLTAGE [V] |
|---|---|---|---|
| 1.0E+06 | 1.0E+04 | 1.0E-13 | 0.013 |
| 1.0E+06 | 1.0E+04 | 1.0E-12 | 0.125 |
| 1.0E+06 | 1.0E+04 | 1.0E-11 | 1.064 |
| 1.0E+06 | 1.0E+05 | 1.0E-13 | 0.125 |
| 1.0E+06 | 1.0E+05 | 1.0E-12 | 1.064 |
| 1.0E+06 | 1.0E+05 | 1.0E-11 | 1.975 |
| 1.0E+06 | 1.0E+06 | 1.0E-13 | 1.064 |
| 1.0E+06 | 1.0E+06 | 1.0E-12 | 1.975 |
| 1.0E+06 | 1.0E+06 | 1.0E-11 | 2.000 |
| 1.0E+07 | 1.0E+04 | 1.0E-13 | 0.125 |
| 1.0E+07 | 1.0E+04 | 1.0E-12 | 1.064 |
| 1.0E+07 | 1.0E+04 | 1.0E-11 | 1.975 |
| 1.0E+07 | 1.0E+05 | 1.0E-13 | 1.064 |
| 1.0E+07 | 1.0E+05 | 1.0E-12 | 1.975 |
| 1.0E+07 | 1.0E+05 | 1.0E-11 | 2.000 |
| 1.0E+07 | 1.0E+06 | 1.0E-13 | 1.975 |
| 1.0E+07 | 1.0E+06 | 1.0E-12 | 2.000 |
| 1.0E+07 | 1.0E+06 | 1.0E-11 | 2.000 |
| 1.0E+08 | 1.0E+04 | 1.0E-13 | 1.064 |
| 1.0E+08 | 1.0E+04 | 1.0E-12 | 1.975 |
| 1.0E+08 | 1.0E+04 | 1.0E-11 | 2.000 |
| 1.0E+08 | 1.0E+05 | 1.0E-13 | 1.975 |
| 1.0E+08 | 1.0E+05 | 1.0E-12 | 2.000 |
| 1.0E+08 | 1.0E+05 | 1.0E-11 | 2.000 |
| 1.0E+08 | 1.0E+06 | 1.0E-13 | 2.000 |
| 1.0E+08 | 1.0E+06 | 1.0E-12 | 2.000 |
| 1.0E+08 | 1.0E+06 | 1.0E-11 | 2.000 |

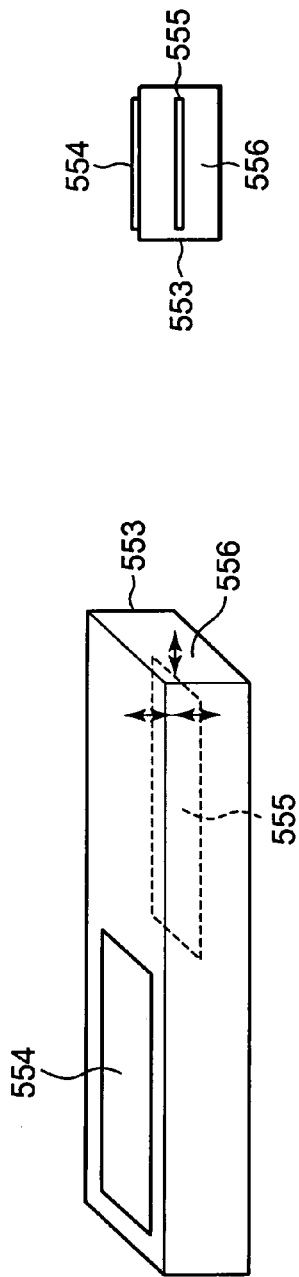

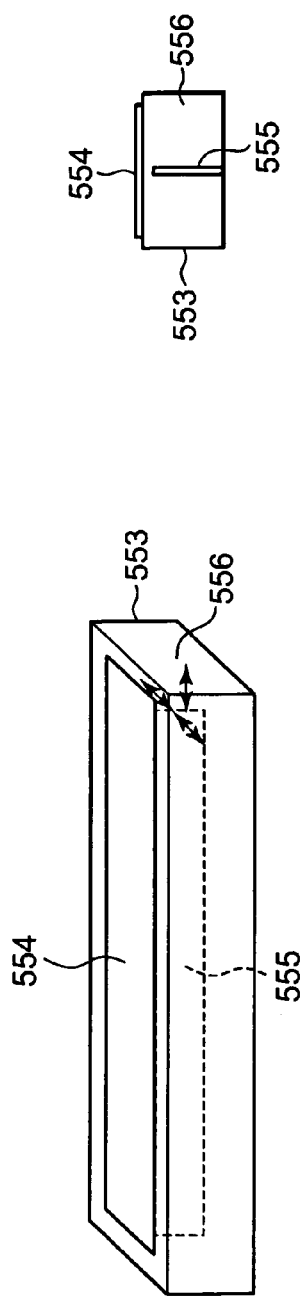

SALES APPARATUS, SALES METHOD AND PROGRAM

BACKGROUND OF THE INVENTION

1. Field of the Invention

The present invention relates to a sales apparatus or vending machine, a sales method and a program, and more particularly to a sales apparatus or vending machine, a sales method and a program, suitable for use in selling electronic data.

2. Description of Related Art

In a communication system of related art including a transmitter, a communication medium and a receiver, communication has been established by providing a physical communication signal transmission path for transmitting a communication signal and another physical reference point path different from the communication signal transmission path for sharing a reference point for judging a high/low difference of the communication signal between the transmitter and receiver.

For example, Japanese Patent Application Publication Numbers H10-229357 and H11-509380 describe communication techniques using a human body as the communication medium. In both the documents, in addition to the use of a human body as a first communication path, direct electrostatic coupling between electrodes in the ground or space is used as a second communication path. The total communication path constituted of the first and second communication paths is structured to form a closed circuit.

In the communication system of this type, it is necessary to form, as a closed circuit, two communication paths of a communication signal transmission path and a reference point path (first and second communication paths) between the transmitter and receiver. However, since both the paths are different paths, these two paths are required to be established with stability. This may pose a fear of restrictions of communication usage environments.

For example, since an intensity of electrostatic coupling between the transmitter and a receiver on the reference point path depends on a distance between apparatus, reliability of the path changes with the distance. Namely, in this case, there is a fear that reliability of communication depends upon the distance between the transmitter and receiver. If there exist obstacles between the transmission and receiver, there is a fear that communication reliability may be changed.

Therefore, with the communication method of using two paths, a communication signal transmission path and a reference point path, as a closed circuit, usage environments greatly influence the communication reliability, so that it is difficult to realize stable communication.

SUMMARY OF THE INVENTION

As described above, although communication techniques using a human body as a communication medium is still not established, usage methods for these techniques to various fields are being studied presently.

The present invention has been made under these circumstances. It is desirable to apply communication techniques using a human body as a communication medium and expected to be practically used in the future to sales apparatus or vending machines for selling electronic data or the like, thereby allowing quick merchandise delivery/reception and settlement.

According to one aspect of the present invention, there is provided a sales apparatus or vending machine for selling content to a purchaser wearing a communication terminal for communication by using dielectric material including a human body as a communication medium. The sales apparatus includes: content selection means for allowing the purchaser to select content for sale; communication means built in the content selection means for communicating with the communication terminal; detection means for detecting a selection operation of the purchaser, which is depressing of the content selection means; identifying means for identifying content selected by the purchaser based on a detection result by the detection means; settlement means for executing a settlement process for the content identified by the identifying means, with the communication terminal via the communication means and the human body of the purchaser who is depressing the communication means and the content selection means; and supply means for supplying the communication terminal with data of the content identified by the identifying means, via the communication means and the human body of the purchaser who is depressing the communication means and the content selection means.

The content selection means may include display means for displaying a selection image including corresponding to the content; the communication means may be stacked on the display means; the detection means may detect a selection operation of the purchaser, which is pointing out of the small image in the selection image displayed on the display means; the settlement means may execute the settlement process for the content, with the communication terminal via the communication means and the human body of the purchaser who is pointing out the small image; and the supply means may supply the communication terminal with the data of the content, via the communication means and the human body of the purchaser who is pointing out the communication means and the small image.

The sales apparatus may further include: merchandise selection means for allowing the purchaser to select a merchandise for sale. The detection means may detect a selection operation of the purchaser, which is depressing of the merchandise selection means; the communication means may also be built in the merchandise selection means; the identifying means may identify a merchandise selected by the purchaser, based on a detection result by the detection means; and the settlement means may execute the settlement process for the merchandise identified by the identifying means, with the communication terminal via the communication means and the human body of the purchaser who is depressing the merchandise selection means.

The sales apparatus may further include: cancel selection means for canceling a purchase of the content by the purchaser; and data delete means for deleting data of the content stored in the communication terminal, via the communication means and the human body of the purchaser who is depressing the cancel selection means. The detection means may detect a selection operation of the purchaser, which is depressing of the cancel selection means; the communication means may also be built in the cancel selection means; the identifying means may identify cancellation of purchase of the content selected by the purchaser, based on a detection result by the detection means; the data delete means may delete data of the content whose purchase cancellation is identified by the identifying means from the communication terminal, via the communication terminal and the human body of the purchaser who is depressing the cancel selection means; and the settlement means may execute the settlement process for canceling purchase of the content by the identifying means, with the communication terminal in a state that the communication means and the cancel selection means are depressed.

The sales apparatus may further include: advertisement display means for displaying an advertisement corresponding to the content; and storage means for storing data of the content.

The sales apparatus may further include: advertisement data supply means for supplying data of the advertisement corresponding to the content to the advertisement display means, by using data of the content stored in the storage means. The advertisement display means may display the advertisement corresponding to the content, in accordance with the advertisement data supplied from the advertisement data supply means.

The advertisement data supply means may change the advertisement data corresponding to the content in accordance with preference information acquired from the communication terminal and supply the changed advertisement data to the advertisement display means via the communication means and the human body of the purchaser who is depressing the content selection means.

The advertisement data supply means may acquire the advertisement data added to data of the content stored in the storage means, and supply the advertisement data corresponding to the content to the advertisement display means.

The advertisement data supply means may extract predetermined data from the content data stored in the storage means, generates advertisement data, and supply the generated advertisement data corresponding to the content to the advertisement display means.

According to one aspect of the present invention, there is provided a sales method for a sales apparatus or vending machine for selling content to a purchaser wearing a communication terminal for communication by using dielectric material including a human body as a communication medium. The sales method includes: detecting a selection operation of the purchaser, which is depressing of content selection means, the content selection means allowing the purchaser to select content for sale, the content selection means being built therein communication means for communicating with the communication terminal; identifying the content selected by the purchaser in accordance with the detection result; executing a settlement process for the content identified, with the communication terminal via the communication means and the human body of the purchaser who is depressing the content selection means; and supplying the communication terminal with data of the identified content, via the communication means and the human body of the purchaser who is depressing the content selection means.

According to one aspect of the present invention, there is provided a program for selling content to a purchaser wearing a communication terminal for communication by using dielectric material including a human body as a communication medium. The program causes a computer to perform a sale method including: detecting a selection operation of the purchaser, which is depressing of content selection means, the content selection means allowing the purchaser to select content for sale, the content selection means being built therein communication means for communicating with the communication terminal; identifying the content selected by the purchaser in accordance with the detection result; executing a settlement process for the content identified, with the communication terminal via the communication means and the human body of the purchaser who is depressing the content selection means; and supplying the communication terminal with data of the identified content, via the human body of the purchaser in the state that the communication means and the content selection means are depressed.

According to one aspect of the present invention, a selection operation of the purchaser, which is depressing of content selection means to select content for sale, is detected, the content selection means being built therein communication means for communicating with the communication terminal, and the content selected by the purchaser are identified in accordance with the detection result. A settlement process for the content identified, is executed with the communication terminal via the communication means and the human body of the purchaser who is depressing the content selection means, and the communication terminal is supplied with data of the identified content, via the communication means and the human body of the purchaser who is depressing the content selection means.

A network is a mechanism in which at least two apparatus are connected and information can be transmitted from one apparatus to another apparatus. Apparatus for communication via the network may be independent apparatus or internal blocks constituting one apparatus.

Communication may obviously be wireless communication or wired communication, or communication mixed with wireless communication and wired communication, i.e., wireless communication is established inone section and wired communication is established in another section. Communication may be wired communication from one apparatus to another apparatus and wireless communication from the other apparatus to one apparatus.

According to the present invention, the communication techniques using a human body as a communication medium can be applied to a sales apparatus or a vending machine for selling electronic data or the like to allow quick merchandise delivery/reception and settlement. Furthermore, according to the present invention, the communication techniques using a human body as a communication medium can be applied to sales method or a program capable of causing a computer to perform such a sales method for selling electronic data or the like to allow quick merchandise delivery/reception and settlement.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 3 is a table showing an example of the calculation result of effective values of the voltage produced across a reception load resistor in the model shown in FIG. 2;

FIG. 17A is a schematic view showing another example of locations at which individual electrodes are disposed;

FIG. 17B is a schematic view showing another example of locations at which individual electrodes are disposed;

FIG. 18A is a schematic view showing another example of locations at which individual electrodes are disposed;

FIG. 18B is a schematic view showing another example of locations at which individual electrodes are disposed;

DETAILED DESCRIPTION OF EMBODIMENTS

Figure 1:
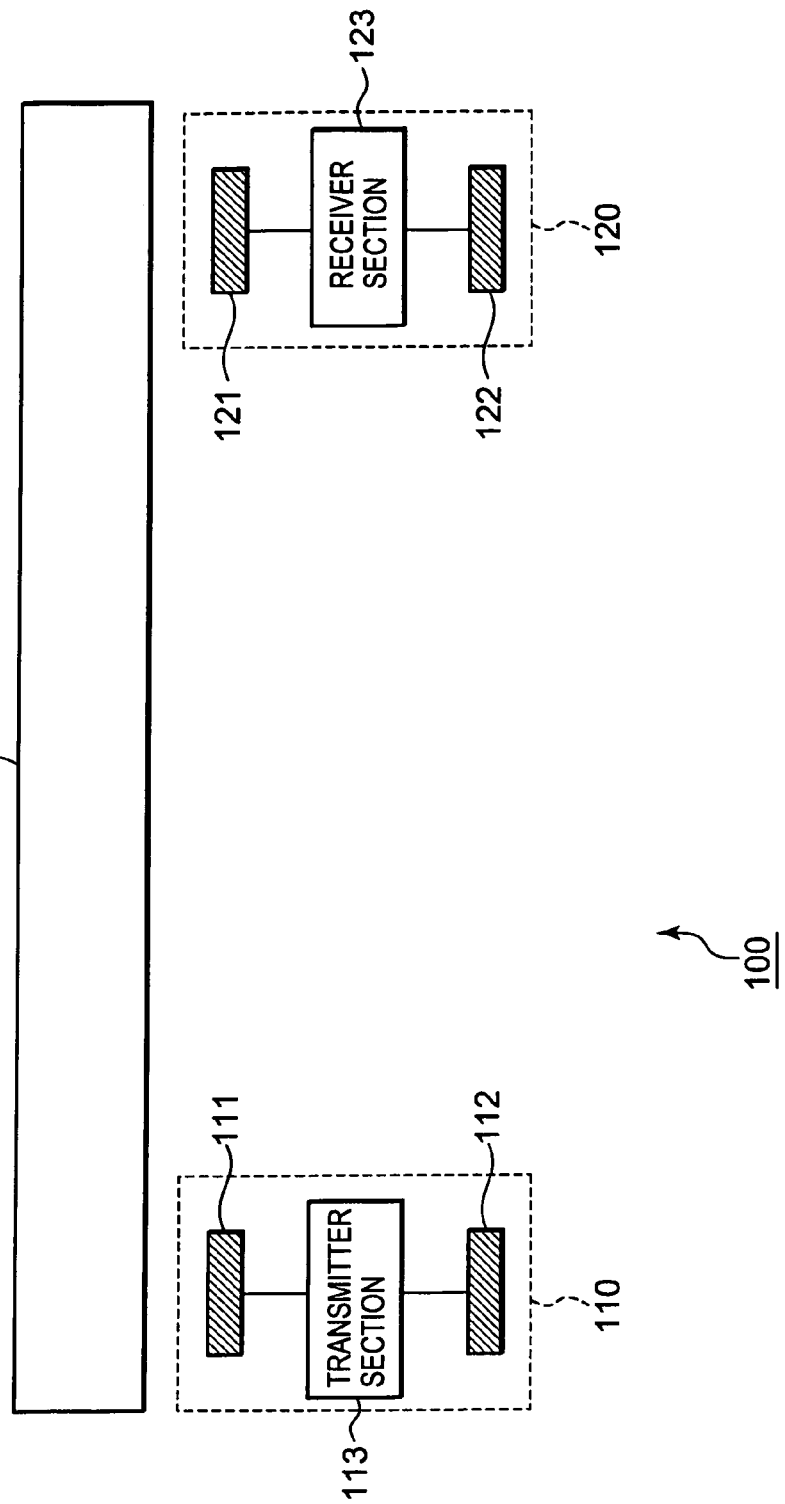
FIG. 1 is a block diagram showing a construction example of one embodiment of a communication system which underlies the present invention.

In the following description of embodiments of the present invention, correspondence between the disclosed inventions and the embodiments is as follows. The description is used for confirming that the embodiments supporting the inventions described in this specification are described in the specification. Therefore, the embodiment described in this specification as not corresponding to some invention is not intended to mean that the embodiment does not correspond to the invention. Conversely, the embodiment described in this specification as corresponding to some invention is not intended to mean that the embodiment does not correspond to the invention other than some invention.

Further, the description is not intended to cover all the inventions described in the specification. In other words, it is not intended to deny the presence of the invention described in this specification but not claimed in this application, i.e., to deny the presence of the invention which may be divisionally submitted in the future and the invention emerging through corrections and additionally submitted in the future.

According to one aspect of the present invention, there is provided a sales apparatus or vending machine (e.g., a sales apparatus 1000 shown in FIG. 34) for selling content to a purchaser wearing a communication terminal (e.g., a user device 1100 shown in FIG. 34) for communication by using dielectric material including a human body as a communication medium. The sale apparatus includes: content selection means (e.g., a display section 1005 shown in FIG. 34 (or a content selection button 1522-1 shown in FIG. 43)) for the purchaser to select content for sale; communication means (e.g., a signal electrode 1002 shown in FIG. 34) built in the content selection means for communicating with the communication terminal; detection means (e.g., an operation position judging means 1034, or an electrode change-over section 1032 and a communication control section 1033 shown in FIG. 37) for detecting a selection operation of the purchaser, which is depressing of the content selection means; identifying means e.g., a merchandise identifying means 1035 shown in FIG. 37) for identifying content selected by the purchaser based on a detection result by the detection means; settlement means (e.g., a settlement section 1037 shown in FIG. 37) for executing a settlement process for the content identified by the identifying means, with the communication terminal via the communication means and the human body of the purchaser who is depressing the content selection means; and supply means (e.g., a merchandise output section 1038 shown in FIG. 34) for supplying the communication terminal with data of the content identified by the identifying means, via the human body of the purchaser in the state that the communication means and the content selection means are depressed.

The content selection means may be constituted of display means (e.g., a display section 1005 shown in FIG. 34) for displaying a selection image including corresponding to the content; the communication means may be stacked on the display means; the detection means may detect a selection operation of the purchaser, which is pointing out of the small image in the selection image displayed on the display means; the settlement means may execute the settlement process for the content, with the communication terminal via the communication means and the human body of the purchaser who is pointing out the small image; and the supply means may supply the communication terminal with the data of the content, via the communication means and the human body of the purchaser who is pointing out the small image.

The sales apparatus may further include: merchandise selection means (e.g., a merchandise selection button 1521-1 shown in FIG. 43) for the purchaser to select a merchandise for sale. The detection means may detect a selection operation of the purchaser, which is depressing of the merchandise selection means; the communication means may also be built in the merchandise selection means; the identifying means may identify a merchandise selected by the purchaser, based on a detection result by the detection means; and the settlement means may execute the settlement process for the merchandise identified by the identifying means, with the communication terminal via the communication means and the human body of the purchaser who is depressing the merchandise selection means.

Figure 45:
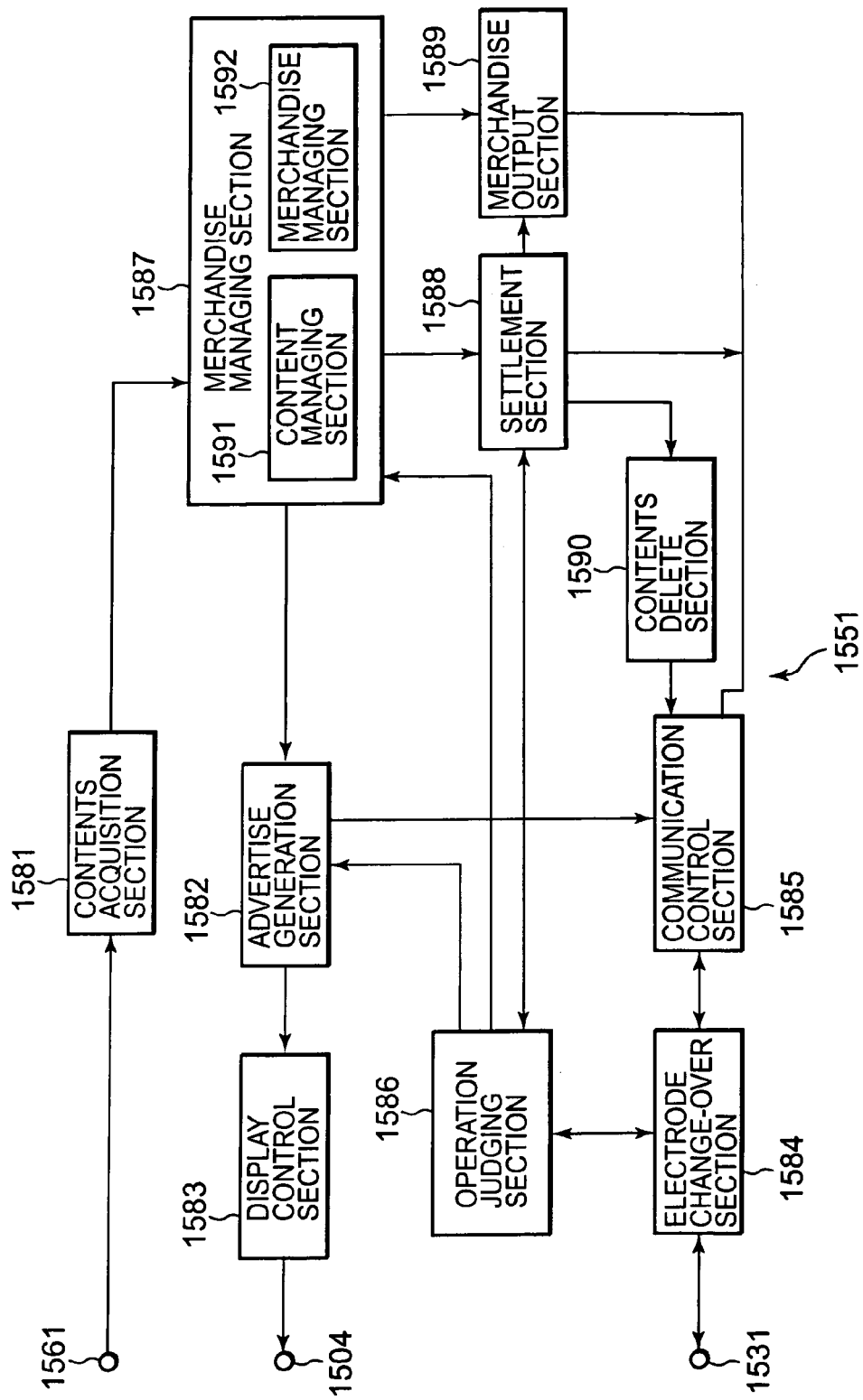
FIG. 45 is a block diagram showing an exemplary structure of a signal processing section shown in FIG. 44.

The sales apparatus may further include: cancel selection means (e.g., a cancel button 1523 shown in FIG. 43) for canceling a purchase of the content by the purchaser; and data delete means a content delete section 1590 shown in FIG. 45) for deleting data of the content stored in the communication terminal, via the communication means and the human body of the purchaser who is depressing the cancel selection means. The detection means may detect a selection operation of the purchaser, which is depressing of the cancel selection means; the communication means may also be built in the cancel selection means; the identifying means may identify cancellation of purchase of the content selected by the purchaser, based on a detection result by the detection means; the data delete means may delete data of the content whose purchase cancellation is identified by the identifying means from the communication terminal, via the communication terminal and the human body of the purchaser who is depressing the cancel selection means; and the settlement means may execute the settlement process for canceling purchase of the content by the identifying means, with the communication terminal in a state that the communication means and the cancel selection means are depressed.

The sales apparatus may further include: advertisement display means (e.g., a display section 1504 shown in FIG. 43) for displaying an advertisement corresponding to the content; and storage means (a content managing section 1591 shown in FIG. 45) for storing data of the content.

The sales apparatus may further include: advertisement data supply means (e.g., an advertisement generation section 1582 shown in FIG. 45) for supplying data of the advertisement corresponding to the content to the advertisement display means, by using data of the content stored in the storage means. The advertisement display means may display the advertisement corresponding to the content, in accordance with the advertisement data supplied from the advertisement data supply means.

Figure 41:
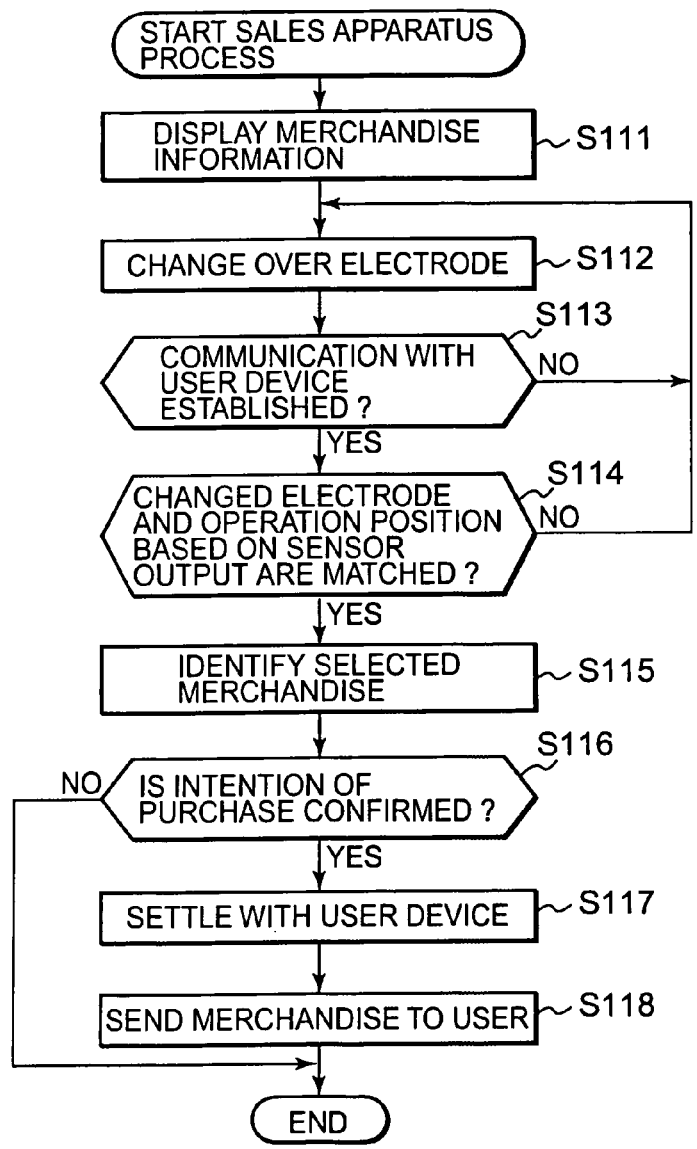
FIG. 41 is a flow chart illustrating the operation of the signal processing section of the first exemplary structure shown in FIG. 37.

According to one aspect of the present invention, there is provided a program or sales method for selling content to a purchaser wearing a communication terminal for communication by using dielectric material including a human body as a communication medium. The program or sales method includes: detecting (e.g., Step S113 shown in FIG. 41) a selection operation of the purchaser, which is depressing of content selection means, the content selection means allowing the purchaser to select content for sale, the content selection means being built therein communication means for communicating with the communication terminal; identifying (e.g., Step S115 shown in FIG. 41) the content selected by the purchaser in accordance with the detection result; executing (e.g., Step S117 shown in FIG. 41) a settlement process for the content identified, with the communication terminal via the communication means and the human body of the purchaser who is depressing the content selection means; and supplying (e.g., Step S118 shown in FIG. 41) the communication terminal with data of the identified content, via the communication means and the human body of the purchaser who is depressing the content selection means.

Embodiments of the present invention will be described below in detail with reference to the accompanying drawings.

FIG. 1 is a block diagram showing a construction example of a communication system which underlies the present invention.

Referring to FIG. 1, a communication system 100 is a system which includes a transmitter 110, a receiver 120, and a communication medium 130, and causes the transmitter 110 and the receiver 120 to transmit and receive signals therebetween via the communication medium 130. Namely, in the communication system 100, a signal transmitted from the transmitter 110 is transmitted via the communication medium 130 and is received by the receiver 120.

The transmitter 110 has a transmission signal electrode 111, a transmission reference electrode 112, and a transmitter section 113. The transmission signal electrode 111 is an electrode for transmitting a signal to be transmitted via the communication medium 130, and is provided to have a stronger capacitive coupling to the communication medium 130 than to the transmission reference electrode 112 which is an electrode for obtaining a reference point for making a decision as to the difference in level between signals. The transmitter section 113 is provided between the transmission signal electrode 111 and the transmission reference electrode 112, and applies an electrical signal (potential difference) to be transmitted to the receiver 120, between the transmission signal electrode 111 and the transmission reference electrode 112.

The receiver 120 has a reception signal electrode 121, a reception reference electrode 122, and a receiver section 123. The reception signal electrode 121 is an electrode for receiving a signal transmitted via the communication medium 130, and is provided to have a stronger capacitive coupling to the communication medium 130 than to the reception reference electrode 122 which is an electrode for obtaining a reference point for making a decision as to the difference in level between signals. The receiver section 123 is provided between the reception signal electrode 121 and the reception reference electrode 122, and converts an electrical signal (potential difference) produced between the reception signal electrode 121 and the reception reference electrode 122 into a desired electrical signal to restore the electrical signal generated by the transmitter section 113 of the transmitter 110.

The communication medium 130 is formed with a substance having a physical characteristic capable of transmitting electrical signals, for example, an electrically conductive material or a dielectric material. The communication medium 130 is formed with, for example, an electrically conductive material (such as copper, iron or aluminum). Otherwise, the communication medium 130 is formed with pure water, rubber, glass or an electrolytic solution such as a saline solution, or a dielectric material such as a human body which is a complex of these materials. The communication medium 130 may have any shape, for example, a linear shape, a planar shape, a spherical shape, a prismatic shape, a cylindrical shape or another arbitrary shape.

First of all, the relationship between each of the electrodes and spaces neighboring the communication medium or the devices in the communication system 100 will be described below. In the following description, for convenience of explanation, it is assumed that the communication medium 130 is a perfect conductor. In addition, it is assumed that spaces exist between the transmission signal electrode 111 and the communication medium 130 and between the reception signal electrode 121 and the communication medium 130, respectively, so that there is no electrical coupling between the transmission signal electrode 111 and the communication medium 130 nor between the reception signal electrode 121 and the communication medium 130. Namely; a capacitance is formed between the communication medium 130 and each of the transmission signal electrode 111 and the reception signal electrode 121.

The transmission reference electrode 112 is provided to face a space neighboring the transmitter 110, while the reception reference electrode 122 is provided to face a space neighboring the receiver 120. In general, if a conductor exists in a space, a capacitance is formed in a space neighboring the surface of the conductor. For example, if the shape of the conductor is a sphere of radius r [m], a capacitance C is found from the following formula (1):

[Formula 1]

$$C = 4 \times \pi \times \epsilon \times r \quad (1)$$

In formula (1), $\pi$ denotes the circular constant of the conductor and $\epsilon$ denotes the dielectric constant of the space surrounding the conductor. The dielectric constant $\epsilon$ is found from the following formula (2):

[Formula 2]

$$\epsilon = \epsilon_r \times \epsilon_0 \quad (2)$$

In formula (2), $\epsilon_0$ denotes a vacuum dielectric constant which is $8.854 \times 10^{-12}$ [F/m], and r denotes a specific dielectric constant which represents the ratio of the dielectric constant $\epsilon$ to the vacuum dielectric constant $\epsilon_0$.

As shown by the above-mentioned formula (1), the larger the radius r, the larger the capacitance C. In addition, the magnitude of the capacitance C of a conductor having a complex shape other than a sphere may not be easily expressed in a simple form such as the above-mentioned formula (1), but it is apparent that the magnitude of the capacitance C varies according to the magnitude of the surface area of the conductor.

As mentioned above, the transmission reference electrode 112 forms the capacitance with respect to the space neighboring the transmitter 110, while the reception reference electrode 122 forms the capacitance with respect to the space neighboring the receiver 120. Namely, as viewed from an imaginary infinity point outside each of the transmitter 110 and the receiver 120, the potential at the corresponding one of the transmission reference electrode 112 and the reception reference electrode 122 is fixed and does not easily vary.

The principle of communication in the communication system 100 will be described below. In the following description, for convenience of explanation, the term "capacitor" will be expressed simply as "capacitance" according to context, but these terms have the same meaning.

In the following description, it is assumed that the transmitter 110 and the receiver 120 shown in FIG. 1 are arranged to maintain a sufficient distance therebetween so that their mutual influence can be neglected. In the transmitter 110, it is assumed that the transmission signal electrode 111 is capacitively coupled to only the communication medium 130 and the transmission reference electrode 112 is spaced a sufficient distance apart from the transmission signal electrode 111 so that their mutual influence can be neglected (the electrodes 112 and 111 are not capacitively coupled). Similarly, in the receiver 120, it is assumed that the reception signal electrode 121 is capacitively coupled to only the communication medium 130 and the reception reference electrode 122 is spaced a sufficient distance apart from the reception signal electrode 121 so that their mutual influence can be neglected (the electrodes 122 and 121 are not capacitively coupled). Furthermore, since the transmission signal electrode 111, the reception signal electrode 121 and the communication medium 130 are actually arranged in a space, each of them has a capacitance relative to the space, but the capacitance is assumed to be herein negligible for convenience of explanation.

Figure 2:
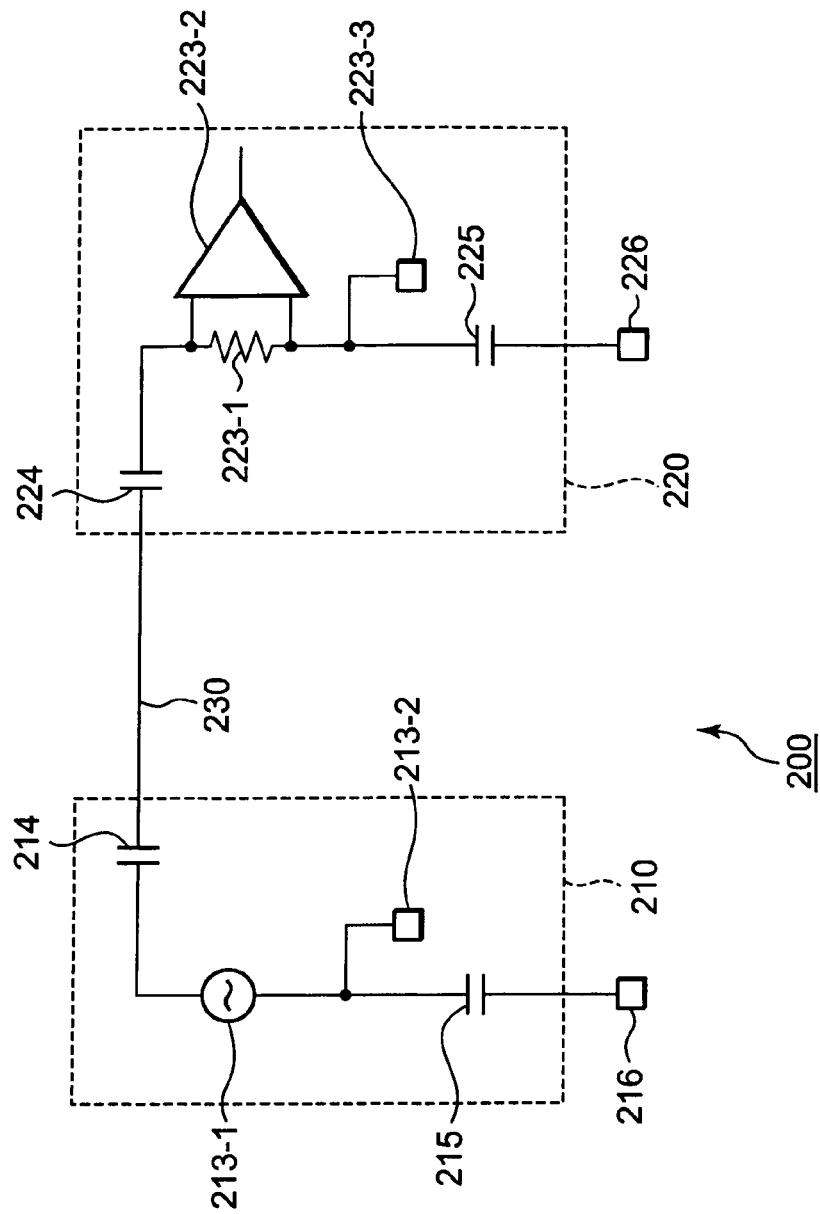
FIG. 2 is a diagram showing an example of an equivalent circuit of the communication system shown in FIG. 1.

FIG. 2 is a diagram showing an equivalent circuit of the communication system 100 shown in FIG. 1. A communication system 200 is the equivalent circuit of the communication system 100 and is substantially equivalent to the communication system 100.

Namely, the communication system 200 has a transmitter 210, a receiver 220, and a connection line 230, and the transmitter 210 corresponds to the transmitter 110 of the communication system 100 shown in FIG. 1, the receiver 220 corresponds to the receiver 120 of the communication system 100 shown in FIG. 1, and the connection line 230 corresponds to the communication medium 130 of the communication system 100 shown in FIG. 1.

In the transmitter 210 shown in FIG. 2, a signal source 213-1 and a ground point 213-2 correspond to the transmitter section 113 shown in FIG. 1. The signal source 213-1 generates a sine wave of particular frequency ωxt [rad] as a transmit signal. If t [S] denotes time and ω [rad/s] denotes angular frequency, formula (3) can be expressed as follows:

[Formula 3]

$$\omega = 2 \times \pi \times f \quad (3)$$

In formula (3), π denotes a circular constant and f [Hz] denotes the frequency of the signal generated by the signal source 213-1. The ground point 213-2 is a point connected to the ground of the circuit inside the transmitter 210. Namely, one of the terminals of the signal source 213-1 is connected to a predetermined reference potential of the circuit inside the transmitter 210.

Cte 214 is a capacitor, and denotes the capacitance between the transmission signal electrode 111 and the communication medium 130 shown in FIG. 1. Namely, Cte 214 is provided between the terminal of the signal source 213-1 opposite to the ground point 213-2 and the connection line 230. Ctg 215 is a capacitor, and denotes the capacitance of the transmission signal electrode 112 shown in FIG. 1 with respect to the space. Namely, Ctg 215 is provided between the terminal of the signal source 213-1 on the side of the ground point 213-2 and a ground point 216 indicative of the infinity point (imaginary point) based on the transmitter 110 in the space.

In the receiver 220 shown in FIG. 2, Rr 223-1, a detector 223-2, and a ground point 223-3 correspond to the receiver section 123 shown in FIG. 1. Rr 223-1 is a load resistor (receive load) for extracting a received signal, and the detector 223-2 made of an amplifier detects and amplifies the potential difference between the opposite terminals of this Rr 223-1. The ground point 223-3 is a point connected to the ground of the circuit inside the receiver 220. Namely, one of the terminals of Rr 223-1 (one of the input terminals of the detector 223-2) is set to a predetermined reference potential of the circuit inside the receiver 220.

The detector 223-2 may also be adapted to be further provided with other functions, for example, the function of demodulating a detected modulated signal or decoding encoded information contained in the detected signal.

Cre 224 is a capacitor, and denotes the capacitance between the reception signal electrode 121 and the communication medium 130 shown in FIG. 1. Namely, Cre 224 is provided between the terminal of Rr 223-1 opposite to the ground point 223-3 and the connection line 230. Crg 225 is a capacitor, and denotes the capacitance of the reception reference electrode 122 shown in FIG. 1 with respect to the space. Namely, Crg 225 is provided between the terminal of Rr 223-1 on the side of the ground point 223-3 and a ground point 226 indicative of the infinity point (imaginary point) based on the receiver 120 in the space.

The connection line 230 denotes the communication medium 130 which is a perfect conductor. In the receiver 220 shown in FIG. 2, Ctg 215 and Crg 225 are shown to be electrically connected to each other via the ground point 216 and the ground point 226 on the equivalent circuit, but in practice, Ctg 215 and Crg 225 need not be electrically connected to each other and each of Ctg 215 and Crg 225 may form a capacitance with respect to the space neighboring the corresponding one of the transmitter 210 and the receiver 220. Namely, the ground point 216 and the ground point 226 need not be electrically connected and may also be independent of each other.

It should be noted that, if a conductor exists in a space, a capacitance proportional to the surface area of the conductor is necessarily formed. Namely, for example, the transmitter 210 and the receiver 220 may be spaced as far apart as desired from each other. For example, if the communication medium 130 shown in FIG. 1 is a perfect conductor, the conductivity of the connection line 230 can be regarded as infinite, so that the length of the connection line 230 does not influence communication. In addition, if the communication medium 130 is a conductor of sufficient conductivity, the distance between the transmitter 210 and the receiver 220 does not influence the stability of communication in practical terms.

In the communication system 200, a circuit is formed by the signal source 213-1, Rr 223-1, Cte 214, Ctg 215, Cre 224 and Crg 225. The combined capacitance Cx of the four series-connected capacitors (Cte 214, Ctg 215, Cre 224 and Crg 225) can be expressed by the following formula (4):

[Formula 4]

$$C_x = \frac{1}{\frac{1}{Cte} + \frac{1}{Ctg} + \frac{1}{Cre} + \frac{1}{Crg}} \quad [F] \quad (4)$$

The sine wave vf(t) generated by the signal source 213-1 can be expressed by the following formula (5):

[Formula 5]

$$V_t(t) = V_m \times \sin(\omega t + \theta)[V] \quad (5)$$

In formula (5), Vm [V] denotes the maximum amplitude voltage of the signal source voltage and θ [rad] denotes the initial phase angle of the same. Namely, the effective value Vtrms [V] of the voltage generated by the signal source 213-1 can be found from the following formula (6):

[Formula 6]

$$V_{trms} = \frac{V_m}{\sqrt{2}} \quad [V] \quad (6)$$

The complex impedance Z of the entire circuit can be found from the following formula (7):

[Formula 7]

$$Z = \sqrt{Rr^2 + \frac{1}{(\omega C_x)^2}}$$

$$= \sqrt{Rr^2 + \frac{1}{(2\pi f C_x)^2}} \quad [\Omega] \quad (7)$$

Namely, the effective value Vrrms of the voltage provided across both ends of Rr 223-1 can be found from the following formula (8):

[Formula 8]

$$V_{rrms} = \frac{Rr}{Z} \times V_{trms}$$

$$= \frac{Rr}{\sqrt{Rr^2 + \frac{1}{(2\pi f C_x)^2}}} \times V_{trms} \quad [V] \quad (8)$$

Accordingly, as shown in formula (8), the larger the resistance value of Rr 223-1, the larger the capacitance Cx, and the higher the frequency f [Hz] of the signal source 213-1, the smaller the term of $1/((2\times\pi\times f\times Cx)2)$, so that a larger signal can be generated across Rr 223-1.

When it is assumed, for example, that: the effective value Vtrms of the voltage generated by the signal source 213-1 of the transmitter 210 is fixed to 2 [V]; the frequency f of the signal generated by the signal source 213-1 is set to 1 [MHz], 10 [MHz] or 100 [MHz]; the resistance value of Rr 223-1 is set to 10 K [Ω] 100 K [Ω] or 1M [Ω]; and the capacitance Cx of the entire circuit is set to 0.1 [pF], 1 [pF] or 10 [pF], the calculated result of the effective value Vrrms of the voltage generated across Rr 223-1 is as listed in Table 250 shown in FIG. 3.

As shown in Table 250, the calculated result of the effective value Vrrms takes on a larger value when the frequency f is 10 [MHz] than when the frequency f is 1 [MHz], when the resistance value of the receive load Rr 223-1 is 1M [Ω] than when the resistance value is 10 K [Ω], or when the capacitance Cx is 10 [pF] than when the capacitance Cx is 0.1 [pF], as long as the other conditions are the same. Namely, as the value of the frequency f, the resistance value of Rr 223-1 or the capacitance Cx is made larger, a larger effective value Vrrms can be obtained.

It can also be seen from Table 250 that an electrical signal is generated across Rr 223-1 even in the case of a capacitance of a picofarad or less. Namely, even if the signal level of a signal to be transmitted is small, it is possible to effect communication as by amplifying a signal detected by the detector 223-2 of the receiver 220.

Figure 4:
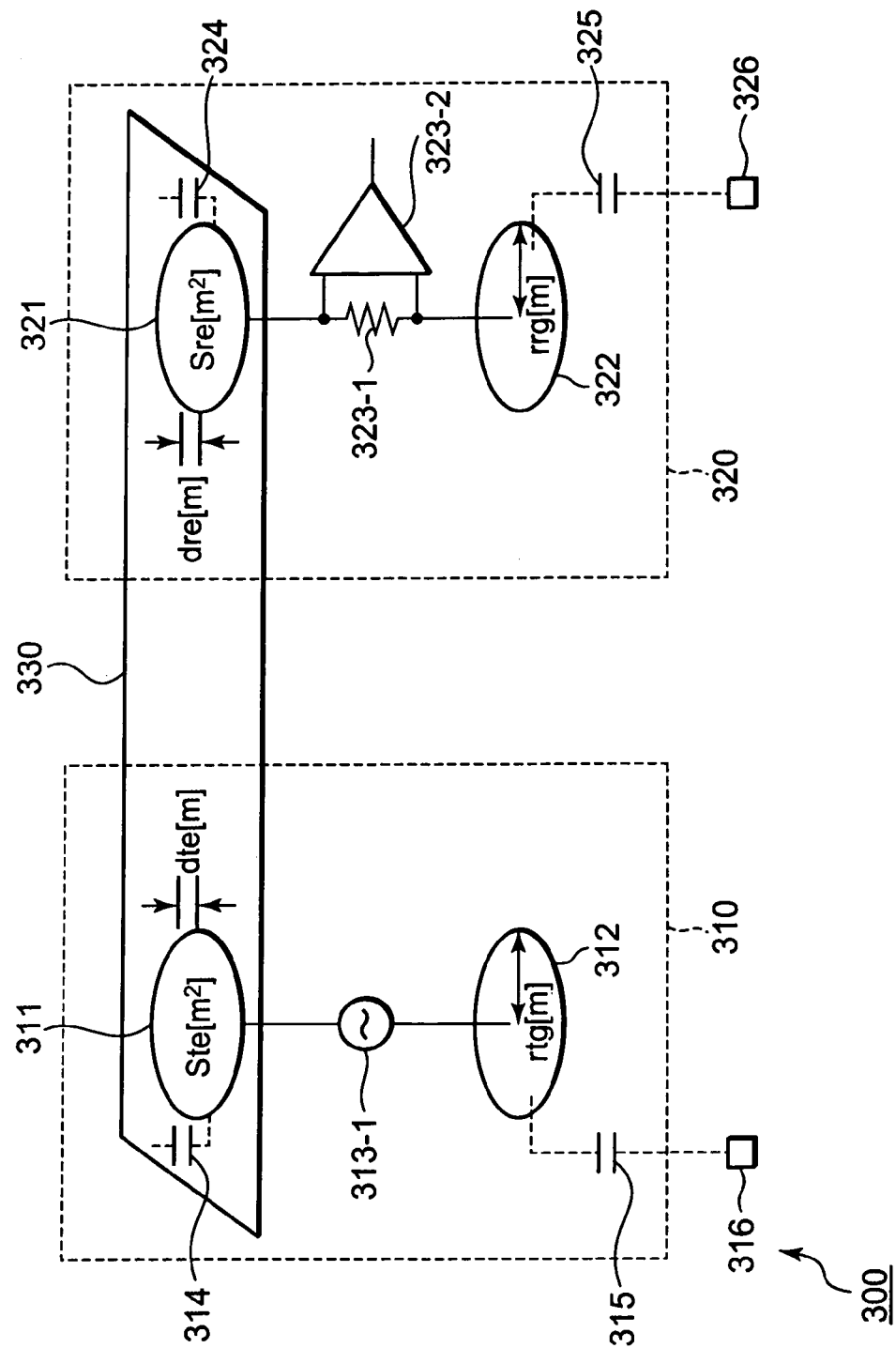
FIG. 4 is a diagram showing an example of a model of a physical construction of the communication system shown in FIG. 1.

A calculation example of each parameter of the communication system 200 which has been mentioned above as an equivalent circuit will be specifically described below with reference to FIG. 4. FIG. 4 is a diagram aiding in explaining calculation examples inclusive of the influence of the physical construction of the communication system 100.

A communication system 300 shown in FIG. 4 is a system corresponding to the communication system 100 shown in FIG. 1, and information about the physical construction of the communication system 100 is added to the communication system 200 shown in FIG. 2. Namely, the communication system 300 has a transmitter 310, a receiver 320, and a communication medium 330. As compared with the communication system 100 shown in FIG. 1, the transmitter 310 corresponds to the transmitter 110, the receiver 320 corresponds to the receiver 120, and the communication medium 330 corresponds to the communication medium 130.

The transmitter 310 has a transmission signal electrode 311 corresponding to the transmission signal electrode 111, a transmission reference electrode 312 corresponding to the transmission reference electrode 112, and a signal source 313-1 corresponding to the transmitter section 113. Namely, the transmission signal electrode 311 is connected to one of both terminals of the signal source 313-1, and the transmission reference electrode 312 is connected to the other. The transmission signal electrode 311 is provided in close proximity to the communication medium 330. The transmission reference electrode 312 is provided to be spaced from the communication medium 330 to such an extent that the transmission reference electrode 312 is not influenced by the communication medium 330, and is constructed to have a capacitance with respect to a space outside the transmitter 310. Although the signal source 213-1 and the ground point 213-2 have been described as corresponding to the transmitter section 113 with reference to FIG. 2, such ground point is omitted in FIG. 4 for convenience of explanation.

Similarly to the transmitter 310, the receiver 320 has a reception signal electrode 321 corresponding to the reception signal electrode 121, a reception reference electrode 322 corresponding to the reception reference electrode 122, and Rr 323-1 and a detector 323-2 corresponding to the receiver section 123. Namely, the reception signal electrode 321 is connected to one of both terminals of Rr 323-1, and the reception reference electrode 322 is connected to the other. The reception signal electrode 321 is provided in close proximity to the communication medium 330. The reception reference electrode 322 is provided to be spaced from the communication medium 330 to such an extent that the transmission reference electrode 312 is not influenced by the communication medium 330, and is constructed to have a capacitance with respect to a space outside the receiver 320. Although Rr 223-1, the detector 223-2 and the ground point 223-3 have been described as corresponding to the receiver section 123 with reference to FIG. 2, such ground point is omitted in FIG. 4 for convenience of explanation.

In addition, it is assumed that the communication medium 330 is a perfect conductor as in the cases shown in FIGS. 1 and 2. It is also assumed that the transmitter 310 and the receiver 320 are arranged to maintain a sufficient distance therebetween so that their mutual influence can be neglected. It is further assumed that the transmission signal electrode 311 is capacitively coupled to only the communication medium 330 and the transmission reference electrode 312 is spaced a sufficient distance apart from the transmission signal electrode 311 so that their mutual influence can be neglected. Similarly, it is assumed that the reception signal electrode 321 is capacitively coupled to only the communication medium 330 and the reception reference electrode 322 is spaced a sufficient distance apart from the reception signal electrode 321 so that their mutual influence can be neglected. Strictly, each of the transmission signal electrode 311, the reception signal electrode 321 and the communication medium 330 has a capacitance relative to the space, but the capacitance is assumed to be herein negligible for convenience of explanation.

As shown in FIG. 4, in the communication system 300, the transmitter 310 is arranged at one end of the communication medium 330, and the receiver 320 is arranged at the other end.

It is assumed that a space of distance dte [m] is formed between the transmission signal electrode 311 and the communication medium 330. If the transmission signal electrode 311 is assumed to be a conductive disk having a surface area Ste [m2] on one side, a capacitance Cte 314 formed between the transmission signal electrode 311 and the communication medium 330 can be found from the following formula (9):

[Formula 9]

$$Cte = \varepsilon \times \frac{Ste}{dte} \quad [F] \tag{9}$$

Formula (9) is a generally known mathematical formula for the capacitance of a parallel plate. Formula (9) is a mathematical formula to be applied to the case where parallel plates have the same area, but since formula (9) does not provide a seriously impaired result even when applied to the case where parallel plates have different areas, formula (9) is used herein. In formula (9), ϵ denotes a dielectric constant, and if the communication system 300 is assumed to be placed in the air, the specific dielectric constant ϵr can be regarded as approximately 1, so that the dielectric constant ϵ can be regarded as equivalent to the vacuum dielectric constant ϵ0. If it is assumed that the surface area Ste of the transmission signal electrode 311 is $2\times10^{-3}$ [m2] (approximately 5 [m] in diameter) and the distance dte is $5\times10^{-3}$ [m] (5 [m]), the capacitance Cte 314 can be found from the following formula (10):

[Formula 10]

$$Cte = (8.854 \times 10^{-12}) \times \frac{2 \times 10^{-3}}{5 \times 10^{-3}} \quad (10)$$
$$\approx 3.5 \ [pF].$$

It should be noted that, in terms of physical phenomena, the above-mentioned formula (9) is strictly applicable to the case where the relationship of Ste>>dte is satisfied, but it is assumed herein that the capacitance Cte 314 can be approximated by formula (9).

A capacitance Cte 315 formed by the transmission reference electrode 312 and a space will be described below. In general, if a disk of radius r [m] is placed in a space, a capacitance C [F] which is formed between the disk and the space can be found from the following formula (11):

[Formula 11]

$$C = 8 \times \epsilon \times r \ [F] \quad (11)$$

If the transmission reference electrode 312 is a conductive disk of radius rtg=$2.5\times10^{-2}$ [m] (radius of 2.5 [m]), the capacitance Cte 315 formed by the transmission reference electrode 312 and the space can be found by using the above-mentioned formula (11), as shown in the following formula (12). It is assumed here that the communication system 300 is placed in the air, the dielectric constant of the space can be approximated by the vacuum dielectric constant ϵ0.

[Formula 12]

$$Ctg = 8 \times 8.854 \times 10^{-12} \times 2.5 \times 10^{-2} \quad (12)$$
$$\approx 1.8 \ [pF]$$

If the reception signal electrode 321 is the same in size as the transmission signal electrode 311 and the space between the reception signal electrode 321 and the communication medium 330 is the same as the space between the transmission signal electrode 311 and the communication medium 330, a capacitance Cre 324 which is formed by the reception signal electrode 321 and the communication medium 330 is 3.5 [pF] as in the case of the transmission side. If the reception reference electrode 322 is the same in size as the transmission reference electrode 312, a capacitance Crg 325 which is formed by the reception reference electrode 322 and a space is 1.8 [pF] as in the case of the transmission side. Accordingly, the combined capacitance Cx of the four electrostatic capacities Cte 314, Ctg 315, Cre 324 and Crg 325 can be expressed by using the above-mentioned formula (4), as shown in the following formula (13):

[Formula 13]

$$C_x = \frac{1}{\frac{1}{Cte} + \frac{1}{Ctg} + \frac{1}{Cre} + \frac{1}{Crg}} \quad (13)$$
$$= \frac{1}{\frac{1}{3.5 \times 10^{-12}} + \frac{1}{1.8 \times 10^{-12}} + \frac{1}{3.5 \times 10^{-12}} + \frac{1}{1.8 \times 10^{-12}}}$$
$$\approx 0.6 \ [pF]$$

More strictly,

Cx=0.525 [pF]

is obtained.

If it is assumed that: the frequency f of the signal source 313-1 is 1 [MHz]; the effective value Vtrms of the voltage generated by the signal source 313-1 is 2 [V]; and the resistance value of Rr 323-1 is set to 100 K [Ω], the voltage Vrrms generated across Rr 323-1 can be found from the following formula (14):

[Formula 14]

$$V_{rrms} = \frac{Rr}{\sqrt{Rr^2 + \frac{1}{(2\pi f C_x)^2}}} \times V_{trms} \quad (14)$$
$$= \frac{1 \times 10^5}{\sqrt{(1 \times 10^5)^2 + \frac{1}{(2 \times \pi \times (1 \times 10^6) \times (0.6 \times 10^{-12}))^2}}} \times 2$$
$$\approx 0.71 \ [V]$$

As is apparent from the above-mentioned result, it is possible to transmit signals from a transmitter to a receiver as a basic principle by using electrostatic capacities formed by spaces.

The above-mentioned electrostatic capacities of the transmission reference electrode and the reception reference electrode with respect to the respective spaces can be formed only if a space exits at the location of each of the electrodes. Accordingly, only if the transmission signal electrode and the reception signal electrode are coupled via the communication medium, the transmitter, and the receiver can achieve stability of communication irrespective of their mutual distance.

Figure 5:
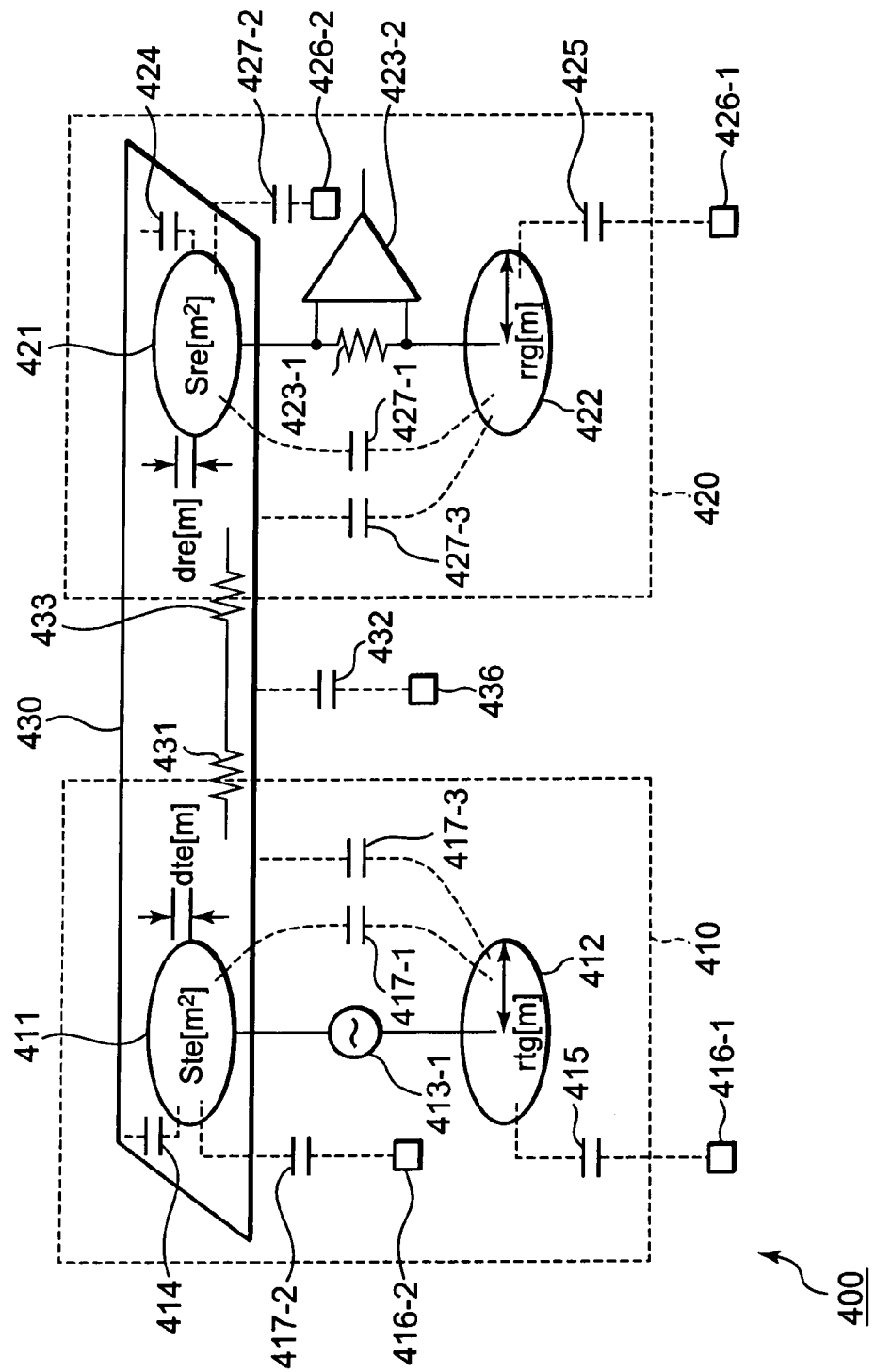
FIG. 5 is a diagram showing an example of a calculation model of each parameter generated in the model shown in FIG. 4.

The case where the present inventive communication system is actually physically constructed will be described below. FIG. 5 is a diagrams showing an example of a calculation model for parameters generated in a case where any of the above-mentioned communication systems is actually physically constructed.

Namely, a communication system 400 has a transmitter 410, a receiver 420, and a communication medium 430, and is a system which corresponds to the above-mentioned communication system 100 (the communication system 200 or the communication system 300) and is basically the same in construction as any of the communication systems 100 to 300 except that parameters to be evaluated differ.

As compared with the communication system 300, the transmitter 410 corresponds to the transmitter 310, a transmission signal electrode 411 of the transmitter 410 corresponds to the transmission signal electrode 311, a transmission reference electrode 412 corresponds to the transmission reference electrode 312, and a signal source 413-1 corresponds to the signal source 313-1. The receiver 420 corresponding to the receiver 320, a reception signal electrode 421 of the receiver 420 corresponds to the reception signal electrode 321, a reception reference electrode 422 corresponds to the reception reference electrode 322, Rr423-1 corresponds to Rr323-1, and a detector 423-2 corresponds to the detector 323-2. In addition, the communication medium 430 corresponds to the communication medium 330.

Referring to the parameters, a capacitance Cte 414 between the transmission signal electrode 411 and the communication medium 430 corresponds to Cte 314 of the communication system 300, a capacitance Ctg 415 of the transmission reference electrode 412 with respect to a space corresponds to Ctg 315 of the communication system 300, and a ground point 416-1 indicative of an imaginary infinity point in a space outside the transmitter 410 corresponds to the ground point 316 of the communication system 300. The transmission signal electrode 411 is a disk-shaped electrode of area Ste [m2] and is provided at a location away from the communication medium 430 by a small distance dte [m]. The transmission reference electrode 412 is also a disk-shaped electrode and has a radius rtg [m].

In the receiver 420, a capacitance Cre 424 between the reception signal electrode 421 and the communication medium 430 corresponds to Cre 324 of the communication system 300, a capacitance Crg 425 of the reception reference electrode 422 with respect to a space corresponds to Crg 325 of the communication system 300, and a ground point 426-1 indicative of an imaginary infinity point in a space outside the receiver 420 corresponds to the ground point 326 of the communication system 300. The reception signal electrode 421 is a disk-shaped electrode of area Sre [m2] and is provided at a location away from the communication medium 430 by a small distance dre [m]. The reception reference electrode 422 is also a disk-shaped electrode and has a radius rrg [m].

The communication system 400 shown in FIG. 5 is a model in which the following new parameters are added to the above-mentioned parameters.

For example, regarding the transmitter 410, the following parameters are added as new parameters: a capacitance Ctb 417-1 formed between the transmission signal electrode 411 and the transmission reference electrode 412, a capacitance Cth 417-2 formed between the transmission signal electrode 411 and a space, and a capacitance Cti 417-3 formed between the transmission reference electrode 412 and the communication medium 430.

Regarding the receiver 420, the following parameters are added as new parameters: a capacitance Crb 427-1 formed between the reception signal electrode 421 and the reception reference electrode 422, a capacitance Crh 427-2 formed between the reception signal electrode reception signal electrode 421 and a space, and a capacitance Cri 427-3 formed between the reception reference electrode 422 and the communication medium 430.

Furthermore, regarding the communication medium 430, a capacitance Cm 432 formed between the communication medium 430 and a space is added as a new parameter. In addition, since the communication medium 430 actually has an electrical resistance based on its size, its material and the like, resistance values Rm 431 and Rm 433 are added as new parameters corresponding to the resistance component.

Although illustration is omitted in the communication system 400 shown in FIG. 5, if the communication medium 430 has not only conductivity but also dielectricity, a capacitance according to the dielectric constant is also formed. In addition, if the communication medium 430 does not have conductivity and a capacitance is formed by only dielectricity, the capacitance, which is determined by the dielectric constant, the distance, the size and the arrangement of the dielectric material of the communication medium 430, is formed between the transmission signal electrode 411 and the reception signal electrode 421.

In addition, in the communication system 400 shown in FIG. 5, it is assumed that the distance between the transmitter 410 and the receiver 420 is apart to such an extent that a factor such as their mutual capacitive coupling can be neglected (the influence of the capacitive coupling between the transmitter 410 and the receiver 420 can be neglected). If the distance is short, there may be a need for taking account of a capacitance between the electrodes in the transmitter 410 and a capacitance between the electrodes in the receiver 420 in accordance with the above-mentioned approach, depending on the positional relationship between the electrodes in the transmitter 410 and that between the electrodes in the receiver 420.

Figure 6:
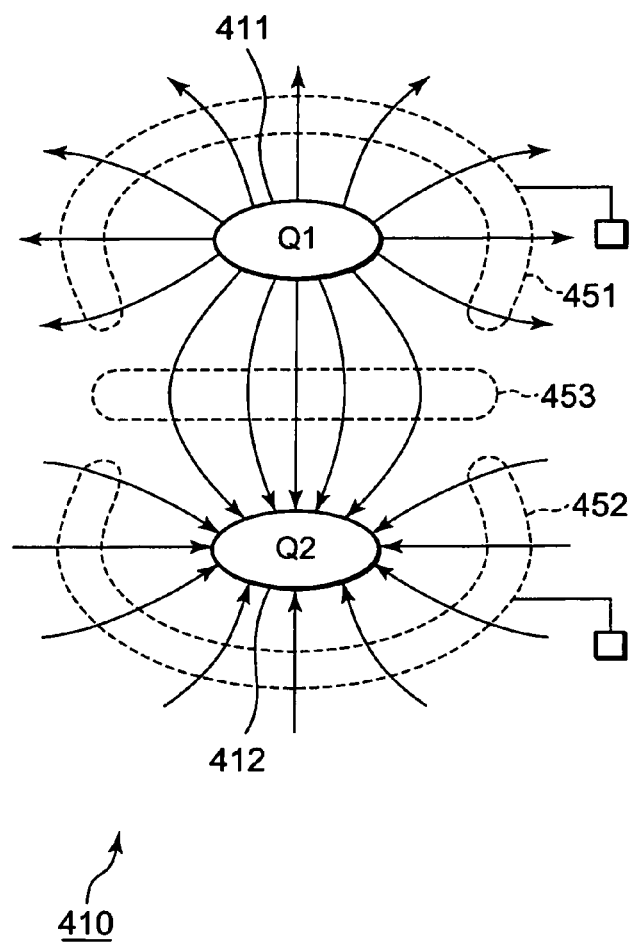
FIG. 6 is a schematic view showing an example of distribution of electric lines of force with respect to electrodes.

The operation of the communication system 400 shown in FIG. 5 will be described below by using electric lines of force. FIG. 6 is a schematic view in which the relationship between the electrodes in the transmitter 410 of the communication system 400 is represented by electric lines of force, and FIG. 7 is a schematic view in which the relationship between the electrodes in the transmitter 410 of the communication system 400 and the communication medium 430 is represented by electric lines of force.

FIG. 6 is a schematic view showing an example of distribution of electric lines of force in a case where the communication medium 430 does not exist. It is assumed that the transmission signal electrode 411 has positive charge (positively charged) and the transmission reference electrode 412 has negative charge (negatively charged). The arrows shown in FIG. 6 denote the electric lines of force, and the directions of the respective arrows are from positive charge to negative charge. The electric lines of force do not suddenly disappear halfway and have the property of arriving at either an object having charge of a different sign or the imaginary infinity point.

In FIG. 6, from among the electric lines of force emitted from the transmission signal electrode 411, electric lines of force 451 denote electric lines of force arriving at the infinity point, while from among the electric lines of force turning toward the transmission reference electrode 412, electric lines of force 452 denote electric lines of force arriving from the imaginary infinity point. Electric lines of force 453 denote electric lines of force produced between the transmission signal electrode 411 and the transmission reference electrode 412. As shown in FIG. 6, electric lines of force move from the positively charged electrode 411 of the transmitter 410, while electric lines of force move toward the negatively charged transmission reference electrode 412 of the transmitter 410. The distribution of the electric lines of force is influenced by the size of each of the electrodes and the positional relationship therebetween.

Figure 7:
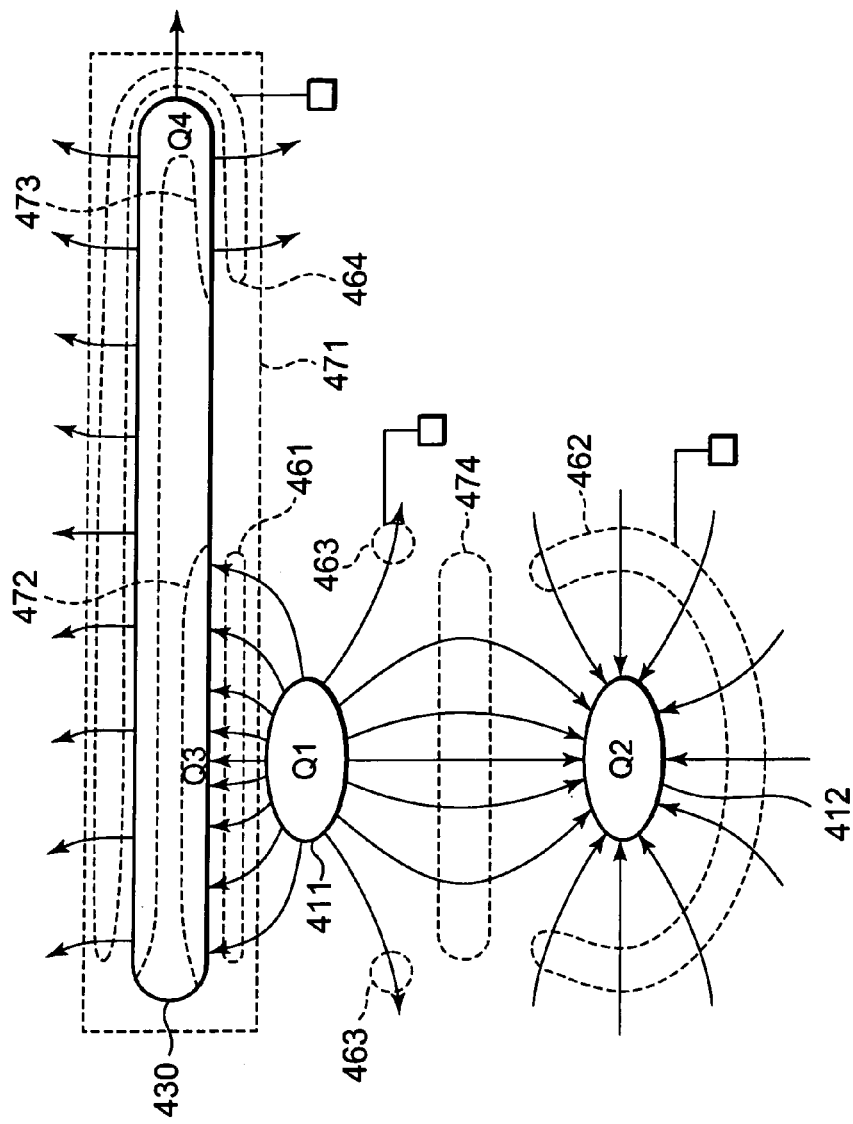
FIG. 7 is a schematic view showing another example of distribution of electric lines of force with respect to the electrodes.

FIG. 7 is a schematic view showing an example of electric lines of force in a case where the communication medium 430 is brought closer to the transmitter 410. As the communication medium 430 is brought closer to the transmission signal electrode 411, the coupling therebetween becomes stronger and most of the electric lines of force 451 arriving at the infinity point in FIG. 6 become electric lines of force 461 arriving at the communication medium 430, so that the number of electric lines of force 463 moving toward the infinity point (the electric lines of force 451 shown in FIG. 6) is decreased. Accordingly, the capacitance relative to the infinity point as viewed from the transmission signal electrode 411 (Cth 417-2 in FIG. 5) decreases, and the capacitance between the transmission signal electrode 411 and the communication medium 430 (Cth 417-2 in FIG. 5) increases. A capacitance (Cti 417-3 in FIG. 5) between the transmission reference electrode 412 and the communication medium 430 actually exists as well, but in FIG. 7, it is assumed that the capacitance is negligible.

According to Gauss's law, the number N of electric lines of force moving through an arbitrary closed surface S is equal to the charge enclosed in the closed surface S which is divided by the dielectric constant ε, and is not influenced by charge outside the closed surface S. When it is assumed that n-number of charges exist in the closed surface S, the following formula is obtained:

[Formula 15]

$$N = \frac{1}{\varepsilon} \times \sum_{i=1}^{n} q_i \text{ pieces} \tag{15}$$

In formula (15), i denotes an integer, and a variable qi denotes the amount of charge accumulated in each of the electrodes. Formula (15) represents that electric lines of force emerging from the closed surface S of the transmission signal electrode 411 are determined by only electric lines of force emanated from the charges existing in the closed surface S, and all electric lines of force entering from the outside of the transmission reference electrode 412 leave from other locations.

According to this law, in FIG. 7, if it is assumed that the communication medium 430 is not grounded, a generation source of charge does not exist in a closed surface 471 near the communication medium 430, charge Q3 is induced by electrostatic induction in an area 472 of the communication medium 430 near the electric lines of force 461. Since the communication medium 430 is not grounded and the total amount of charge of the communication medium 430 does not change, charge Q4 which is equivalent in amount to but different in sign from the charge Q3 is induced in an area 743 outside the area 472 in which the charge Q3 is induced, so that electric lines of force 464 produced by the charge Q4 move out of the closed surface 471. The larger the size of the communication medium 430 becomes, the more the charge Q4 diffuses and the lower the charge density becomes, so that the number of electric lines of force per section area decreases.

If the communication medium 430 is a perfect conductor, the communication medium 430 has the property of becoming approximately equal in charge density irrespective of its sites, because the communication medium 430 has the characteristic that its potential becomes the same irrespective of the sites as the result of the property of the perfect conductor. If the communication medium 430 is a conductor having a resistance component, the number of electric lines of force decreases according to the distance between the communication medium 430 and the transmission signal electrode 411 in accordance with the resistance component. If the communication medium 430 is a dielectric having no conductivity, electric lines of force are diffused and propagated by its polarization action. If n-number of conductors exist in a space, the charge Qi of each of the conductors can be found from the following formula:

[Formula 16]

$$Q_i = \sum_{j=1}^{n} C_{ij} \times V_j \tag{16}$$

In formula (16), i and j denote integers, and Cij denotes a capacitance coefficient formed by the conductor i and the conductor j and may be considered to have the same property as capacitance. The capacitance coefficient is determined by only the shapes of the respective conductors and the positional relationship therebetween. The capacitance coefficient Cii becomes a capacitance that the conductor i itself forms with respect to a space. In addition, Cij=Cii. Formula (16) represents that a system formed by a plurality of conductors operates on the basis of the superposition theorem and that the charge of each of the conductors is determined by the sum of the products of the capacitance between the conductors and the potentials of the respective conductors.

It is assumed here that the mutually associated parameters shown in FIG. 7 and formula (16) are determined as follows. For example, Q1 denotes charge induced in the transmission signal electrode 411, Q2 denotes charge induced in the transmission reference electrode 412, Q3 denotes charge in the communication medium 430 by the transmission signal electrode 411, and Q4 denotes charge equivalent in amount to and different in sign to the charge Q3 in the communication medium 430.

V1 denotes the potential of the transmission signal electrode 411 with respect to the infinity point, V2 denotes the potential of the transmission reference electrode 412 with respect to the infinity point, V3 denotes the potential of the communication medium 430 with respect to the infinity point, C12 denotes the capacitance coefficient between the transmission signal electrode 411 and the transmission reference electrode 412, C13 denotes the capacitance coefficient between the transmission signal electrode 411 and the communication medium 430, C15 denotes the capacitance coefficient between the transmission signal electrode 411 and the space, C25 denotes the capacitance coefficient between the transmission reference electrode 412 and the space, and C35 denotes the capacitance coefficient between the communication medium 430 and the space.

At this time, the charge Q3 can be found from the following formula:

[Formula 17]

$$Q_3 = C13 \times V1 \tag{17}$$

Strictly, formula (17) is the following formula (17'), but since the second and third terms on the right-hand side of formula (17'), i.e., C23×V2+C53×V5, are small, formula (17) is used:

$$Q_3 = C13 \times V1 + C23 \times V2 + C53 \times V5 \tag{17'}$$

If far more electric fields are to be injected into the communication medium 430, the charge Q3 may be increased. For this purpose, the capacitance coefficient C13 between the transmission signal electrode 411 and the communication medium 430 may be increased and a sufficient voltage V1 may be applied. The capacitance coefficient C13 is determined by only the shapes of the shapes of the transmission signal electrode 411 and the communication medium 430 and the positional relationship therebetween, and the closer the distance therebetween and the larger the areas of facing surfaces, the higher the capacitance therebetween. As to the potential V1, a sufficient voltage need be produced as viewed from the infinity point. In the transmitter 410, a potential difference is applied between the transmission signal electrode 411 and the transmission reference electrode 412 by the signal source 413-1, and the behavior of the transmission reference electrode 412 is important so that the potential can be produced as a sufficient potential as viewed from the infinity point as well.

If the transmission reference electrode 412 is small in size and the transmission signal electrode 411 has a sufficiently large size, the capacitance coefficients C12 and C25 become small, whereas the capacitance coefficients C13, C15 and C45 become electrically less variable because each of them has a large capacitance. Accordingly, most of the potential differences generated by the signal source appear as the potential V2 of the transmission reference electrode 412, so that the potential V1 of the transmission signal electrode 411 becomes small.

Figure 8:
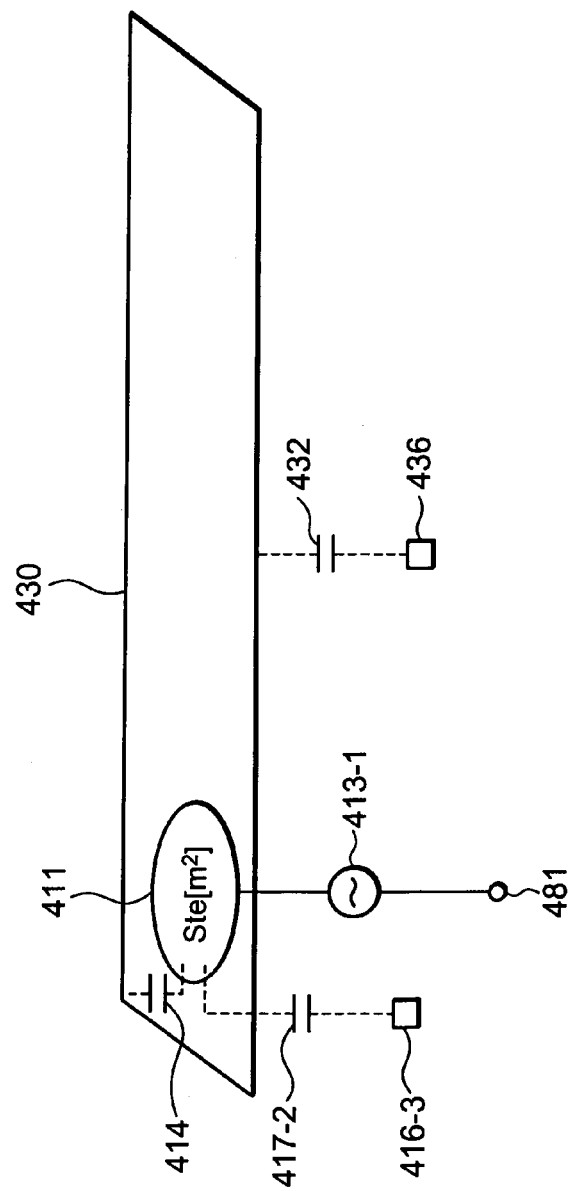
FIG. 8 is a diagram aiding in explaining another example of the model of electrodes in a transmitter.

FIG. 8 shows the above-mentioned status. A transmission reference electrode 481 is small in size and is not coupled to any of the conductors or the infinity point. The transmission signal electrode 411 forms the capacitance Cte 414 between itself and the communication medium 430, and forms the capacitance Cth 417-2 with respect to the space. The communication medium 430 forms a capacitance Cm 432 with respect to the space. Even if potentials are produced at the transmission signal electrode 411 and the transmission reference electrode 412, large energy is needed to vary these potentials, because the electrostatic capacities Cte 414, Cth 417-2 and Cm 432 associated with the transmission signal electrode 411 are overwhelmingly large. However, since the capacitance of the transmission reference electrode 481 on the opposite side of the signal source 413-1 is small, the potential of the transmission signal electrode 411 hardly varies, and most potential variations in the signal source 413-1 appear at the transmission reference electrode 481.

Contrarily, if the transmission signal electrode 411 is small in size and the transmission reference electrode 481 has a sufficiently large size, the capacitance of the transmission reference electrode 481 relative to the space increases and becomes to produce electrically less variation. Although a sufficient voltage V1 is produced at the transmission signal electrode 411, the capacitive coupling between the transmission signal electrode 411 and the communication medium 430 is decreased so that sufficient electric fields may not be injected.

Accordingly, on the basis of the balance of the entire system, it is necessary to provide a transmission reference electrode capable of giving a sufficient potential while enabling the electric fields necessary for communication to be injected from a transmission signal electrode to a communication medium. Although the above description has referred to only the transmission side, the relationship between the electrodes of the receiver 420 and the communication medium 430 can also be considered in the same manner.

The infinity point need not be at a physically long distance, and may be set in a space neighboring the device in practical terms. More ideally, it is desirable that the infinity point is more stable and does not show large potential variations in the entire system. In actual use environments, there is noise which is generated from AC power lines, illuminators and other electrical appliances, but such noise may be neglected if the noise does not overlap a frequency bandwidth to be used by at least a signal source or is of negligible level.

Figure 9:
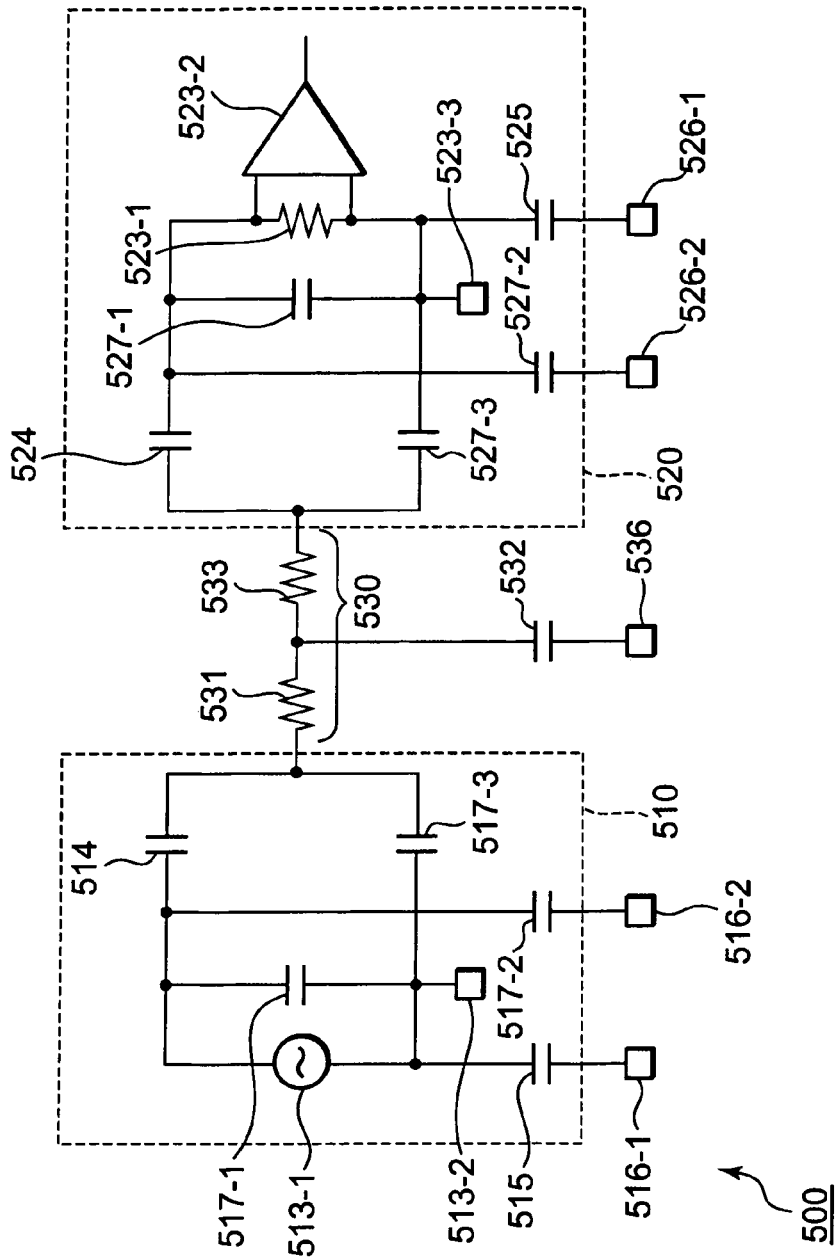
FIG. 9 is a diagram showing an example of an equivalent circuit of the model shown in FIG. 5.

FIG. 9 is a diagram showing an equivalent circuit of the model (the communication system 400) shown in FIG. 5. As in the relationship between FIGS. 2 and 4, a communication system 500 shown in FIG. 9 corresponds to the communication system 400 shown in FIG. 5, a transmitter 510 of the communication system 500 corresponds to the transmitter 410 of the communication system 400, a receiver 520 of the communication system 500 corresponds to the receiver 420 of the communication system 400, and a connection line 530 of the communication system 500 corresponds to the communication medium 430 of the communication system 400.

Similarly, in the transmitter 510 shown in FIG. 9, a signal source 513-1 corresponds to the signal source 413-1. In the transmitter 510 shown in FIG. 9, there is shown a ground point 513-2 which is omitted in FIG. 5, corresponds to the ground point 213-2 in FIG. 2, and indicates ground in the circuit inside the transmitter section 113 shown in FIG. 1.

Cte 514 in FIG. 9 is a capacitance corresponding to Cte 414 in FIG. 5, Ctg 515 is a capacitance corresponding to Ctg 415 in FIG. 5, and ground points 516-1 and 516-2 respectively correspond to the ground points 416-1 and 416-2. In addition, Ctb 517-1, Cth 517-2 and Cti 517-3 are capacitances corresponding to Ctb 417-1, Cth 417-2 and Cti 417-3, respectively.

Similarly, in the receiver 520, Rr 523-1 and a detector 523-2 respectively correspond to Rr 423-1 and the detector 423-2 shown in FIG. 5. In addition, in the receiver 520 shown in FIG. 9, there is shown a ground point 523-3 which is omitted in FIG. 5, corresponds to the ground point 223-2 in FIG. 2, and indicates ground in the circuit inside the receiver section 123 shown in FIG. 1.

Cre 524 in FIG. 9 is a capacitance corresponding to Cre 424 in FIG. 5, Crg 525 is a capacitance corresponding to Crg 425 in FIG. 5, and ground points 526-1 and 526-2 respectively correspond to the ground points 426-1 and 426-2. In addition, Crb 527-1, Crh 527-2 and Cri 527-3 are capacitances corresponding to Crb 427-1, Crh 427-2 and Cri 427-3, respectively.

Similarly, as to elements connected to the connection line 530, Rm 531 and Rm 533 which are resistance components of the connection line 530 correspond to Rm 431 and Rm 433, respectively, Cm 532 corresponds to Cm 432, and a ground point 536 corresponds to the ground point 436.

The communication system 500 has: the following property.

For example, the larger the value of Cte 514 (the higher the capacitance), the larger signal the transmitter 510 can apply to the connection line 530 corresponding to the communication medium 430. In addition, the larger the value of Ctg 512 (the higher the capacitance), the larger signal the transmitter 510 can apply to the connection line 530. Furthermore, the smaller the value of Ctb 517-1 (the lower the capacitance), the larger signal the transmitter 510 can apply to the connection line 530. In addition, the smaller the value of Cth 512-2 (the lower the capacitance), the larger signal the transmitter 510 can apply to the connection line 530. Furthermore, the smaller the value of Cti 517-3 (the lower the capacitance), the larger signal the transmitter 510 can apply to the connection line 530.

The larger the value of Cre 524 (the higher the capacitance), the larger signal the receiver 520 can extract from the connection line 530 corresponding to the communication medium 430. In addition, the larger the value of Crg 525 (the higher the capacitance), the larger signal the receiver 520 can extract from the connection line 530. Furthermore, the smaller the value of Crb 527-1 (the lower the capacitance), the larger signal the receiver 520 can extract from the connection line 530. In addition, the smaller the value of Cth 527-2 (the lower the capacitance), the larger signal the transmitter 530 can extract from the connection line 530. Furthermore, the smaller the value of Cri 527-3 (the lower the capacitance), the larger signal the receiver 520 can extract from the connection line 530. In addition, the lower the value of Rr 523 (the lower the resistance), the larger signal the receiver 520 can extract from the connection line 530.

The lower the values of Rm 531 and Rm 533 which are the resistance components of the connection line 530 (the lower the resistances), the larger signal the transmitter 510 can apply to the connection line 530. The smaller the value of Cm 532 which is the capacitance of the connection line 530 with respect to the space (the lower the capacitance), the larger signal the transmitter 510 can apply to the connection line 530.

The capacitance of a capacitor is approximately proportional to the surface area of each of its electrodes, and in general, it is more desirable that each of the electrodes have a larger size. However, if the sizes of the respective electrodes are simply increased, there is a risk that the capacitance between the electrodes also increase. In addition, if the ratio of the sizes of the respective is extreme, there is a risk that the efficiency of the capacitor lowers. Accordingly, the sizes and the arrangement locations of the respective electrodes need be determined on the basis of the balance of the entire system.

In addition, the above-mentioned property of the communication system 500 makes it possible to realize efficient communication in a high frequency bandwidth of the signal source 513-1 by determining the parameters of the present equivalent circuit by an impedance-matching approach. By increasing the frequency, it is possible to ensure reactance even with a small capacitance, so that it is possible to easily miniaturize each of the devices.

In general, the reactance of a capacitor increases with a decrease in frequency. On the other hand, since the communication system 500 operates on the basis of capacitive coupling, the lower limit of the frequency of a signal generated by the signal source 513-1 is determined by the capacitive coupling. In addition, since Rm 531, Rm 532 and Rm 533 form a low-pass filter through their arrangement, the upper limit of the frequency is determined by the characteristic of the low-pass filter.

Figure 10:
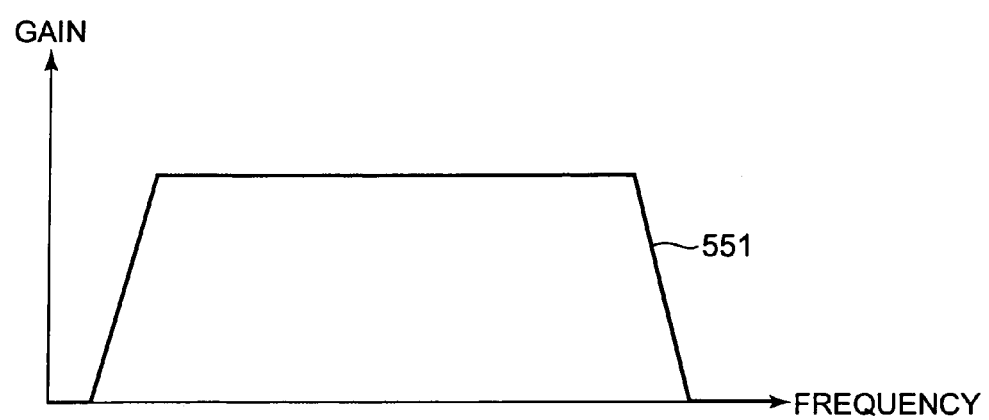
FIG. 10 is a graph showing an example of a frequency characteristic of the communication system shown in FIG. 9.

Specifically, the frequency characteristic of the communication system 500 is as indicated by a curve 551 in the graph shown in FIG. 10. In FIG. 10, the horizontal axis represents frequency, and the vertical axis represents the gain of the entire system.

Specific values of the respective parameters of each of the communication system 400 shown in FIG. 4 and the communication system 500 shown in FIG. 9 will be considered below. In the following description, for convenience of explanation, it is assumed that the communication system 400 (the communication system 500) is placed in the air. Each of the transmission signal electrode 411, the transmission reference electrode 412, the reception signal electrode 421 and the reception reference electrode 422 of the communication system 400 is assumed to be a conductive disk of diameter 5 cm.

In the communication system 400 shown in FIG. 5, if the distance d between the transmission signal electrode 411 and the communication medium 430 is 5 mm, the value of the capacitance Cte 414 formed by the transmission signal electrode 411 and the communication medium 430 can be found by using the above-mentioned formula (9), as shown in the following formula (18):

[Formula 18]

$$Cte = \frac{(8.854 \times 10^{-12}) \times (2 \times 10^{-3})}{5 \times 10^{-3}} \approx 3.5 \ [pF] \quad (18)$$

It is assumed herein that Formula (9) can be adapted to Ctb 417-1 which is the capacitance between the electrodes (Ctg 517-1 in FIG. 9). As mentioned above, formula (9) is to be originally applied to the case where the surface area of the electrodes is sufficiently large compared to the distance therebetween. However, in the case of the communication system 400, the value of Ctb 417-1 is assumed to be able to be found by using formula (9), because the value of the capacitance Ctb 417-1 between the transmission signal electrode 411 and the transmission reference electrode 412, which is found by using formula (9), sufficiently approximates its original correct value so that a problem does not arise in the explanation of principles. If the distance between the electrodes is assumed to be 5 cm, Ctb 417-1 (Ctb 517-1 in FIG. 9] is as expressed by the following formula (19):

[Formula 19]

$$Ctb = \frac{(8.854 \times 10^{-12}) \times (2 \times 10^{-3})}{5 \times 10^{-2}} \approx 0.35 \ [pF] \quad (19)$$

If it is assumed that the distance between the transmission signal electrode 411 and the communication medium 430 is narrow, the coupling of the transmission signal electrode 411 to the space is weak and the value of Cth 417-2 (Cth 517-2 in FIG. 9) is sufficiently smaller than the value of Cte 414 (Cte 514). Accordingly, the value of Cth 417-2 (Cth 517-2) is set to one-tenth of the value of Cte 414 (Cte 514) as expressed by formula (20)

[Formula 20]

$$Cth = \frac{Cte}{10} = 0.35 \ [pF] \quad (20)$$

Cteg 415 (Ctg 515 in FIG. 9) which denotes a capacitance formed by the transmission reference electrode 412 and the space can be found from the following formula (21), as in the case of FIG. 4 (formula (12)):

[Formula 21]

$$Ctg = 8 \times 8.854 \times 10^{-12} \times 2.5 \times 10^{-2} \approx 1.8 [PF] \quad (21)$$

The value of Cti 417-3 (the value of Cti 517-3 in FIG. 9) is considered equivalent to the value of Ctb 417-1 (Ctb 517-1 in FIG. 9) as follows:

$$Cti = Ctb = 0.35 [pF]$$

If the constructions of the respective electrodes (the sizes and the installation locations of the respective electrodes) are set as in the case of the transmitter 410, the parameters of the receiver 420 (the receiver 520 shown in FIG. 9) can be set similarly to the parameters of the transmitter 410 as follows:

$Cre=Cte=3.5[pF]$ $Crb=Ctb=0.35[pF]$ $Crh=Cth=0.35[pF]$ $Crg=Ctg=1.8[pF]$ $Cri=Cti=0.35[pF]$

In the following description, for convenience of explanation, it is assumed that the communication medium 430 (the connection line 530 shown in FIG. 9) is an object having characteristics close to a living body having approximately the same size as a human body. It is assumed that the electrical resistance from the location of the transmission signal electrode 411 of the communication medium 430 to the location of the reception signal electrode 421 (from the location of a transmission signal electrode 511 to the location of a reception signal electrode 521 in FIG. 9) is 1M [Ω], and that the value of each of Rm 431 and the Rm 433 (Rm 531 and Rm 533 in FIG. 9) is 500 K [Ω]. In addition, it is assumed that the value of the capacitance Cm 432 (Cm 532 in FIG. 9] formed between the communication medium 430 and the space is 100 [pF].

Furthermore, it is assumed that the signal source 413-1 (the signal source 513-1 in FIG. 9) outputs a sine wave having a maximum value of 1 [V] and a frequency of 10M [Hz].

Figure 11:
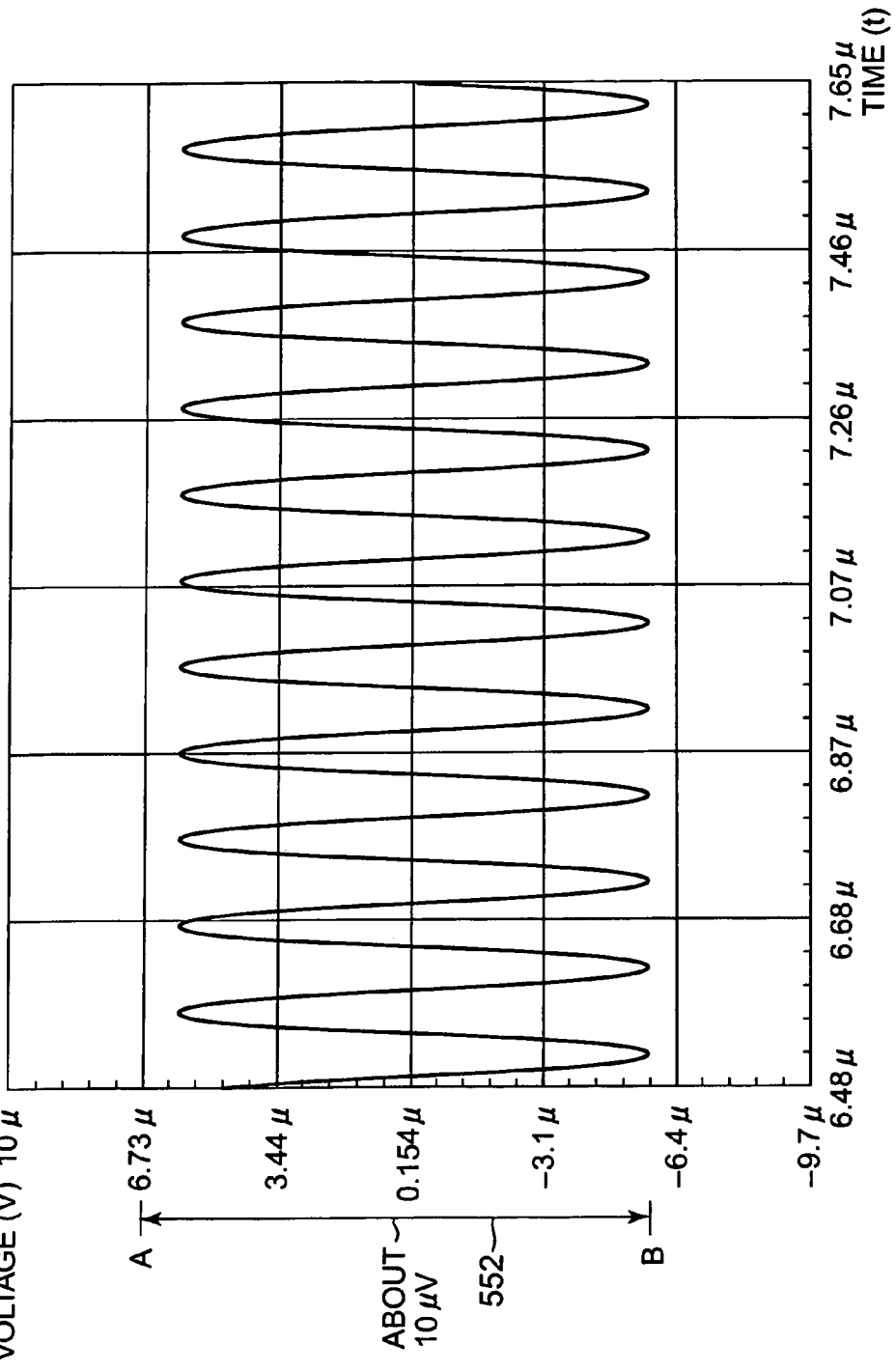
FIG. 11 is a graph showing an example of a signal received by a receiver.

When a simulation is performed by using the above-mentioned parameters, a received signal having the waveform shown in FIG. 11 is obtained as the result of the simulation. In the graph shown in FIG. 11, the vertical axis represents the voltage across Rr 423-1 (Rr 523-1) which is a reception load of the receiver 420 (the receiver 520 shown in FIG. 9), while the horizontal axis represents time. As indicated by an double-headed arrow 525 in FIG. 11, the difference between a maximum value A and a minimum value B (the difference between peak values) of the waveform of the received signal is observed as approximately 10 [µF] Accordingly, since this difference is amplified by an amplifier having sufficient gain (the detector 423-2), the signal on the transmission side (the signal generated by the signal source 413-1) can be restored on the reception side.

Accordingly, the above-mentioned communication system does not need a physical reference point path and can realize communication based on only a communication signal transmission path, so that it is possible to easily provide communication environments not restricted by use environments.

The arrangement of the electrodes in each of the transmission and receivers will be described below. As mentioned above, the respective electrodes have mutually different functions, and form capacitances with respect to the communication medium, the spaces and the like. Namely, the respective electrodes are capacitively coupled to different objects, and operate by using different capacitive couplings. Accordingly, a method of arranging the electrodes is a very important factor in effectively capacitively coupling the respective electrodes to the desired objects.

For example, in the communication system 400 shown in FIG. 5, if communication is to be efficiently performed between the transmitter 410 and the receiver 420, the individual electrodes need be arranged on the following conditions; that is to say, the devices 410 and 420 need satisfy, for example, the conditions that both the capacitance between the transmission signal electrode 411 and the communication medium 430 and the capacitance between the reception signal electrode 421 and the communication medium 430 are sufficient, that both the capacitance between the transmission reference electrode 412 and the space and the capacitance between the reception reference electrode 422 and the space are sufficient, that the capacitance between the transmission signal electrode 411 and the transmission reference electrode 412 and the capacitance between the reception signal electrode 421 and the reception reference electrode 422 are respectively smaller than the capacitance between the transmission signal electrode 411 and the communication medium 430 and the capacitance between the reception signal electrode 421 and the communication medium 430, and that the capacitance between the transmission signal electrode 411 and the space and the capacitance between the reception signal electrode 421 and the space are respectively smaller than the capacitance between the transmission reference electrode 412 and the space and the capacitance between the reception reference electrode 422 and the space.

Figure 12:
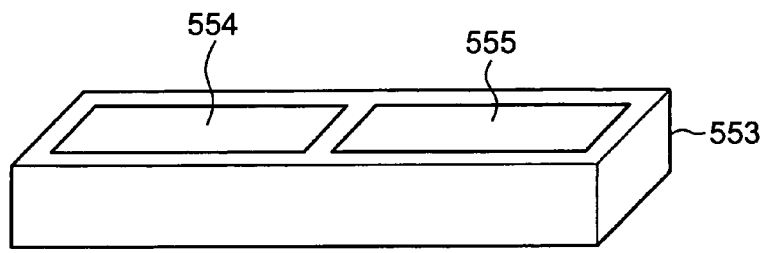
FIG. 12 is a schematic view showing an example of locations at which individual electrodes are disposed.

Arrangement examples of transmission and reception electrodes are shown in FIGS. 12 to 18. In the following description, reference will be made to a transmitter. Referring to FIG. 12, two electrodes, i.e., a transmission signal electrode 554 and a transmission reference electrode 555, are arranged on the same plane of a casing 553. According to this construction, it is possible to decrease the capacitance between the two electrodes (the transmission signal electrode 554 and the transmission reference electrode 555), as compared with the case where the two electrodes are arranged to oppose each other. If the transmitter constructed in this manner is used, only one of the two electrodes is arranged close to a communication medium. For example, a folding mobile telephone has the casing 553 made of two units and a hinge section, and is constructed so that the two units are joined by the hinge section with the relative angle between the two units being variable and so that the casing 553 is foldable on the hinge section in the vicinity of its lengthwise center. If the electrode arrangement shown in FIG. 12 is applied to the folding mobile telephone, one of the electrodes can be arranged on the back side of a section provided with operating buttons, while the other electrode is arranged on the back side of a section provided with a display section. According to this arrangement, the electrode arranged in the section provided with operating buttons is covered with a hand of a user, and the electrode provided on the back side of the display section is arranged to face space; that is to say, it is possible to arrange the two electrode so as to satisfy the above-mentioned conditions.

Figure 13:
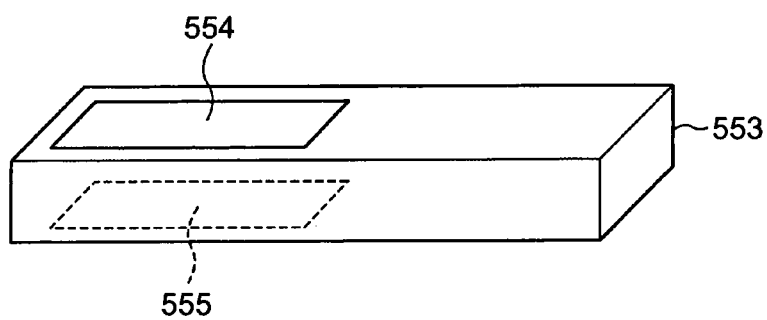
FIG. 13 is a schematic view showing another example of locations at which individual electrodes are disposed.

FIG. 13 is a schematic view showing the casing 553 in which the two electrodes (the transmission signal electrode 554 and the transmission reference electrode 555) are arranged to oppose each other. As compared with the arrangement shown in FIG. 12, the arrangement shown in FIG. 13 is suitable for the case where the casing 553 is comparatively small in size, although the capacitive coupling between the two electrodes is strong. In this case, it is desirable to arrange the respective two electrodes in directions spaced apart from each other by as much distance as possible in the casing 553.

Figure 14:
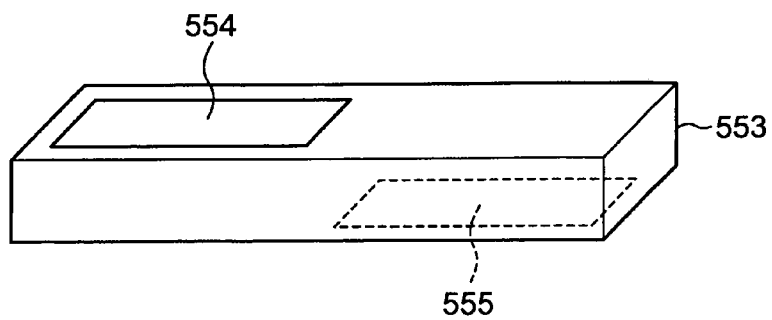
FIG. 14 is a schematic view showing another example of locations at which individual electrodes are disposed.

FIG. 14 is a schematic view showing the casing 553 in which the two electrodes (the transmission signal electrode 554 and the transmission reference electrode 555) are respectively arranged on mutually opposite faces so as not to directly oppose each other. In the case of this arrangement, the capacitive coupling between the two electrodes is smaller than that between the two electrodes shown in FIG. 13.

Figure 15:
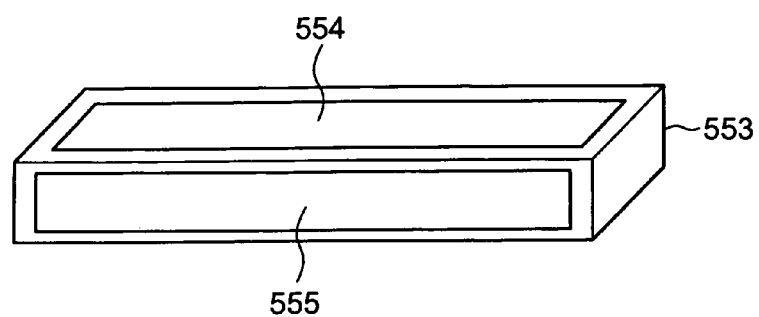
FIG. 15 is a schematic view showing another example of locations at which individual electrodes are disposed.

FIG. 15 is a schematic view showing the casing 553 in which the two electrodes (the transmission signal electrode 554 and the transmission reference electrode 555) are arranged perpendicular to each other. According to this arrangement, in uses where the transmission signal electrode 554 and the side of the casing 553 opposed thereto are placed near a communication medium, a lateral side of the casing 553 (a side on which the transmission reference electrode 555 is arranged) remains capacitively coupled to space, so that communication can be performed.

Figure 16B:
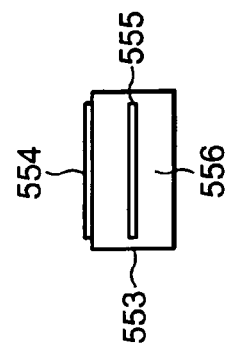
FIG. 16B is a schematic view showing another example of locations at which individual electrodes are disposed.
Figure 16A:
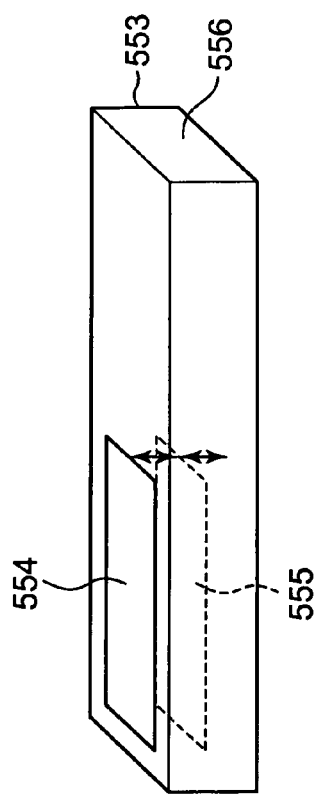
FIG. 16A is a schematic view showing another example of locations at which individual electrodes are disposed.

FIGS. 16A and 16B are schematic views showing that the transmission reference electrode 555 which is either one of the two electrodes in the arrangement shown in FIG. 13 is arranged inside the casing 553. Specifically, as shown in FIG. 16A, only the transmission reference electrode 555 is provided inside the casing 553. FIG. 16B is a schematic view showing an example of an electrode position as viewed from a side 556 of FIG. 16A. As shown in FIG. 16B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because the space inside the casing 553 exists around either one of the electrodes.

FIGS. 17A and 17B are schematic views showing that the transmission reference electrode 555 which is either one of the two electrodes in the arrangement shown in each of FIGS. 12 and 14 is arranged inside the casing 553. Specifically, as shown in FIG. 17A, only the transmission reference electrode 555 is provided inside the casing 553. FIG. 17B is a schematic view showing an example of an electrode position as viewed from the side 556 of FIG. 17A. As shown in FIG. 17B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

FIGS. 18A and 18B are schematic views showing that either one of the two electrodes in the arrangement shown in FIG. 15 is arranged inside the casing. Specifically, as shown in FIG. 18A, only the transmission reference electrode 555 is provided inside the casing 553. FIG. 18B is a schematic view showing an example of an electrode position as viewed from the side 556 of FIG. 18A. As shown in FIG. 18B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

In any of the above-mentioned electrode arrangements, one of the two electrodes is arranged closer to a communication medium than the other is, and the one is arranged to have a stronger capacitive coupling to space. In addition, in each of the electrode arrangements, the two electrodes are desirably arranged so that the capacitive coupling therebetween is weaker than the other capacitive couplings.

Figure 19A:
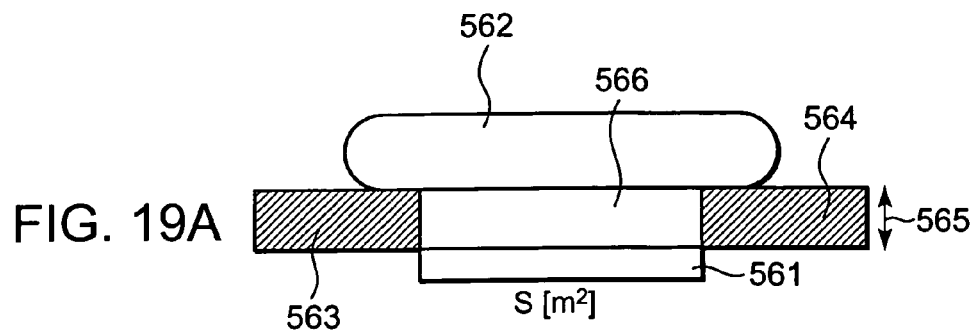
FIG. 19A is a schematic view showing another example of locations at which individual electrodes are disposed.
Figure 19B:
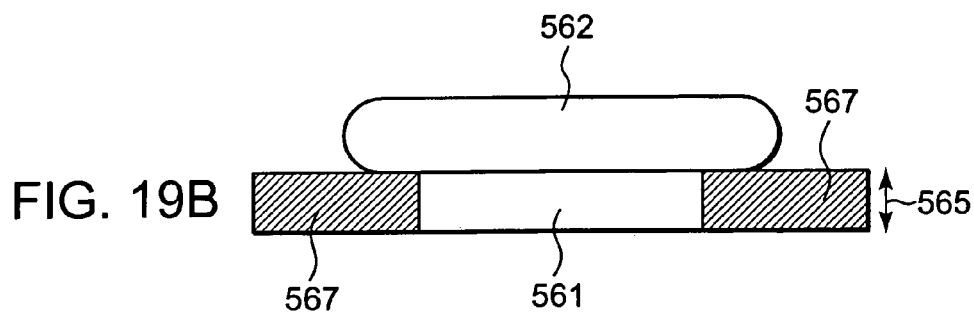
FIG. 19B is a schematic view showing another example of locations at which individual electrodes are disposed.

The transmitter or the receiver may also be incorporated in an arbitrary casing. In each of the devices according to the embodiment of the present invention, there are at least two electrodes which are electrically isolated from each other, so that a casing in which to incorporate the electrodes is also made of an insulator having a certain thickness. FIGS. 19A to 19B are cross-sectional views of a transmission signal electrode and neighboring sections. A transmission reference electrode, a reception signal electrode and a reception reference electrode have a similar construction to the transmission signal electrode, and the above description can be applied to any of those electrodes. Accordingly, the description of those electrodes is omitted herein.

FIG. 19A shows an example in which a transmission signal electrode 561 and a communication medium 562 are constructed so as to maintain a certain distance therebetween. Specifically, a spacer 563 and a spacer 564 are provided around the transmission signal electrode 561. Accordingly, even if a casing including the transmission signal electrode 561 is brought into contact with the communication medium 562, a distance d [m] as indicated by a double-headed arrow 565 is maintained between the transmission signal electrode 561 and the communication medium 562. Namely, a space 566 is formed between the transmission signal electrode 561 and the communication medium 562.

The capacitive coupling C between the transmission signal electrode 561 and the communication medium 562 in this case can be found from formula (9), and can therefore be expressed by the following formula (22). However, as mentioned previously, formula (9) is a mathematical formula to be applied to the case where parallel plates have the same area, but since formula (9) does not provide a seriously impaired result even when applied to the case where parallel plates have different areas, the following formula (22) is derived:

[Formula 22]

$$C = (\varepsilon_r \times \varepsilon_0) \times \frac{S}{d} \quad [F] \tag{22}$$

In formula (22), $\epsilon 0$ denotes a vacuum dielectric constant having a fixed value of $8.854 \times 10^{-12}$ [F/m], $\epsilon r$ denotes a specific dielectric constant at that location, and S denotes a surface area of the transmission signal electrode 561. If a dielectric having a high specific dielectric constant is arranged in the space 566 formed above the transmission signal electrode 561, the capacitive coupling C can be increased to improve the performance of the device.

In a similar manner, it is possible to increase the capacitance between the transmission signal electrode 561 and the neighboring space. The spacer 563 and the spacer 564 may also be constructed as part of the casing.

FIG. 19B shows an example in which the transmission signal electrode 561 is embedded in a casing 567. In this construction, the communication medium 562 is in contact with the casing 567 as well as the transmission signal electrode 561. In addition, an insulation layer may also be formed on the surface of the transmission signal electrode 561 so that the communication medium 562 and the transmission signal electrode 561 can be held in noncontact with each other.

Figure 19C:
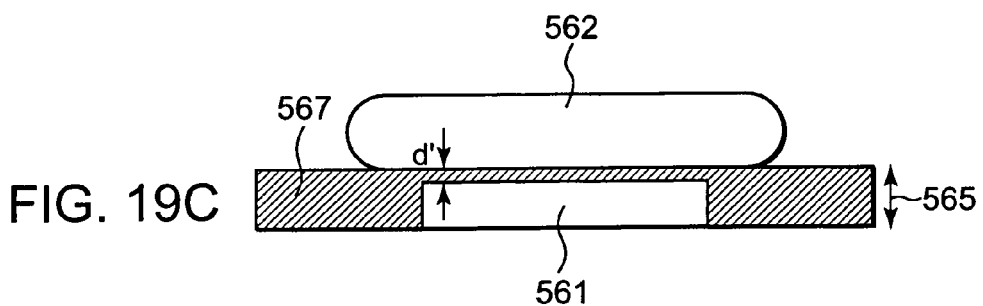
FIG. 19C is a schematic view showing another example of locations at which individual electrodes are disposed.

FIG. 19C is similar to FIG. 19B but shows an example in which a hollow having an opening area equivalent to the surface area of the transmission signal electrode 561 is formed in the casing 567 with a thickness d' being left, and the transmission signal electrode 561 is embedded in the hollow. If the casing 567 is formed by solid casting, manufacturing costs and component costs can be reduced and capacitive coupling can be easily increased by the present method.

The sizes of individual electrodes will be described below. At least a transmission reference electrode and a reception reference electrode need to form a capacitance relative to a sufficient space so that a communication medium can obtained a sufficient potential, but a transmission signal electrode and a reception signal electrode may be designed to have optimum sizes on the basis of a capacitance relative to the communication medium and the property of signals to flow in the communication medium. Accordingly, generally, the transmission reference electrode is made larger in size than the transmission signal electrode, and the reception reference electrode is made larger in size than the reception signal electrode. However, it is of course possible to adopt other relationships as long as sufficient signals for communication can be obtained.

Specifically, if the size of the transmission reference electrode is made coincident with the size of the transmission signal electrode and the size of the reception reference electrode is made coincident with the size of the reception signal electrode, these electrodes appear to have mutually equivalent characteristics, as viewed from a reference point which is an infinite point. Accordingly, there is the advantage that whichever electrode may be used as a reference electrode (or a signal electrode) (even if a reference electrode and a signal electrode are arranged to be able to be switched therebetween) it is possible to obtain equivalent communication performance.

In other words, there is the advantage that if the signal electrode and the reference electrode are designed to have mutually different sizes, communication can be performed only when one of the electrodes (an electrode which is set as a signal electrode) is moved close to the communication medium.

Shields of circuits will be described below. In the above description, a transmitter section and a receiver section other than electrodes have been regarded as transparent in the consideration of the physical construction of a communication system, but it is actually general that the communication system is constructed by using electronic parts and the like. Electronic parts are made of materials having some electrical property such as conductivity or dielectricity, and such electronic parts exist near the electrodes and influence the operation of the electrodes. In the embodiment of the present invention, since capacitive couplings and the like in space have various influences, an electronic circuit itself mounted on a circuit board is exposed to such influences. Accordingly, if a far more stable operation is needed, it is desirable to shield the entire circuit with a conductor.

A shielding conductor is generally considered to be connected to a transmission reference electrode or a reception reference electrode which also serves as a reference potential for a transmission or receiver, but if there is no problem in operation, the shielded conductor may be connected to a transmission signal electrode or a reception signal electrode. Since the shielding conductor itself has a physical size, it is necessary to take account of the fact that the shielding conductor operates in mutual relationships to other electrodes, communication media and spaces in accordance with the above-mentioned principles.

Figure 20:
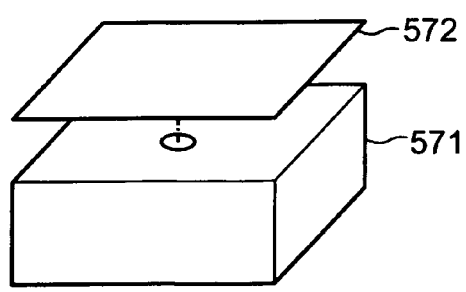
FIG. 20 is a schematic view showing another construction example of an electrode.

FIG. 20 shows an embodiment of a shielding construction. In this embodiment, the device is assumed to operate on a battery, and electronic parts inclusive of the battery are housed in a shield case 571 which also serves as a reference electrode. An electrode 572 is a signal electrode.

Transmission media will be described below. In the above description of the embodiments, reference has been made to conductors as a main example of a communication medium, but a dielectric having no conductivity also enables communication. This is because electric fields injected into the communication medium from a transmission signal electrode are propagated by the polarizing action of the dielectric.

Specifically, a metal such as electric wire is available as a conductor and pure water or the like is available as a dielectric, but a living body, a physiological saline solution or the like having both natures also enable communication. In addition, vacuum and air also have dielectricity and are communicable to serve as a communication medium.

Noise will be described below. In space, potential varies due to various factors such as noise from an AC power source, noise from a fluorescent lamp, various consumer electrical appliances and electrical equipment, and the influence of charged corpuscles in the air. In the above description, potential variations have been neglected, but these noises penetrate each section of the transmitter, the communication medium and the receiver.

Figure 21:
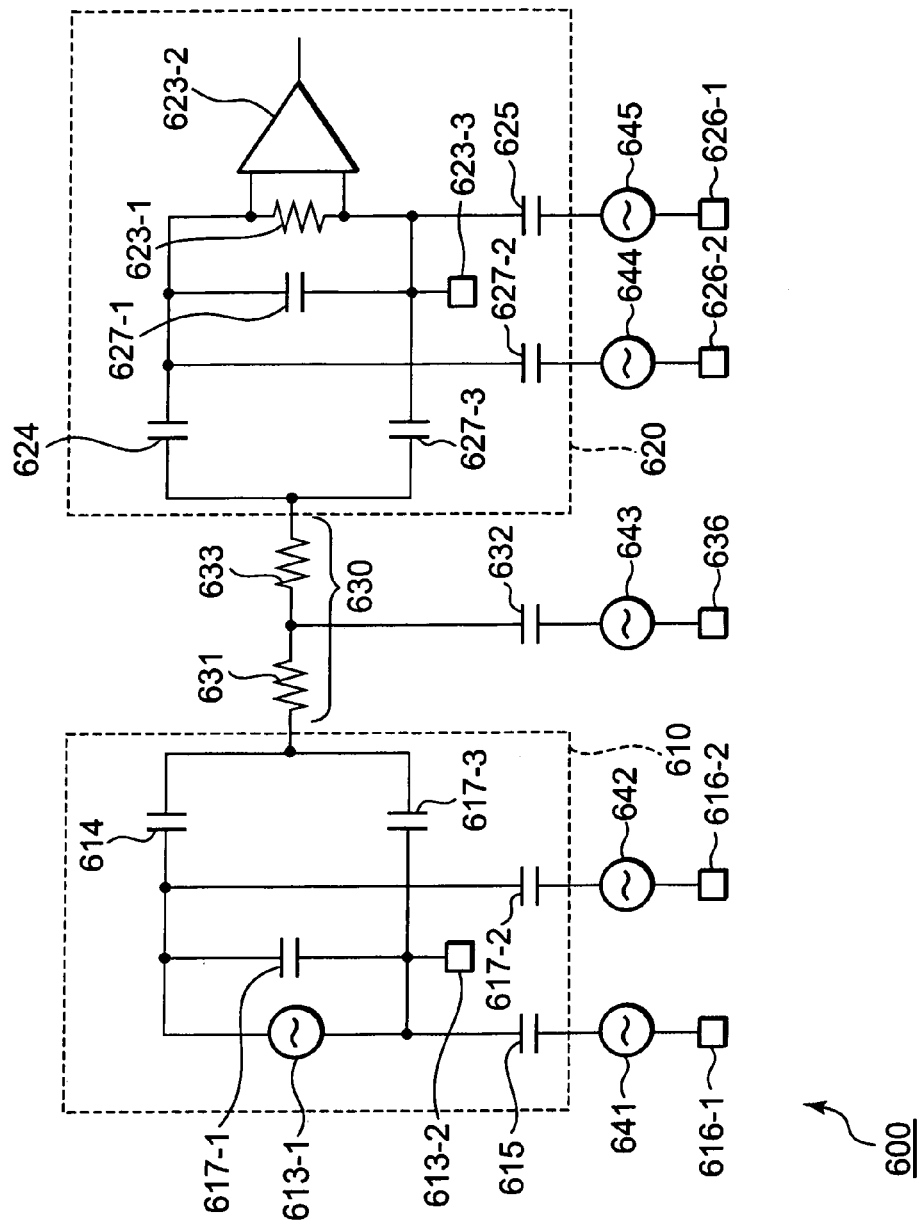
FIG. 21 is a diagram showing another example of an equivalent circuit of the model shown in FIG. 5.

FIG. 21 is a diagram showing an equivalent circuit of the communication system 100 shown in FIG. 1, inclusive of noise components. A communication system 600 shown in FIG. 21 corresponds to the communication system 500 shown in FIG. 9, a transmitter 610 of the communication system 600 corresponds to the transmitter 510 of the communication system 500, a receiver 620 corresponds to the receiver 520, and a connection line 630 corresponds to the connection line 530.

In the transmitter 610, a signal source 613-1, a ground point 613-2, Cte 614, Ctg 615, aground point 616-1, aground point 616-2, Ctb 617-1, Cth 617-2 and Cti 617-3 respectively correspond to the signal source 513-1, the ground point 513-2, Cte 514, Ctg 515, the ground point 516-1, the ground point 516-2, Ctb 517-1, Cth 517-2, and Cti 517-3 in the transmitter 510. Unlike the case shown in FIG. 9, in the transmitter 610, two signal sources, i.e., a noise 641 and a noise 642, are respectively provided between Ctg 615 and a ground point 616-1 and between Cth 617-2 and a ground point 616-2.

In the receiver 620, Rr 623-1, a detector 623-2, a ground point 623-3, Cre 624, Crg 625, a ground point 626-1, a ground point 626-2, Crb 627-1, Crh 627-2 and Cri 627-3 respectively correspond to Rr 523-1, the detector 523-2, the ground point 523-3, Cre 524, Crg 525, the ground point 526-1, the ground point 526-2, Crb 527-1, Crh 527-2, and Cri 527-3 in the receiver 520. Unlike the case shown in FIG. 9, in the receiver 620, two signal sources, i.e., a noise 644 and a noise 645, are respectively provided between Crh 627-2 and a ground point 626-2 and between Crg 625 and a ground point 626-1.

Rm 631, Cm 632, Rm 633 and a ground point 636 in the connection line 630 respectively correspond to Rm 531, Cm 532, Rm 533 and the ground point 536 in the connection line 530. Unlike the case shown in FIG. 9, in the connection line 630, a signal source which serves as a noise 643 is provided between Cm 632 and the ground point 636.

Each of the devices operates on the basis of the ground point 613-2 or 623-3 which is the ground potential of itself, so that if noises penetrating the devices have relatively the same components relative to the transmitter, the communication medium and the receiver, such noises have no influence in operation. On the other hand, particularly in a case where the distance between the devices is apart or in an environment where there is an amount of noise, there is a high possibility that a relative difference in noise occurs between the devices; that is to say, the motions of the noises 641 to 645 differ from one another. This difference has no problem if it is not accompanied by a temporal variation, because the relative difference between signal levels to be used need only be transmitted. However, in a case where the variation cycles of the respective noises overlap a frequency band to be used, a frequency and signal levels to be used need be determined to take the characteristics of the noises into account. In other words, if a frequency and signal levels to be used are only determined while taking noise characteristics into account, the communication system 600 can realize communication which has resistance to noise components and is based on only a communication signal transmission path without the need for a physical reference point path. Accordingly, it is possible to provide a communication environment which is not easily restricted by use environments.

The influence of the magnitude of distance between the transmitter and the receiver on communication will be described below. As mentioned previously, according to main features of the present invention, if a sufficient capacitance is formed in the space between the transmission reference electrode and the reception reference electrode, communication does not need a path due to the ground near the transmission and receivers or other electrical paths, and does not depend on the distance between the transmission signal electrode and the reception signal electrode. Accordingly, for example, in a communication system 700 shown in FIG. 22, if a transmitter 710 and a receiver 720 are spaced a long distance apart from each other, it is possible to perform communication by capacitively coupling a transmission signal electrode 711 and a reception signal electrode 721 by a communication medium 730 having a sufficient conductivity or dielectricity. At this time, a transmission reference electrode 712 is capacitively coupled to a space outside the transmitter 710, and a reception reference electrode 722 is capacitively coupled to a space outside the receiver 720. Accordingly, the transmission reference electrode 712 and the reception reference electrode 722 need not be capacitively coupled to each other. However, as the communication medium 730 becomes longer or larger, the capacitance of the communication medium 730 to space increases, so that it is necessary to take the capacitance into account when each parameter is to be determined.

Figure 22:
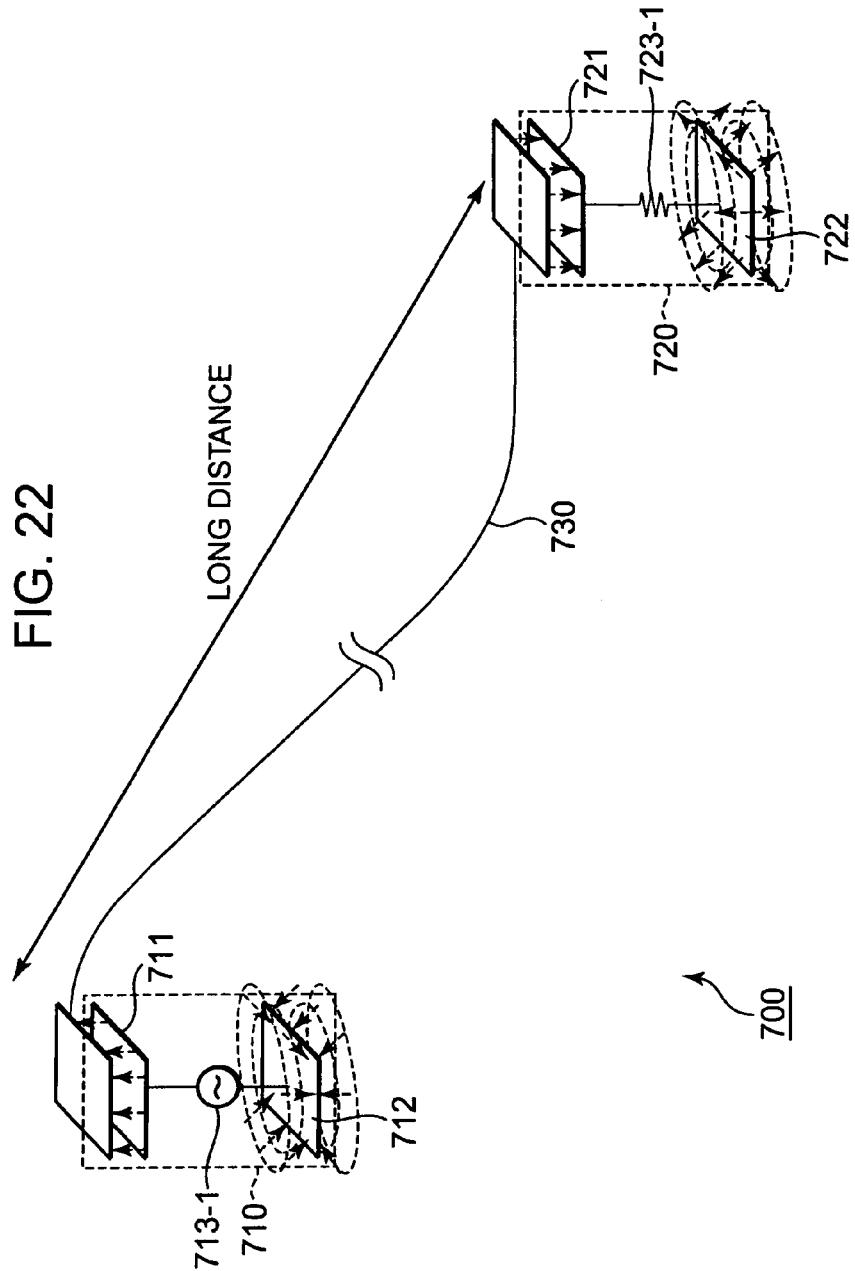
FIG. 22 is a diagram showing an arrangement example of the communication system shown in FIG. 1.

The communication system 700 shown in FIG. 22 is a system corresponding to the communication system 100 shown in FIG. 1, and the transmitter 710 corresponds to the transmitter 110, the receiver 720 corresponds to the receiver 120, and the communication medium 730 corresponds to the communication medium 130.

In the transmitter 710, the transmission signal electrode 711, the transmission reference electrode 712 and a signal source 713-1 respectively correspond to the transmission signal electrode 111, the transmission reference electrode 112 and (part of) the transmitter section 113. Similarly, in the transmission reference electrode 712, the reception signal electrode 721, the reception reference electrode 722 and the Rr 723-1 respectively correspond to the reception signal electrode 121, the reception reference electrode 122 and (part of) the receiver section 123.

The description of each of the above-mentioned sections is, therefore, omitted herein.

As mentioned above, the communication system 700 can realize communication which is based on only a communication signal transmission path without the need for a physical reference point path. Accordingly, it is possible to provide a communication environment not restricted by use environments.

In the above description, the transmission signal electrode and the reception signal electrode have been mentioned as being in noncontact with the communication medium, but this construction is not limitative, and as long as a sufficient capacitance can be obtained between each of the transmission reference electrode and the reception reference electrode and the space neighboring the corresponding one of the transmission and receivers, the transmission signal electrode and the reception signal electrode may also be connected to each other by a communication medium having conductivity.

Figure 23:
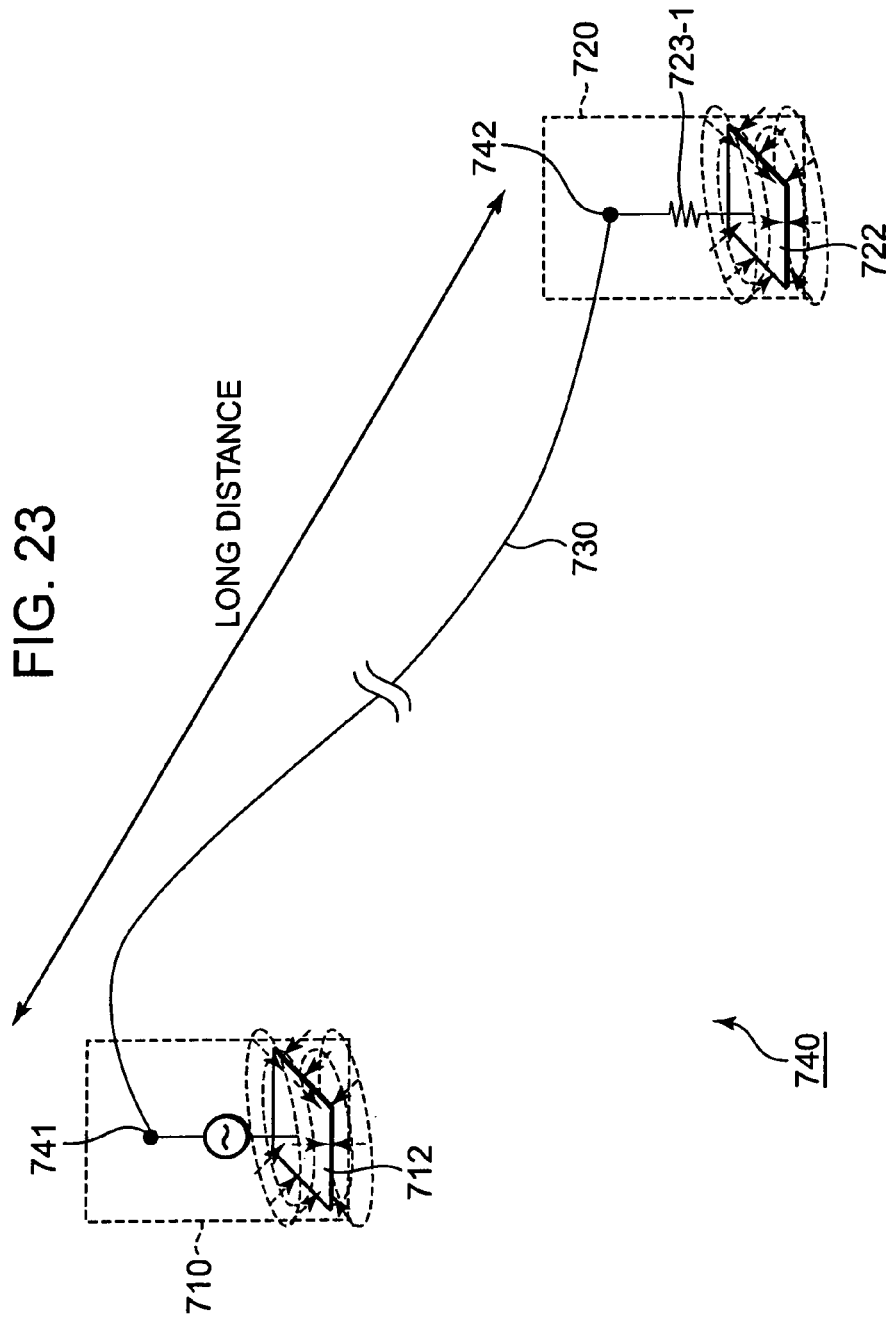
FIG. 23 is a diagram showing another construction example of the communication system which underlies the present invention.

FIG. 23 is a diagram aiding in explaining an example of a communication system in which a transmission reference electrode and a reception reference electrode are connected to each other via a communication medium.

In FIG. 23, a communication system 740 is a system corresponding to the communication system 700 shown in FIG. 22. In the case of the communication system 740, the transmission signal electrode 711 does not exist in the transmitter 710, and the transmitter 710 and the communication medium 730 are connected to each other at a contact 741. Similarly, in the receiver 720 in the communication system 740, the reception signal electrode 721 does not exist, and the receiver 720 and the communication medium 730 are connected to each other at a contact 742.

A typical wired communication system includes at least two signal lines and is constructed to perform communication by using the relative difference in level between the signals. On the other hand, in accordance with the present invention, communication can be performed through one signal line.

Namely, the communication system 740 can also realize communication which is based on only a communication signal transmission path without the need for a physical reference point path. Accordingly, it is possible to provide a communication environment which is free from possible limitations of use environments.

Figure 24:
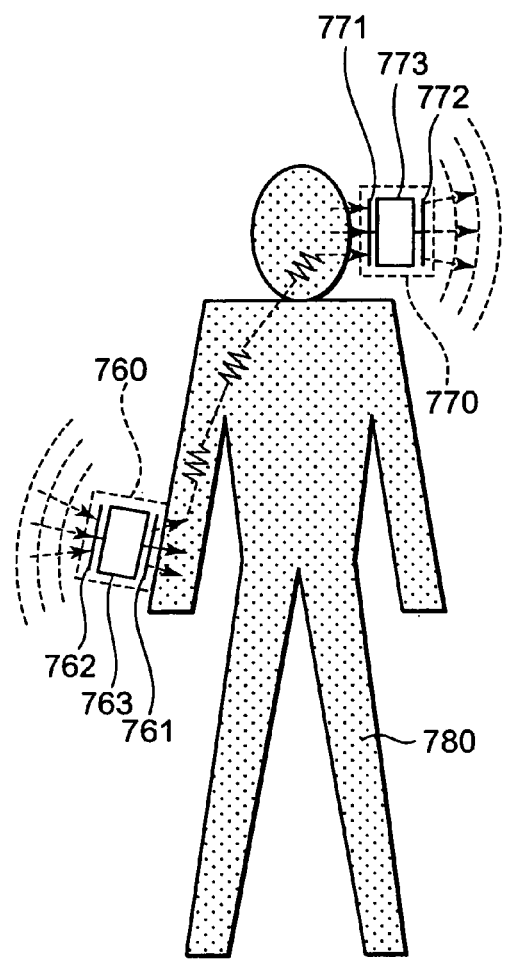
FIG. 24 is a schematic view showing an actual use example of the embodiment of the communication system which underlies the present invention.

Specific applied examples of the above-mentioned communication system will be described below. The communication system can use, for example, a living body as a communication medium. FIG. 24 is a schematic view showing an example of a communication system which performs communication via a living body. In FIG. 24, a communication system 750 is a system in which music data is transmitted from a transmitter 760 fitted to an arm of the body of a user and the music data is received and converted into sound by a receiver 770 fitted to the head of the body, and the sound is outputted so that the user can listen to the sound. The communication system 750 is a system corresponding to any of the above-mentioned communication systems (for example, the communication system 100), and the transmitter 760 and the receiver 770 correspond to the transmitter 110 and the receiver 120, respectively. In the communication system 750, a body 780 is a communication medium corresponding to the communication medium 130 shown in FIG. 1.

Namely, the transmitter 760 has a transmission signal electrode 761, a transmission reference electrode 762, and a transmitter section 763 which respectively correspond to the transmission signal electrode 111, the transmission reference electrode 112 and the transmitter section 113 shown in FIG. 1. The receiver 770 has a reception signal electrode 771, a reception reference electrode 772, and a receiver section 773 which respectively correspond to the reception signal electrode 121, the reception reference electrode 122 and the receiver section 123 shown in FIG. 1.

Accordingly, the transmitter 760 and the receiver 770 are arranged so that the transmission signal electrode 761 and the reception signal electrode 771 are brought into contact with or into close proximity to the body 780 which is a communication medium. Since the transmission reference electrode 762 and the reception reference electrode 772 may be in contact with space, there is no need for coupling to the ground around the devices nor for mutual coupling of the transmission and receivers (or electrodes).

Figure 25:
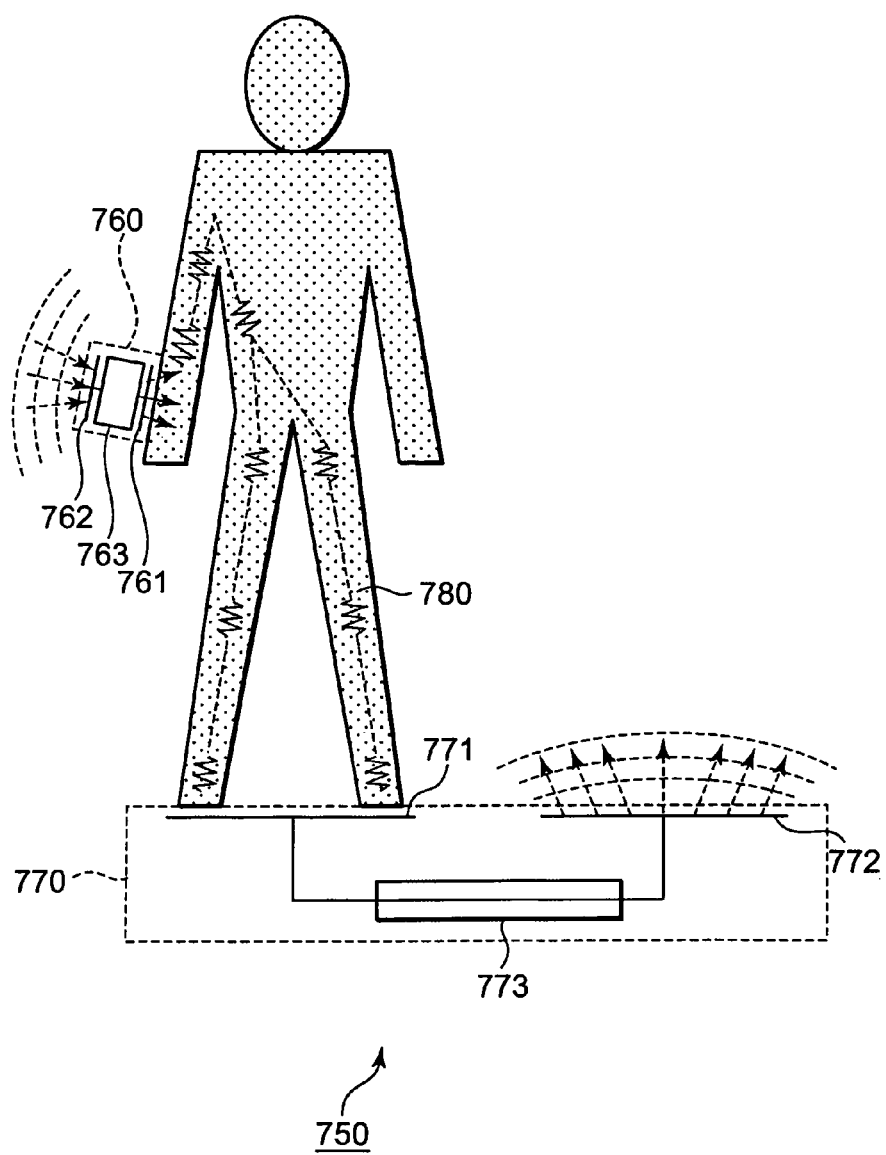
FIG. 25 is a schematic view showing another use example of the embodiment of the communication system which underlies the present invention.

FIG. 25 is a schematic view aiding in explaining another example which realizes the communication system 750. In FIG. 25, the receiver 770 is brought into contact with (or close proximity to) the soles of the body 780 and performs communication with the transmitter 760 fitted to an arm of the body 780. In this case well, the transmission signal electrode 761 and the reception signal electrode 771 are provided so as to be brought into contact with (or into close proximity to) the body 780 which is a communication medium, and the transmission reference electrode 762 and the reception reference electrode 772 are provided to face space. The example shown in FIG. 25 is particularly an applied example which could not have been realized by a prior art using the ground as one of communication media.

Namely, the above-mentioned communication system 750 can realize communication which is based on only a communication signal transmission path without the need for a physical reference point path. Accordingly, it is possible to provide a communication environment which is not restricted by use environments.

In each of the above-mentioned communication systems, the method of modulating signals to be transmitted through the communication medium is not limited to a particular method, and it is possible to select any optimum method on the basis of the characteristics of the entire communication system as long as the method can cope with both the transmitter section and the receiver. Specifically, as a modulation method, it is possible use any one of a baseband analog signal, an amplitude-modulated analog signal, a frequency-modulated analog signal and a baseband digital signal, or any one of an amplitude-modulated digital signal, a frequency-modulated digital sound and a phase-modulated digital signal, or a combination of a plurality of signals selected from among those signals.

In addition, each of the above-mentioned communication systems may be constructed to use one communication medium to establish a plurality of communications so that the communication system can execute communications such as full-duplex communication and communication between a plurality of devices through a single communication medium.

Examples of techniques for realizing such multiplex communications will be described below. The first technique is a technique using spread spectrum communication. In this case, a frequency bandwidth and a particular time series code are decided on between a transmitter and a receiver in advance. The transmitter varies the frequency of an original signal and spreads the original signal within the frequency bandwidth on the basis of the time series code, and transmits spread components. After having received the spread components, the receiver decodes the received signal by integrating the received signal.

Advantages obtainable by frequency spread will be described below. According to the Shannon-Hartley channel capacity theorem, the following formula is established:

[Formula 23]

$$C = B \times \log_2\left(1 + \frac{S}{N}\right) \text{ [bps]} \tag{23}$$

In formula (23), C [bps] denotes a channel capacity which indicates a theoretically maximum data rate which can be transmitted in a communication path. B [Hz] denotes a channel bandwidth. S/N denotes a signal-to-noise-power ratio (SN ratio) In addition, if the above formula (23) is Maclaurin-expanded to decrease the S/N ratio, the above formula (23) can be approximated by the following formula (24):

[Formula 24]

$$C \approx \frac{S}{N} \times B \text{ [bps]} \tag{24}$$

Accordingly, if S/N is not higher than, for example, a noise floor level, S/N<<1 is obtained, but the channel capacity C can be raised to a desired level by widening the channel bandwidth B.

If different time series codes are prepared for different communication paths so that frequency spreading is performed on the communication paths in different manners, their frequencies are spread without mutual interference, so that mutual interference can be suppressed to effect a plurality of communications at the same time.

Figure 26:
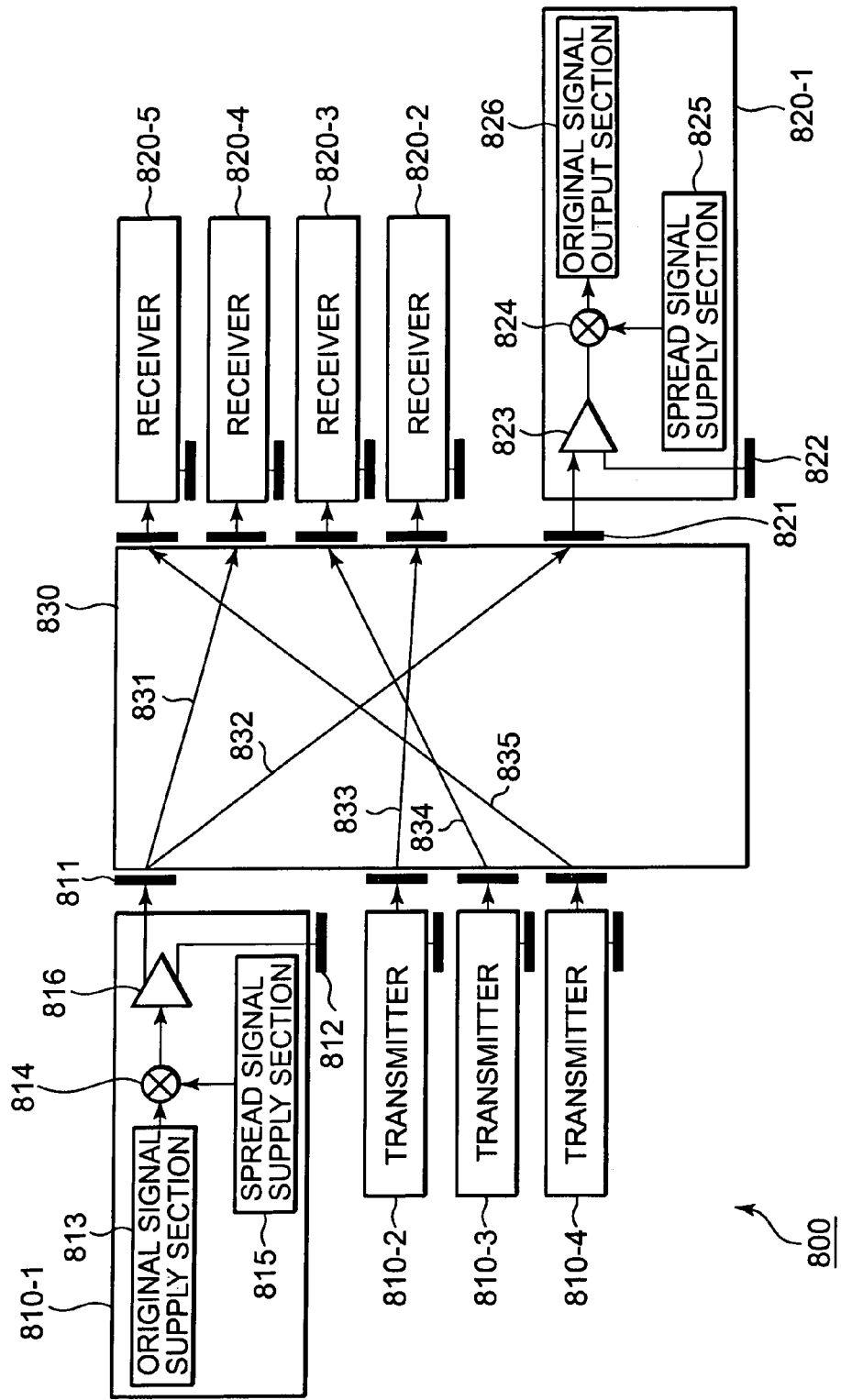
FIG. 26 is a schematic view showing another construction example of the communication system which underlies the present invention.

FIG. 26 is a diagram showing another construction example of the communication system which underlies the present invention. In a communication system 800 shown in FIG. 26, four transmitters 810-1 to 810-4 and five receivers 820-1 to 820-5 perform multiplex communications via a communication medium 830 by using a spread spectrum technique.

The transmitter 810-1 corresponds to the transmitter 110 shown in FIG. 1 and has a transmission signal electrode 811 and a transmission reference electrode 812, and further has, as a construction corresponding to the transmitter section 113, an original signal supply section 813, a multiplier 814, a spread signal supply section 815, and an amplifier 816.

The original signal supply section 813 generates an original signal which is a signal to be transmitted, and supplies the signal to the multiplier 814. The spread signal supply section 815 generates a spread signal which is a carrier for spreading the signal to be transmitted, over a predetermined frequency bandwidth, and supplies the spread signal to the multiplier 814. There are two representative spread techniques using spread signals, a direct sequence technique (hereinafter referred to as the DS technique) and a frequency hopping technique (hereinafter referred to as the FH technique). The DS technique is a technique which causes the multiplier 814 to perform multiplication on the time series code having a frequency component higher than at least the original signal. The result of the multiplication is carried on a predetermined carrier, and is outputted from the amplifier 816 after having been amplified by the same.

The FH technique is a technique which varies the frequency of a carrier by the time series code and generates a spread signal. The spread signal is multiplied by an original signal by the multiplier 814, and the multiplication result is outputted from the amplifier 816 after having been amplified by the same. One of the outputs of the amplifier 816 is connected to the transmission signal electrode 811, while the other is connected to the transmission reference electrode 812.

Each of the transmitters 810-2 to 810-4 is similar in construction to the transmitter 810-1, and since the description of the transmitter 810-1 is applicable, the repetition of the same description will be omitted.

The receiver 820-1 corresponds to the receiver 120 shown in FIG. 1, and has a reception signal electrode 821 and a reception reference electrode 822 and further has, as a construction corresponding to the receiver section 123, an amplifier 823, a multiplier 824, a spread signal supply section 825 and an original signal output section 826.

After the receiver 820-1 has first restored an electrical signal on the basis of the method according to the present invention, the receiver 820-1 restores the original signal (a signal supplied from the original signal supply section 813) by the signal processing opposite to that of the transmitter 810-1.

Figure 27:
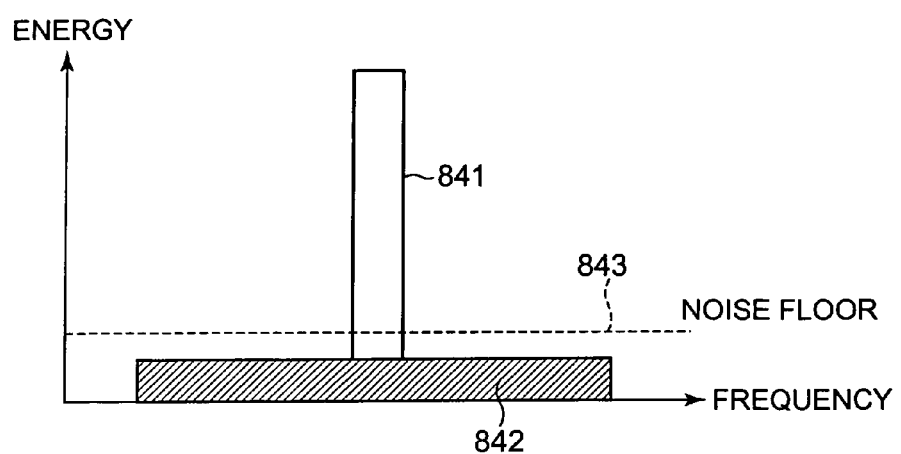
FIG. 27 is a graph showing an example of distribution of a frequency spectrum.

FIG. 27 shows a frequency spectrum due to such technique. The horizontal axis represents frequency, while the vertical axis represents energy. A spectrum 841 is a spectrum due to a technique based on a fixed frequency, and energy is concentrated at a particular frequency. This technique may not restore the signal if energy falls below a noise floor 843. On the other hand, a spectrum 842 is a spectrum based on a spread spectrum technique, and energy is spread over a wide frequency bandwidth. Since the area of the shown rectangle of the spectrum 842 can be regarded as denoting the total energy, the signal of the spectrum 842, although each frequency component thereof is below the noise floor 843, can be restored into the original signal by energy being integrated over the entire frequency bandwidth, so that communication can be performed.

By performing communication using the above-mentioned spread spectrum technique, the communication system 800 can perform simultaneous communications by using the same communication medium 830, as shown in FIG. 26. In FIG. 26, paths 831 to 835 denote communication paths on the communication medium 830. In addition, the communication system 800 can perform multiple-to-one communication as shown by the paths 831 and 832 as well as multiple-to-multiple communication by using the spread spectrum technique.

The second technique is a technique which causes a transmitter and a receiver to mutually decide on a frequency bandwidth and applies a frequency division technique for dividing the frequency bandwidth into a plurality of bands. In this case, the transmitter (or the receiver) performs allocation of a frequency band in accordance with particular rules of frequency allocation, or detects an idle frequency band at the time of start of communication and performs allocation of a frequency band on the basis of the detection result.

Figure 28:
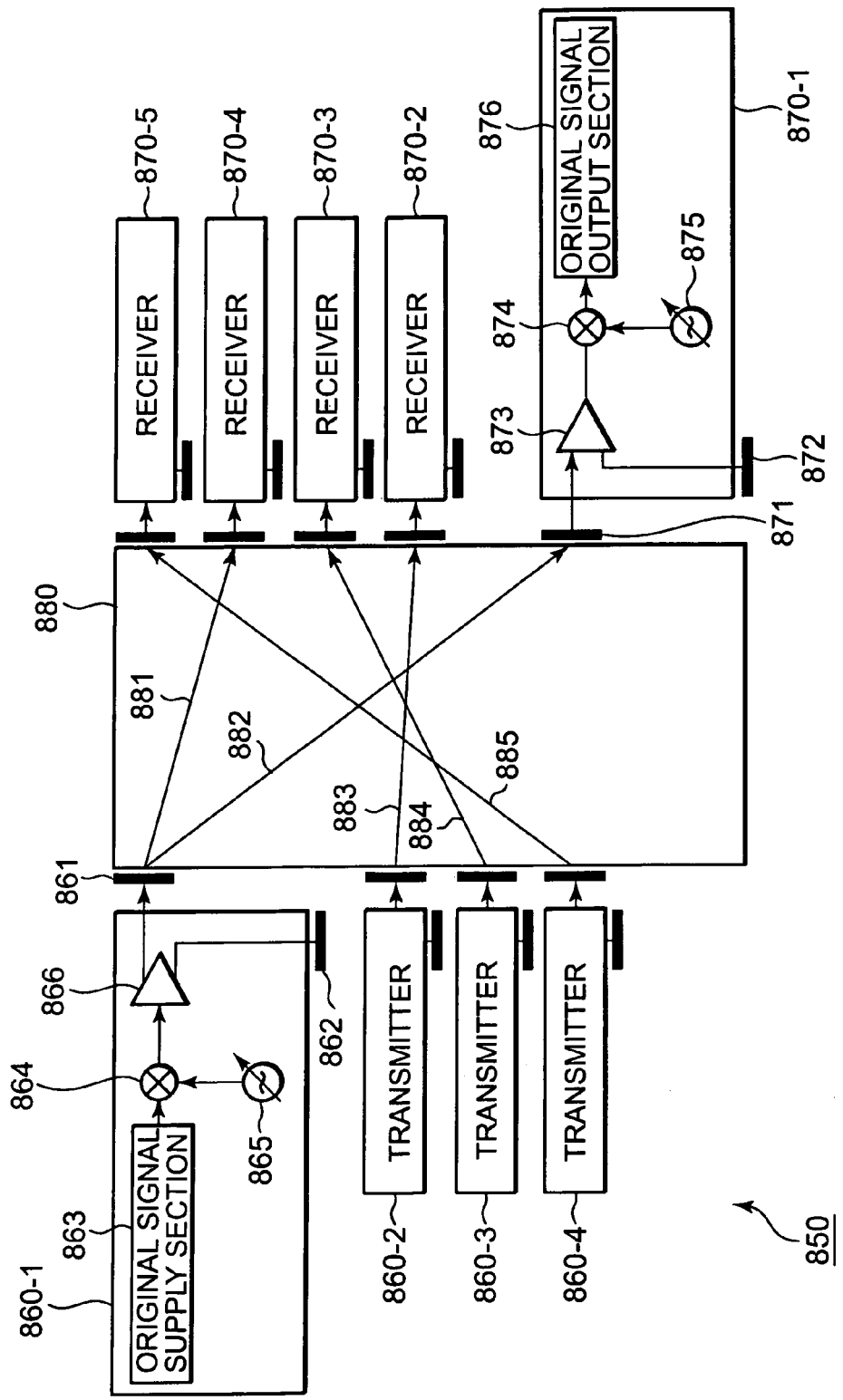
FIG. 28 is a schematic view showing another construction example of the communication system which underlies the present invention.

FIG. 28 is a diagram showing another construction example of the communication system which underlies the present invention. In a communication system 850 shown in FIG. 28, four transmitters 860-1 to 860-4 and five receivers 870-1 to 870-5 perform multiplex communications via a communication medium 880 by using a frequency division technique.

The transmitter 860-1 corresponds to the transmitter 110 shown in FIG. 1 and has a transmission signal electrode 861 and a transmission reference electrode 862, and further has, as a construction corresponding to the transmitter section 113, an original signal supply section 863, a multiplier 864, a frequency variable type oscillation source 865, and an amplifier 866.

An oscillation signal having a particular frequency component generated by the frequency variable type oscillation source 865 is multiplied by an original signal supplied from the original signal supply section 863, in the multiplier 864, and is outputted from the amplifier 866 after having been amplified in the same (it is assumed that filtering is appropriately performed). One of the outputs of the amplifier 866 is connected to the transmission signal electrode 861, while the other is connected to the transmission reference electrode 862.

Each of the transmitters 860-2 to 860-4 is similar in construction to the transmitter 860-1, and since the description of the transmitter 860-1 is applicable, the repetition of the same description will be omitted.

The receiver 870-1 corresponds to the receiver 120 shown in FIG. 1, and has a reception signal electrode 871 and a reception reference electrode 872 and further has, as a construction corresponding to the receiver section 123, an amplifier 873, a multiplier 874, a frequency variable type oscillation source 875 and an original signal output section 876.

After the receiver 870-1 has first restored an electrical signal on the basis of the method according to the present invention, the receiver 870-1 restores the original signal (a signal supplied from the original signal supply section 863) by the signal processing opposite to that of the transmitter 860-1.

Figure 29:
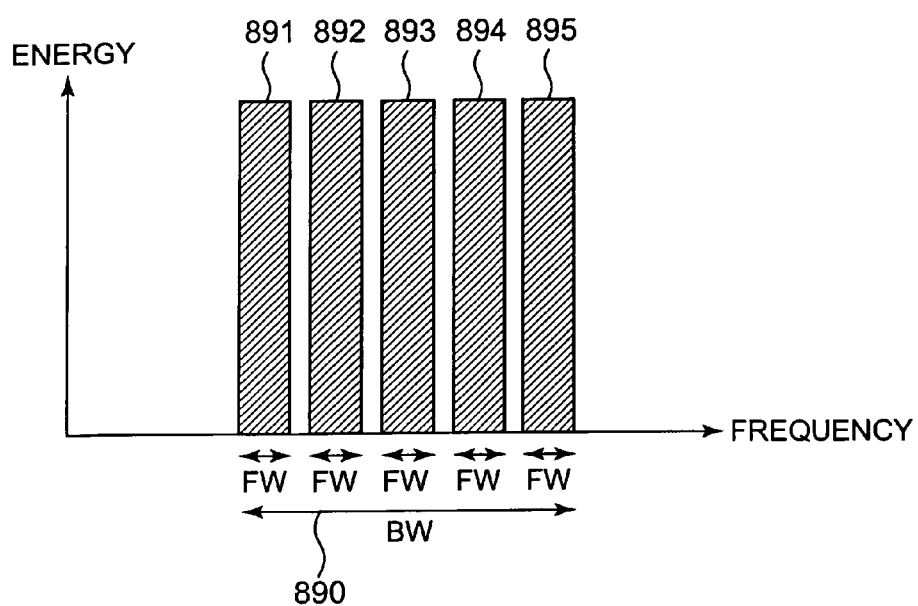
FIG. 29 is a graph showing an example of distribution of a frequency spectrum.

FIG. 29 shows an example of a frequency spectrum due to such technique. The horizontal axis represents frequency, while the vertical axis represents energy. For convenience of explanation, FIG. 29 shows an example in which an entire frequency bandwidth (BW) 890 is divided into five bandwidths (FW) 891 to 895. The divided frequency bandwidths are respectively used for communications on different communication paths. Namely, the transmitters 860-1 to 860-4 (the receivers 870-1 to 870-5) of the communication system 800 can perform a plurality of communications at the same time via the single communication medium 880 as shown in FIG. 28 while suppressing mutual interference by using the different frequency bands on the respective communication paths. In FIG. 28, paths 881 to 885 represent the respective communication paths on the communication medium 880. In addition, the communication system 850 can perform multiple-to-one communication as shown by the paths 881 and 882 as well as multiple-to-multiple communication by using the frequency division technique.

The communication system 850 (the transmitters 860-1 to 860-4 or the receivers 870-1 to 870-5) has been described above as being divided into the five bandwidths 891 to 895, but the number of division may be arbitrary and the sizes of the respective bandwidths may be made different from one another.

The third technique is a technique which applies a time division technique which causes a transmitter and receiver to mutually divide communication time therebetween. In this case, the transmitter (or the receiver) performs division of communication time in accordance with particular rules of time division, or detects an idle time zone at the time of start of communication and performs division of communication time on the basis of the detection result.

Figure 30:
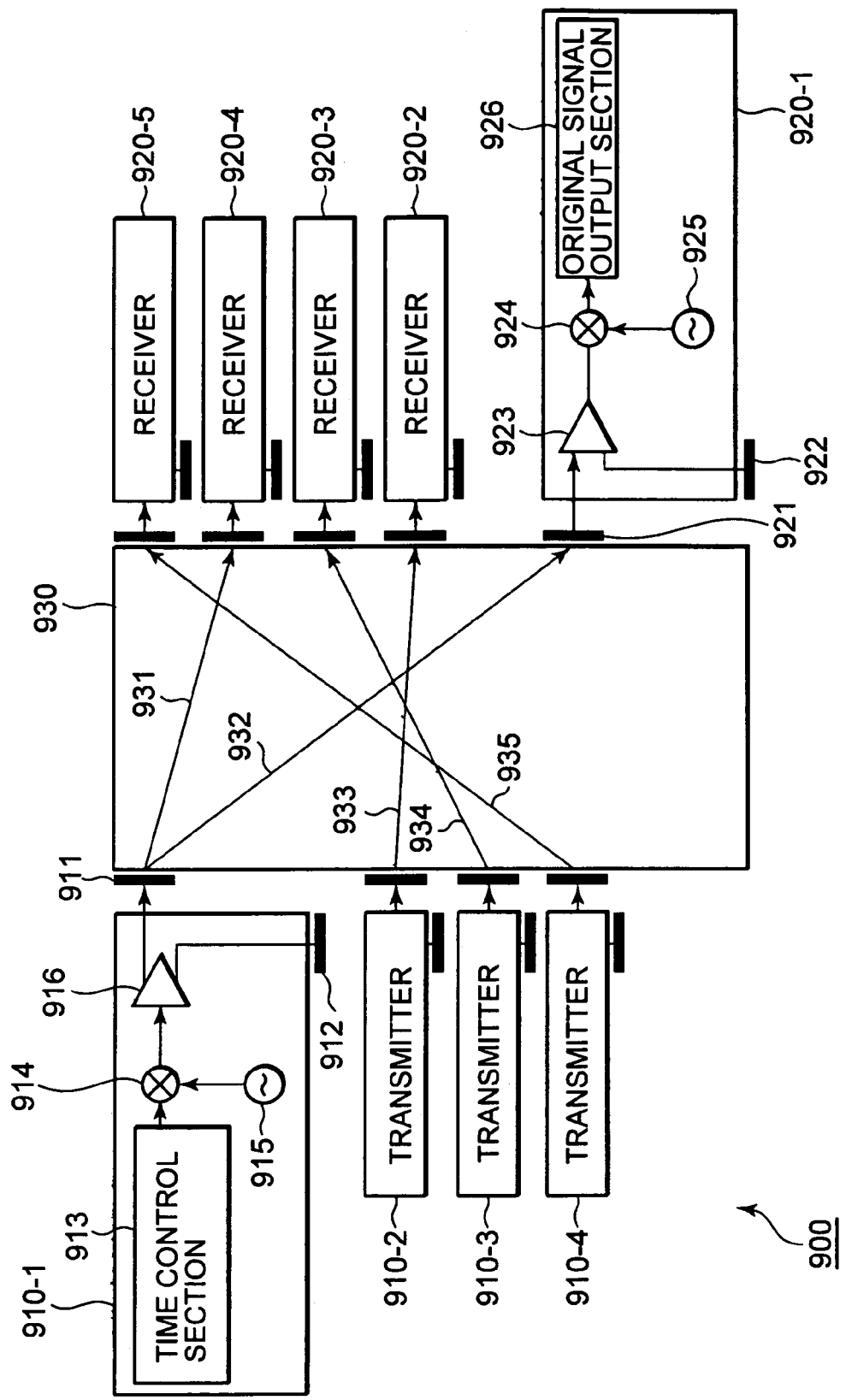
FIG. 30 is a diagram showing another construction example of the communication system which underlies the present invention.

FIG. 30 is a diagram showing another construction example of the communication system which underlies the present invention. In a communication system 900 shown in FIG. 30, four transmitters 910-1 to 910-4 and five receivers 920-1 to 920-5 perform multiplex communications via a communication medium 930 by using a time division technique.

The transmitter 910-1 corresponds to the transmitter 110 shown in FIG. 1 and has a transmission signal electrode 911 and a transmission reference electrode 912, and further has, as a construction corresponding to the transmitter section 113, a time control section 913, a multiplier 914, an oscillation source 915, and an amplifier 916.

An original signal is outputted by the time control section 913 at a predetermined time. The multiplier 914 multiplies the original signal by an oscillation signal supplied from the oscillation source 915, and the multiplication result is outputted from the amplifier 916 after having been amplified by the same (it is assumed that filtering is appropriately performed). One of the outputs of the amplifier 916 is connected to the transmission signal electrode 911, while the other is connected to the transmission reference electrode 912.

Each of the transmitters 910-2 to 910-4 is similar in construction to the transmitter 9-10-1, and since the description of the transmitter 910-1 is applicable, the repetition of the same description will be omitted.

The receiver 920-1 corresponds to the receiver 120 shown in FIG. 1, and has a reception signal electrode 921 and a reception reference electrode 922 and further has, as a construction corresponding to the receiver section 123, an amplifier 923, a multiplier 924, an oscillation source 925 and an original signal output section 926.

After the receiver 920-1 has first restored an electrical signal on the basis of the method according to the present invention, the receiver 920-1 restores the original signal (a signal supplied from the time control section 913) by the signal processing opposite to that of the transmitter 920-1.

Figure 31:
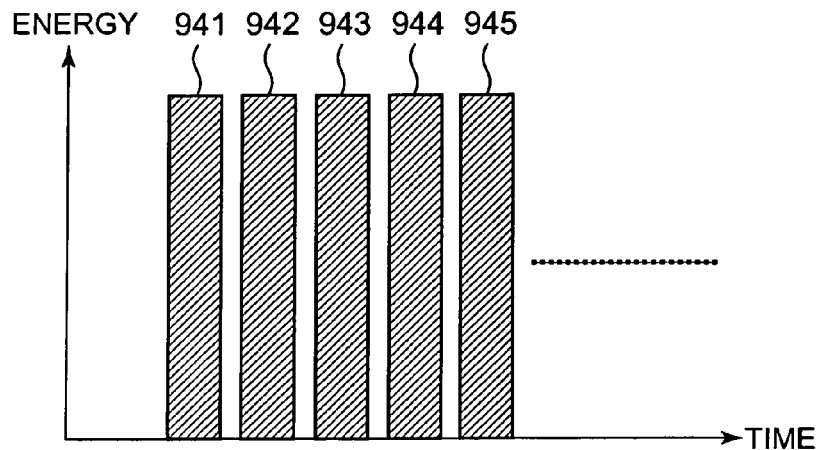
FIG. 31 is a graph showing an example of temporal distribution of a signal.

FIG. 31 shows an example of a frequency spectrum due to such technique, plotted along the time axis. The horizontal axis represents time, while the vertical axis represents energy. For convenience of explanation, FIG. 31 shows five time zones 941 to 945, but actually, time continues after the time zone 945 in a similar manner. The divided time zones are respectively used for communications on different communication paths. Namely, the transmitters 910-1 to 910-4 (the receivers 920-1 to 920-5) of the communication system 900 can perform a plurality of communications at the same time via the single communication medium 900 as shown in FIG. 30 while suppressing mutual interference by performing communications on the respective communication paths during different time zones. In FIG. 30, paths 931 to 935 represent the respective communication paths on the communication medium 930. In addition, the communication system 900 can perform multiple-to-one communication as shown by the paths 931 and 932 as well as multiple-to-multiple communication by using the time division technique.

In addition, the communication system 900 (the transmitter 910 or the receiver 920) may also be constructed so as to make the time widths of the respective time zones different from one another.

Furthermore, in addition to the above-mentioned methods, at least two of the first to third communication techniques may also be combined.

It is particularly important in particular applications that a transmitter and a receiver can perform a plurality of other devices at the same time. For example, on the assumption that this construction is applied to transportation tickets, it is possible to use the construction in useful applications in which when a user who possesses both a device A having information on a commutation ticket and a device B having an electronic money function passes through an automatic ticket gate, if, for example, a section through which the user has passed contains a section not covered by the commutation ticket, a deficiency is subtracted from the electronic money of the device B by the automatic ticket gate communicating with the device A and the device B at the same time by using any of the above-mentioned techniques.

Figure 32:
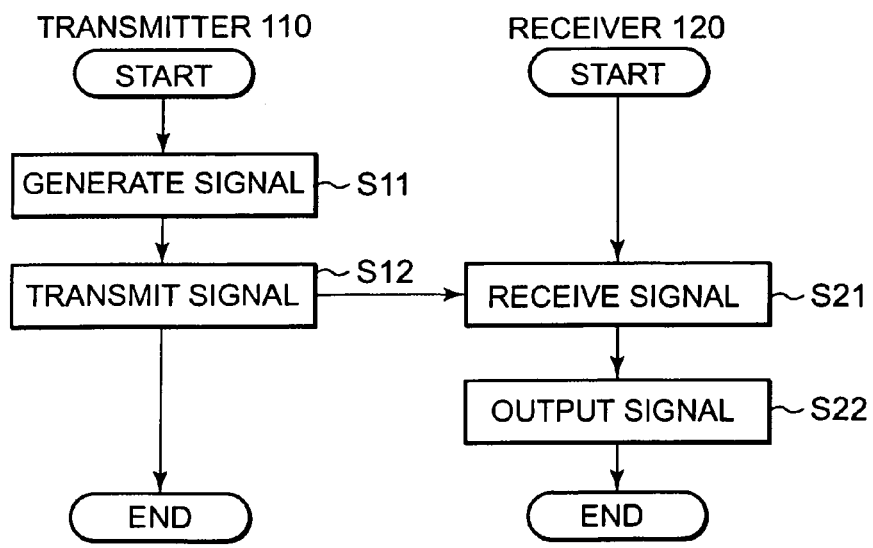
FIG. 32 is a flowchart showing an example of a flow of communication processing.

The flow of communication processing executed during the communication between the transmitter and the receiver will be described below on the basis of the flowchart shown in FIG. 32 with illustrative reference to the case of communication between the transmitter 110 and the receiver 120 of the communication system 100 shown in FIG. 1.

In step S11, the transmitter section 113 of the transmitter 110 generates a signal to be transmitted, in step S1, and in step S12, the transmitter 110 transmits the generated signal to the communication medium 130 via the transmission signal electrode 111. When the signal is transmitted, the transmitter section 113 of the transmitter 110 completes communication processing. The signal transmitted from the transmitter 110 is supplied to the receiver 120 via the communication medium 130. In step S21, the receiver section 123 of the receiver 120 receives the signal via the reception signal electrode 121, and in step S22 outputs the received signal. The receiver section 123 which has outputted the received signal completes communication processing.

As mentioned above, the transmitter 110 and the receiver 120 can perform basic communication via the communication medium 130 through simple processing without the need for complex processing. Namely, the transmitter 110 and the receiver 120 do not need a closed circuit using reference electrodes and can easily perform stable communication processing without being influenced by environments, merely by performing transmission and reception via the signal electrodes. Accordingly, the transmitter 110 and the receiver 120 (the communication system 100) can reduce loads on communication processing for performing stable communication without being influenced by environments, and can also reduce manufacturing costs. In addition, since the structure of communication processing is simplified, the communication system 100 can use various communication techniques such as modulation, encoding, encryption and multiplexing at the same time.

In the description of each of the communication systems, the transmitter and the receiver have been described as being constructed as separated devices, but the present invention is not limited to this construction and a communication system may be constructed by using a transmitter/receiver having the functions of both the transmitter and the receiver.

Figure 33:
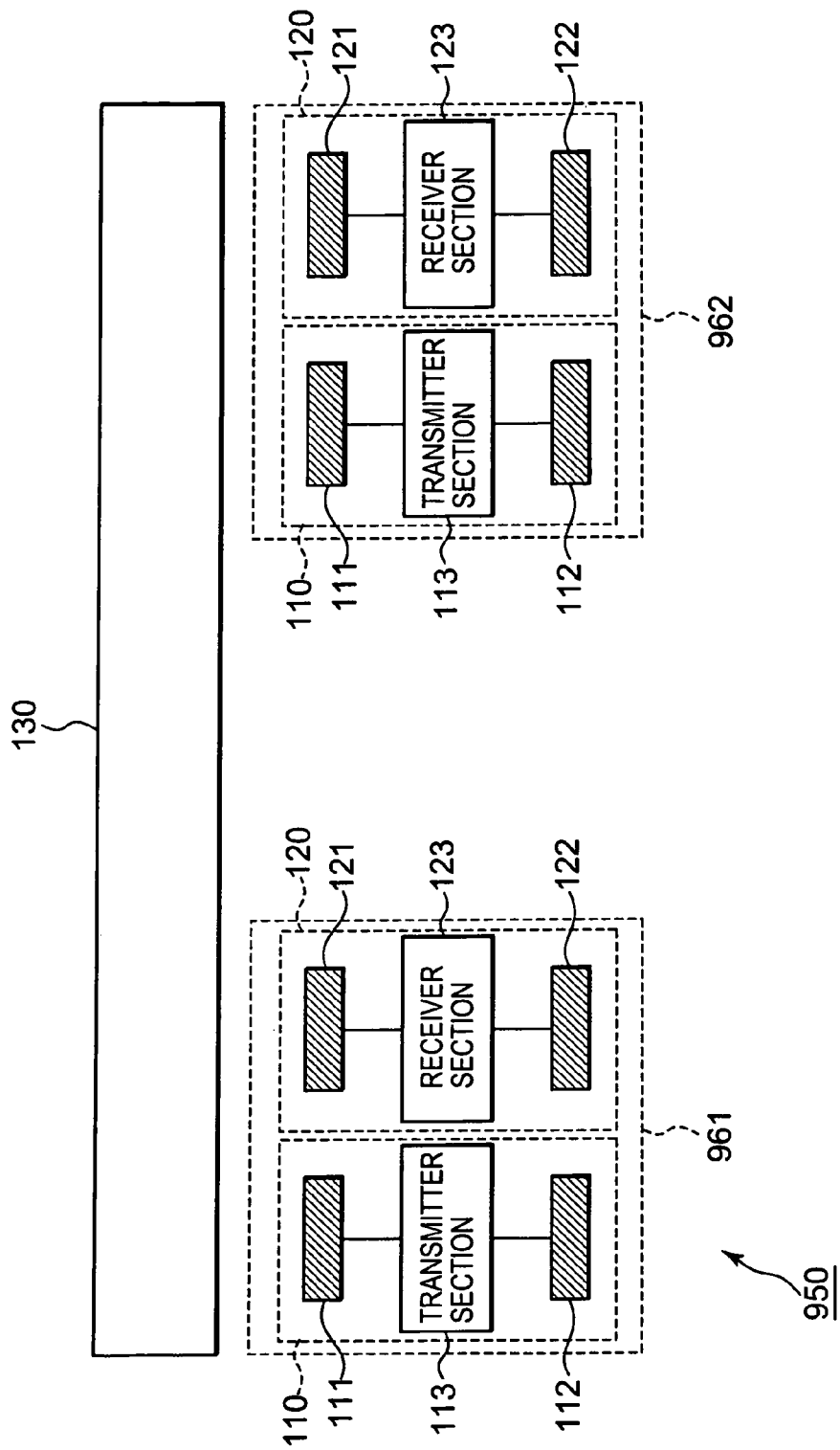
FIG. 33 is a diagram showing another construction example of the communication system which underlies the present invention.

FIG. 33 is a diagram showing another construction example of the communication system which underlies the present invention.

In FIG. 33, a communication system 950 has a transmitter/receiver 961, a transmitter/receiver 962, and the communication medium 130. The communication system 950 is a system which the transmitter/receiver 961 and the transmitter/receiver 962 perform bi-directional transmission and reception of signals via the communication medium 130.

The transmitter/receiver 961 has a transmitter section 110 having a construction similar to the transmitter 110 shown in FIG. 1, and a receiver section 120 having a construction similar to the receiver 120 shown in FIG. 1. Namely, the transmitter/receiver 961 has the transmission signal electrode 111, the transmission reference electrode 112, the transmitter section 113, the reception signal electrode 121, the reception reference electrode 122 and the receiver section 123.

Namely, the transmitter/receiver 961 transmits a signal via the communication medium 130 by using the transmitter section 110, and receives a signal supplied via the communication medium 130, by using the receiver section 120. The transmitter/receiver 961 is constructed so that the communication by the transmitter section 110 and the communication by the receiver section 120 are prevented from interfering with each other at this time.

Since the transmitter/receiver 962 has a construction similar to the transmitter/receiver 961 and operates in a similar manner, the description of the transmitter/receiver 962 will be omitted. The transmitter/receiver 961 and the transmitter/receiver 962 perform bi-directional communications via the communication medium 130 by the same method.

In this manner, the communication system 950 (the transmitter/receiver 961 and the transmitter/receiver 962) can easily realize bi-directional communications not restricted by use environments.

In the above-mentioned construction example, although different electrodes are used for transmission and reception, one set of signal and reference electrodes is provided in each device so that the device can be switched between transmission and reception.

Next, with reference to FIG. 34, the description will be made on a sales apparatus or vending machine 1000 according to an embodiment of the present invention and using the above-described communication system as an infrastructure. This sales apparatus 1000 is used for selling, for example, data of admission tickets for a concert or the like, data of railroad tickets and commutation tickets of trains or the like, text data of a novel or the like, content data of music, video images or the like (hereinunder described as merchandise electronic data), delivers/receives merchandise electronic data from/to a user device 1100 (corresponding to the transmission/reception apparatus 962 shown in FIG. 33) attached on a purchaser, and executes settlement. The present embodiment may also be applied to settlement for sales of ordinary merchandise such as juice, cigarette, etc.

The sales apparatus 1000 includes a signal processing section 1001, a signal electrode 1002, a reference electrode 1003, a sensor 1004 and an output section 1005.

Figure 35:
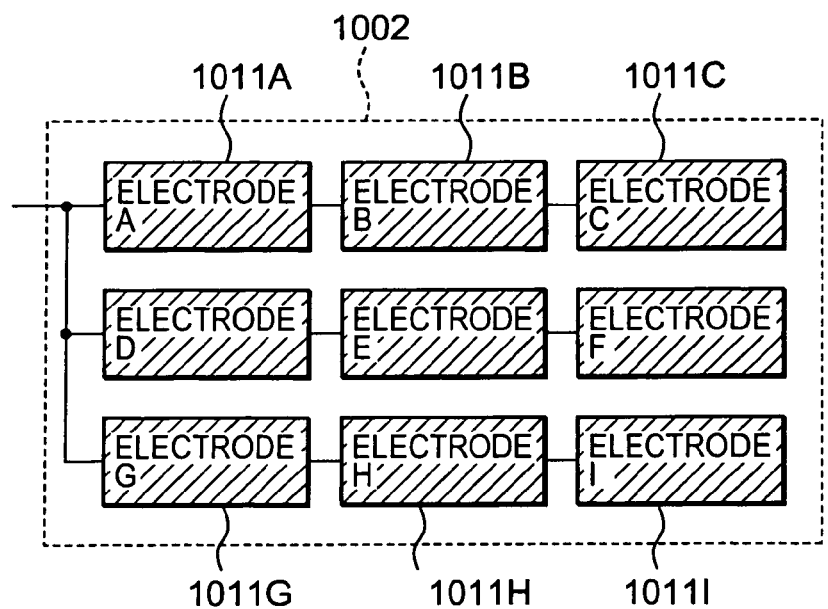
FIG. 35 is a construction example of signal electrodes shown in FIG. 34.

The signal processing section 1001 is formed as, for example, an integrated unit of the transmitter section 113 and receiver section 123 shown in FIG. 33, and connects the signal electrode 1002 and reference electrode 1003. The signal electrode 1002 is, for example, an integrated unit of the transmission signal electrode 111 and reception signal electrode 121 shown in FIG. 33, and is stacked on a display section 1005. The signal electrode 1002 includes a plurality of electrodes 1011A to 1011I such as shown in FIG. 35 (in FIG. 35, nine electrodes). The number of electrodes constituting the signal electrode may be increased. The reference electrode 1003 is, for example, an integrated electrode of the transmission reference electrode 112 and reception reference electrode 122 shown in FIG. 33.

Figure 36:
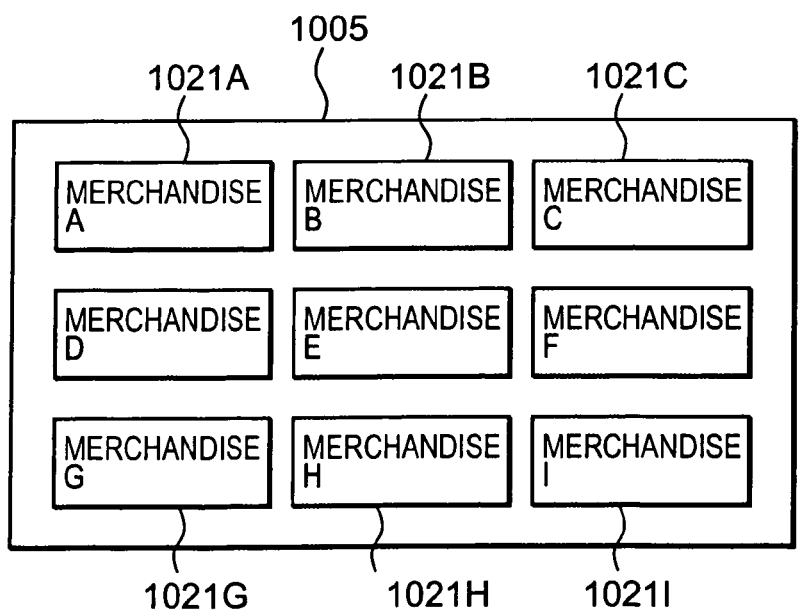
FIG. 36 is a block diagram showing an example of a screen on a display section shown in FIG. 34.

The sensor 1004 may be formed with a pressure sensor, an optical sensor and the like, disposed between the display section 1005 and signal electrode 1002, detects a touch position on the display section 1005 by a purchaser, and notifies the position to the signal processing section 1001. The display section 1005 is formed with a liquid crystal display or the like, and displays buttons 1021A to 1021I indicating a plurality of merchandise for sale, such as shown in FIG. 36, under the control of the signal processing section 1001. The buttons 1021A to 1021I may be displayed in any shape such as icons, drawings, photographs and characters so long as the merchandise can be distinguished from each other. These plural buttons 1021A to 1021I correspond to the positions of the electrodes 1011A to 1011I shown in FIG. 36.

When merchandise is to be purchased, it is assumed that a purchaser touches the button displayed on the display section 1005 and holds this state until settlement and merchandise delivery/reception are completed. In this case, since a finger or the like of the purchaser comes near the signal electrode 1002, the signal processing section 1001 can communicate bidirectionally with the user device 1100 worn by the purchaser via the body of the purchaser, which corresponds to the communication medium 130 shown in FIG. 33.

The sensor 1004 may be omitted from the structure of the above-described sales apparatus 1000. If the signal electrode 1002 includes the plural electrodes 1011A to 1011I such as shown in FIG. 35, the sensor 1004 may be omitted from the structure of the above-described sales apparatus 1000. Conversely, if the sensor 1004 is provided, the signal electrode 1002 may not need to include the plural electrodes 1011A to 1011I shown in FIG. 35.

Namely, there are several ways to combine the signal electrode 1002 and sensor 1004. The first combination may be such that the signal electrode 1002 includes the plural electrodes 1011A to 1011I and the sensor 1004 is provided. The second combination may be such that the signal electrode 1002 includes the plural electrodes 1011A to 1011I and the sensor 1004 is not provided. The third combination may be such that the signal electrode 1002 includes a single electrode and the sensor 1004 is provided.

In the first combination, a selection by the purchaser can be judged from a corresponding one of the electrodes 1011A to 1011I communicating with the user device 1100, and this judgment can be confirmed by a sensor output of the sensor 1004. Alternatively, a selection of the purchaser may be judged on the basis of a sensor output of the sensor 1004, and this judgment may be confirmed based on whether or not communication with the user device 1100 can be established by using the electrode 1011 corresponding to the merchandise judged as selected.

In the second combination, a selection by the purchaser can be judged from a corresponding one of the electrodes 1011A to 1011I in communication. However, communication between the user device 1100 and the electrodes 1011A to 1011I can be established if a finger comes near the electrodes even if the purchaser does not touch the display section 1005. It is therefore difficult to distinguish between a situation where the finger is moved to close position and a situation where real selection is performed.

In the third combination, a selection by the purchaser is judged from a sensor output of the sensor 1004.

Figure 37:
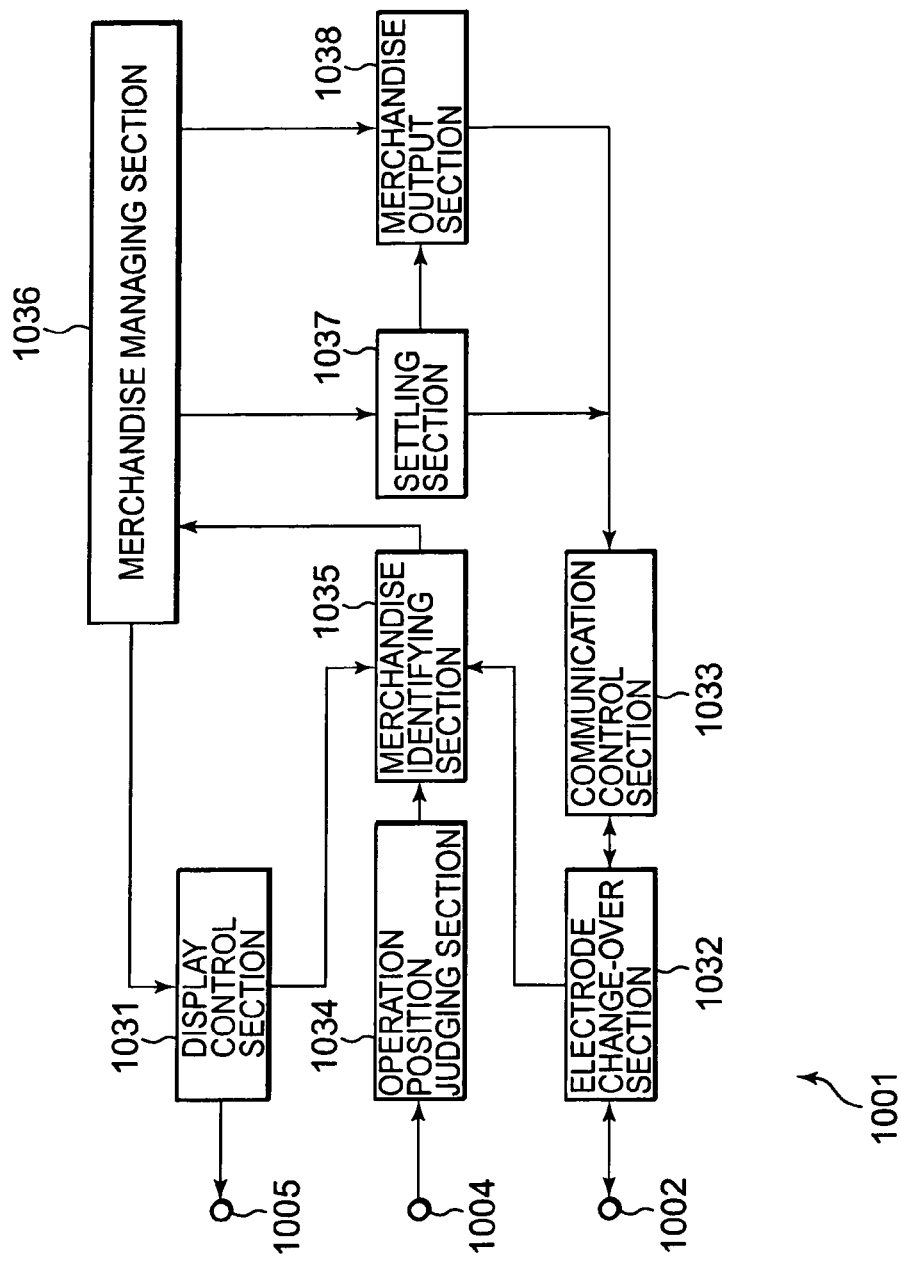
FIG. 37 is a block diagram showing a first exemplary structure of a signal processing section of a sales apparatus.

FIG. 37 shows a first exemplary structure of the signal processing section 1001 corresponding to the first combination. The signal processing section 1001 of the first exemplary structure includes a display control section 1031, an electrode change-over section 1032, a communication control section 1033, an operation position judging section 1034, a merchandise identifying section 1035, a merchandise managing section 1036, a settlement section 1037 and a merchandise output section 1038.

The display control section 1031 generates display data for displaying the buttons 1021A to 1021I as shown in FIG. 36 by using advertisement data (images, sentences explaining merchandise, etc.) of merchandise electronic data supplied from the merchandise managing section 1036, and outputs the display data to the display section 1005. The display control section also outputs layout information to the merchandise identifying section 1035, the layout information indicating a button of which merchandise is displayed at which position on the screen of the display section 1005. The electrode change-over section 1032 connects one of the electrodes 1011A to 1011I constituting the signal electrode 1002 to the communication control section 1033 in the downstream side, and outputs selection information to the merchandise identifying section 1035. The selection information indicates which one of the electrodes 1011A to 1011I is connected to the communication control section 1033 in the downstream side. The communication control section 1033 communicates with the user device 1011 via the electrode change-over section 1032 and signal electrode 1002.

The operation position judging section 1034 judges a user operation position from a sensor output of the sensor 1004, and outputs operation position information as the judgment result to the merchandise identifying section 1035. The operation position judging section 1034 judges whether the operation position information input from the operation position judging section 1034 is coincident with the position of one of the electrodes 1011A to 1011I indicated by the selection information from the electrode change-over section 1032, and only when a coincidence is judged, identifies the merchandise selected by the purchaser in accordance with the selection information and the layout information input from the display control section 1031, and notifies the identified merchandise to the merchandise managing section 1036.

The merchandise managing section 1036 holds merchandise electronic data, and also holds advertisement data, prices and the number of merchandise in stock corresponding to the merchandise electronic data. The number of merchandise in stock is managed only for the merchandise electronic data of a merchandise having a limited number of merchandise to be sold, such as tickets of a concert. The merchandise managing section 1036 responds to the notice from the merchandise identifying section 1035, notifies a price of the merchandise electronic data to the settlement section 1037 to make the settlement section effect a settlement process, supplies the merchandise electronic data to the merchandise output section 1038 to make the merchandise output section supply the merchandise electronic data to the user device 1100. The settlement section 1037 executes the settlement process with the user device 1100 via the communication control section 1033. The merchandise output section 1038 supplies the merchandise electronic data to the user device 1100 via the communication control section 1033.

The second exemplary structure (not shown in the figure) of the signal processing section 1001 corresponding to the above-described second combination omits the operation position judging section 1034 from the first exemplary structure shown in FIG. 37. In the second exemplary structure, the merchandise identifying section 1035 identifies the merchandise selected by the purchaser in accordance with the position of one of the electrodes 1011A to 1011I indicated by the selection information from the electrode change-over section 1032 and the layout information input from the display control section 1031, and notifies the identified merchandise to the merchandise managing section 1036. The other structures are similar to the first exemplary structure shown in FIG. 37, and the description thereof is omitted.

Figure 38:
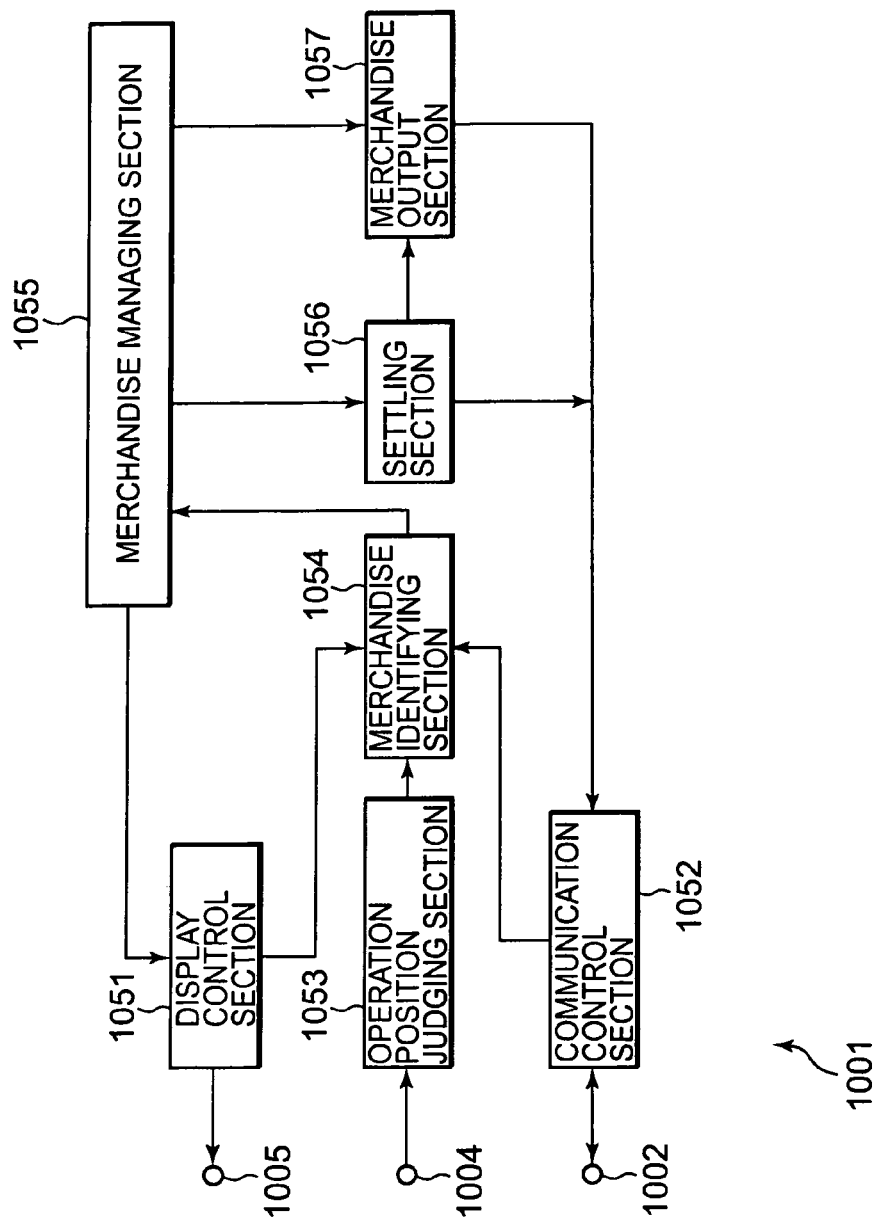
FIG. 38 is a block diagram showing a third exemplary structure of a signal processing section of a sales apparatus.

FIG. 38 shows a third exemplary structure of the signal processing section 1001 corresponding to the third combination. The signal processing section 1001 of the third exemplary structure includes a display control section 1051, a communication control section 1052, an operation position judging section 1053, a merchandise identifying section 1054, a merchandise managing section 1055, a settlement section 1056 and a merchandise output section 1057.

The display control section 1051 generates display data for displaying the buttons 1021A to 1021I shown in FIG. 36 by using advertisement data of merchandise supplied from the merchandise managing section 1055, and outputs the display data to the display section 1005. The display control section also outputs layout information to the merchandise identifying section 1054, the layout information indicating a button of which merchandise is displayed at which position on the screen of the display section 1005. The communication control section 1052 communicates with the user device 1100 via the signal electrode 1002.

The operation position judging section 1053 judges a user operation position from a sensor output of the sensor 1004, and outputs operation position information as the judgment result to the merchandise identifying section 1054. The merchandise identifying section 1054 identifies the merchandise selected by the purchaser in accordance with the operation position information input from the operation position judging section 1053 and the layout information input from the display control section 1031, and notifies the identified merchandise to the merchandise managing section 1055.

The merchandise managing section 1055 holds merchandise electronic data, and also holds advertisement data, prices and the number of merchandise in stock corresponding to the merchandise electronic data. The number of merchandise in stock is managed only for the merchandise electronic data of a merchandise having a limited number of merchandise to be sold, such as tickets of a concert. The merchandise managing section 1055 responds to the notice from the merchandise identifying section 1054, notifies a price of the merchandise electronic data to the settlement section 1056 to make the settlement section effect a settlement process, supplies the merchandise electronic data to the merchandise output section 1057 to make the merchandise output section supply the merchandise electronic data to the user device 1100. The settlement section 1056 executes the settlement process with the user device 1100 via the communication control section 1052. The merchandise output section 1057 supplies the merchandise electronic data to the user device 1100 via the communication control section 1052.

Figure 34:
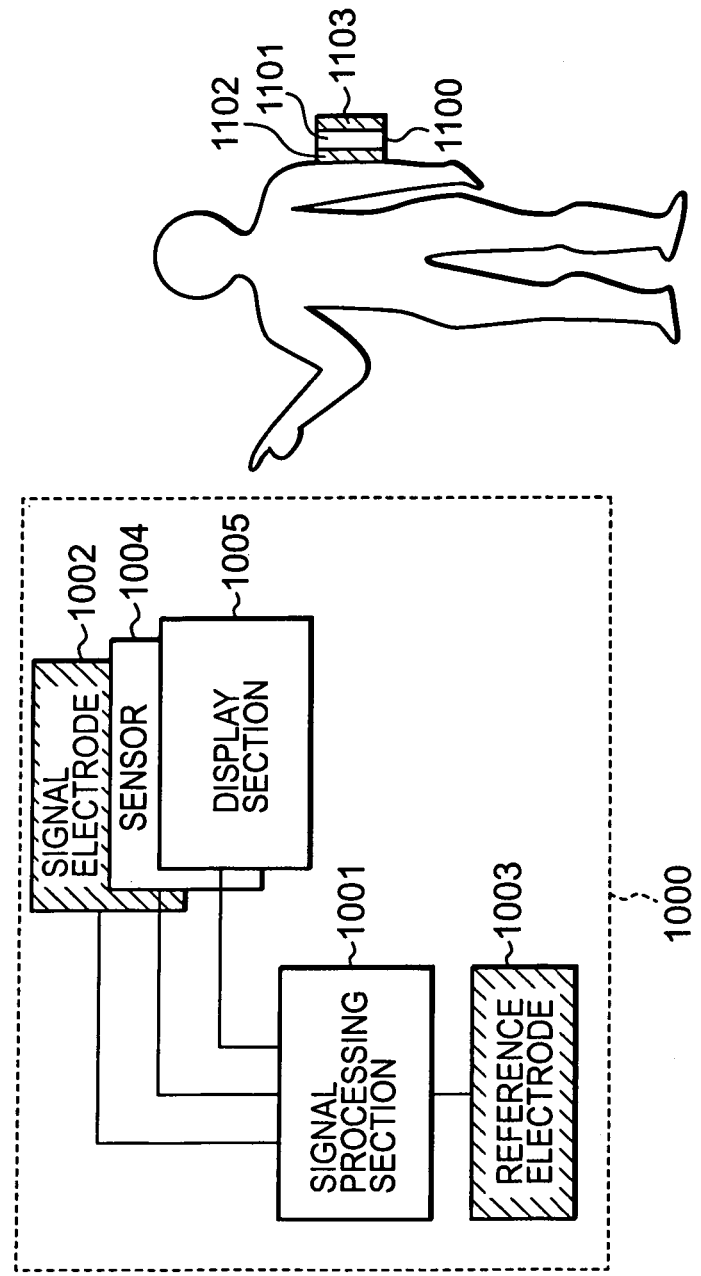
FIG. 34 is a construction example of a sales apparatus according to an embodiment of the present invention.

Reverting to FIG. 34, the user device 1100 worn on the purchaser includes a signal processing section 1101, a signal electrode 1102 and a reference electrode 1103

The signal processing section 1101 is, for example, an integrated unit of the transmitter section 113 and receiver section 123 shown in FIG. 33, and connects the signal electrode 1102 and reference electrode 1103. The signal electrode 1102 is, for example, an integrated unit of the transmission signal electrode 111 and reception signal electrode 121 shown in FIG. 33. The reference electrode 1103 is, for example, an integrate electrode of the transmission reference electrode 112 and reception reference electrode 122 shown in FIG. 33. The wearer (purchaser) wears the user device 1100 in such a manner that the housing plane disposed with the signal electrode 1102 faces the body side of the purchaser. The signal processing section 1101 can therefore communicate bidirectionally with the sales apparatus 1000 via the human body of the wearer (purchaser) corresponding to the communication medium 130 shown in FIG. 33.

Figure 39:
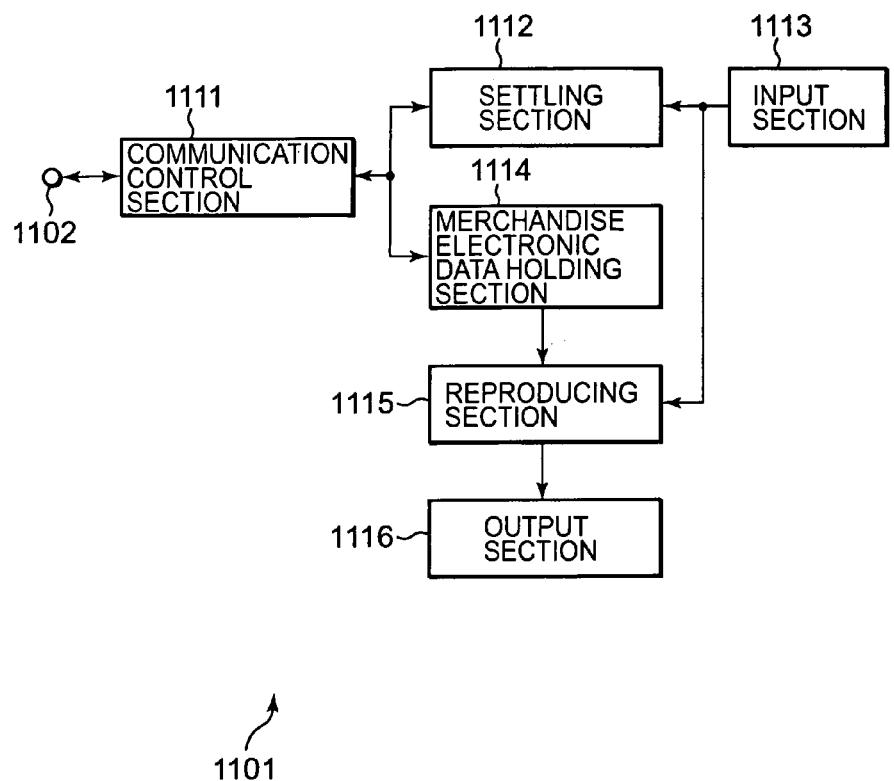
FIG. 39 is a block diagram showing an exemplary structure of a signal processing section of a user device.

FIG. 39 shows an exemplary structure of the signal processing section 1101. The signal processing section 1101 includes a communication control section 1111, a settlement section 1112, an input section 1113, a merchandise electronic data holding section 1114, a reproducing section 1115 and an output section 1116.

The communication control section 1111 communicates with the sales apparatus 1000 via the signal electrode 1102. The settlement section 1112 executes a settlement process with the sales apparatus 1000 connected via the communication control section 1111. The settlement process can use a credit function or a prepaid function. A user can set beforehand a selection between these functions. The input section 1113 receives a user selection of the credit function or prepaid function, and notifies the selection to the settlement section 1112. The input section 1113 also receives a user operation instructing reproduction of content data or the like held in the merchandise electronic data holding section 1114, and notifies this instruction to the reproducing section 1115. The merchandise electronic data holding section 1114 holds the merchandise electronic data bought from the sales apparatus 1000. In accordance with the notice from the input section 1113, the reproducing section 1115 reads and reproduces the merchandise electronic data held in the merchandise electronic data holding section 1114 and outputs the data to the output section 1116. The output section 1116 includes a display and a speaker, displays images and characters as the reproduction result of the merchandise electronic data, and outputs sounds and audios.

Figure 40:
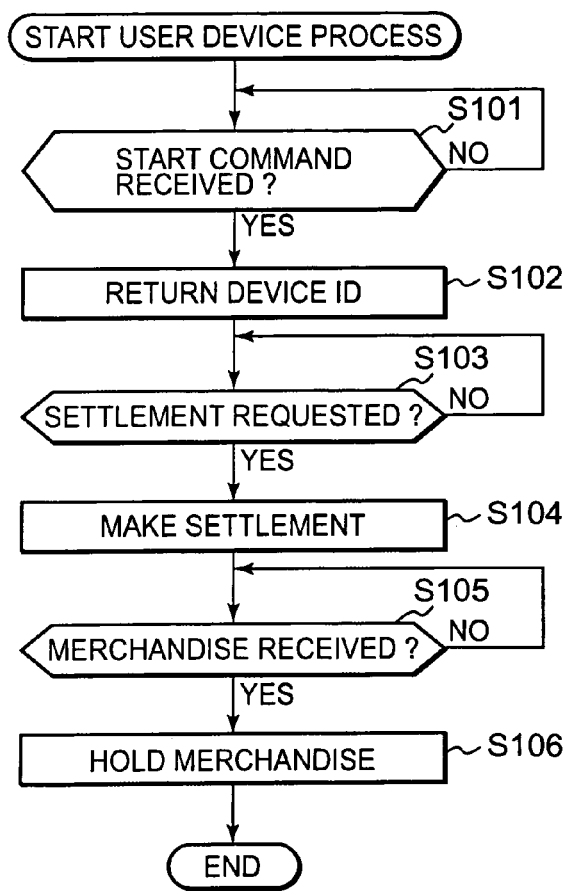
FIG. 40 is a flow chart illustrating the operation of a user device.

Next, with reference to the flow chart shown in FIG. 40, the basic operation of the user device 1100 will be described. At Step S101, the communication control section 1111 of the user device 1100 stands by until a start command transmitted from the sales apparatus 1000 is received via the signal electrode 1102.

When the start command is received, the process advances to Step S102 whereat the communication control section 1111 returns a device ID unique to the user device 1100 to the sales apparatus 1000 via the signal electrode 1102. Communication with the sales apparatus 1000 can therefore be established.

At Step S103, the settlement section 1112 judges whether the communication control section 1111 receives a settlement process request from the sales apparatus 1000 in communication, and stands by until the settlement process request is received. When the settlement process request is received, the flow advances to Step S104 whereat the settlement section 1112 executes a settlement process.

At Step S105, the merchandise electronic data holding section 1114 judges whether the communication control section 1111 receives the merchandise electronic data transmitted from the sales apparatus 1000 in communication, and stands by until it is judged that the communication control section 1111 receives the merchandise electronic data. When the communication control section 1111 receives the merchandise electronic data, the merchandise electronic data holding section 1114 acquires the received merchandise electronic data from the communication control section 1111. The basic operation of the user device 1100 has been described above.

Next, description will be made on the operation of the sales apparatus 1000 according to an embodiment of the present invention. First, with reference to the flowchart shown in FIG. 41, description will be made on the operation of the signal processing section 1001 of the first exemplary structure shown in FIG. 37.

At Step S111, by using advertisement data (images, sentences explaining merchandise, etc) of the merchandise electronic data of merchandise in stock capable of being sold, supplied from the merchandise managing section 1036, the display control section 1031 generates display data for displaying the buttons 1021A to 1021I shown in FIG. 36 and outputs the display data to the display section 1005. For example, if concert tickets or seat reservation tickets of a train or air plane are to be sold as the merchandise electronic data, display data is generated for displaying a seat layout diagram on the screen by replacing the button 1021 with a seat (in this case, it is necessary to prepare electrodes constituting the signal electrode as many as the number of seats to be displayed at the same time). The display control section 1031 also outputs the layout information to the merchandise identifying section 1035, the layout information indicating the button 1021 of which merchandise is displayed at which position on the screen of the display section 1005.

At Step S112, the electrode change-over section 1032 sequentially selects one of the electrodes 1011A to 1011I and connects the electrode to the communication control section 1033 in the downstream side. For example, it is assumed that the electrode 1011 is selected. The electrode change-over section 1032 outputs the selection information to the merchandise identifying section 1035, the selection information indicating which one of the electrodes 1011A to 1011I is selected.

At Step S113, the communication control section 1033 generates a start command and outputs the command to the signal electrode 1002 (in this case, the selected electrode 1011A) via the electrode change-over section 1032. If there is a finger or the like of the purchaser near the selected electrode 1011A, i.e., if there is a finger or the like of the purchaser near the button 1021A of the display section 1005, the start command is transmitted from the electrode 1011A to the user device 1100 worn on the purchaser via the body of the purchaser, and a device ID is expected to be returned in response to the start command.

In accordance with whether the device ID is returned in a predetermined time, the communication control section 1033 judges whether communication with the user device 1100 is established. If the device ID is returned in the predetermined time and it is judged that the communication with the user device 1100 is established, the process advances to Step S114. If the device ID is not returned in the predetermined time and it is judged that the communication with the user device 1100 is not established, the process returns to Step S112 to repeat the succeeding Steps.

At Step S114, the operation position judging section 1034 judges an operation position of the user from a sensor output of the sensor 1004, and outputs the operation position information as the judgment result to the merchandise identifying section 1035. Even if the operation position is not judged, i.e., even if the user does not operate, this effect is output to the merchandise identifying section 1035. The merchandise identifying section judges whether the operation position information input from the operation position judging section 1034 is coincident with the selection information from the electrode change-over section 1032. For example, in this case, it is judged whether the operation position information is coincident with the upper left of the screen where the electrode 1011A is disposed. If it is judged that both are coincident, a definite selection operation by the user can be confirmed, and the process advances to Step S115.

Conversely, if it is judged at Step S114 that both are not coincident, or if the operation position cannot be judged, a definite selection operation by the user cannot be confirmed, namely it is judged that communication with the user device 1100 is established, for example, by a finger or the like incidentally moving near to the electrode 1011A, and the process returns to Step S112 to repeat succeeding Steps.

At Step S115, in accordance with the selection information from the electrode change-over section 1032 and the layout information from the display control section 1031, the merchandise identifying section 1035 identifies the merchandise selected by the purchaser and notifies the merchandise to the merchandise managing section 1036.

At Step S116, the sales apparatus 1000 confirms a purchase will of the purchaser by a predetermined method (e.g., a finger or the like touching the display section 1005 is once detached and then the finger touches again the original position, or a "enter" button is displayed on the display section 1005, and after the "enter" button is touched, the original position is again touched, or other methods). After the purchase will is confirmed, the process advances to Step S117.

At Step S117, the merchandise managing section 1036 responds to the notice from the merchandise identifying section 1035, and notifies a price of the merchandise electronic data to the settlement section 1037 to make the settlement section execute the settlement process. The settlement section 1037 executes the settlement process with the user device 1100 via the communication control section 1033. At Step S118, the merchandise managing section 1036 supplies the merchandise electronic data corresponding to the notice from the merchandise identifying section 1035 to the merchandise output section 1038. The merchandise output section 1038 supplies the merchandise electronic data to the user device 1100 via the communication control section 1033.

If the purchase cannot be confirmed at Step S116, the processes at Steps S117 and S118 are skipped.

In place of the above-described Steps S112 to S114, the operation position judging section 1034 judges the operation position of the user in accordance with a sensor output of the sensor 1004, and the electrode change-over section 1032 connects one of the electrodes 1011A to 1011I corresponding to the judgment result by the operation position judging section 1034. In this state, the communication control section 1033 may generate a start command, and if the device ID is returned in the predetermined time, the merchandise identifying section 1035 may judge that a definite selection operation is effected by the purchaser, and thereafter the process advances to Step S115.

The operation of the signal processing section 1001 of the first exemplary structure has been described above.

As described above, according to the first exemplary structure of the signal processing section 1001, after the definite purchase will of the purchaser is confirmed, settlement and merchandise electronic data delivery/reception can be performed between the sales apparatus 1000 and user device 1100 via a finger or the like of the purchaser. In this case, it is sufficient only if the user maintains touching the button displaying the merchandise to be purchased on the display section 1005.

Next, description will be made on the operation of the signal processing section 1001 of the second exemplary structure. The signal processing section 1001 of the second exemplary structure omits the processes at Steps S111 to S118 and the process at Step S114 described with reference to FIG. 41. Therefore, for example, even if the finger or the like of the purchaser incidentally comes near to the electrodes 1011A to 1011I, the processes progress down to Step S116. However, since the purchase will of the purchaser is confirmed at Step S116, the processes at Step S117 and succeeding Steps will not be executed contrary to the purchase will.

As described above, according to the signal processing section 1001 of the second exemplary structure, after the definite purchase will of the purchaser is confirmed, settlement and merchandise electronic data delivery/reception can be performed between the sales apparatus 1000 and user device 1100 via a finger or the like of the purchaser. In this case, it is sufficient only if the user maintains touching the button displaying the merchandise to be purchased on the display section 1005.

Figure 42:
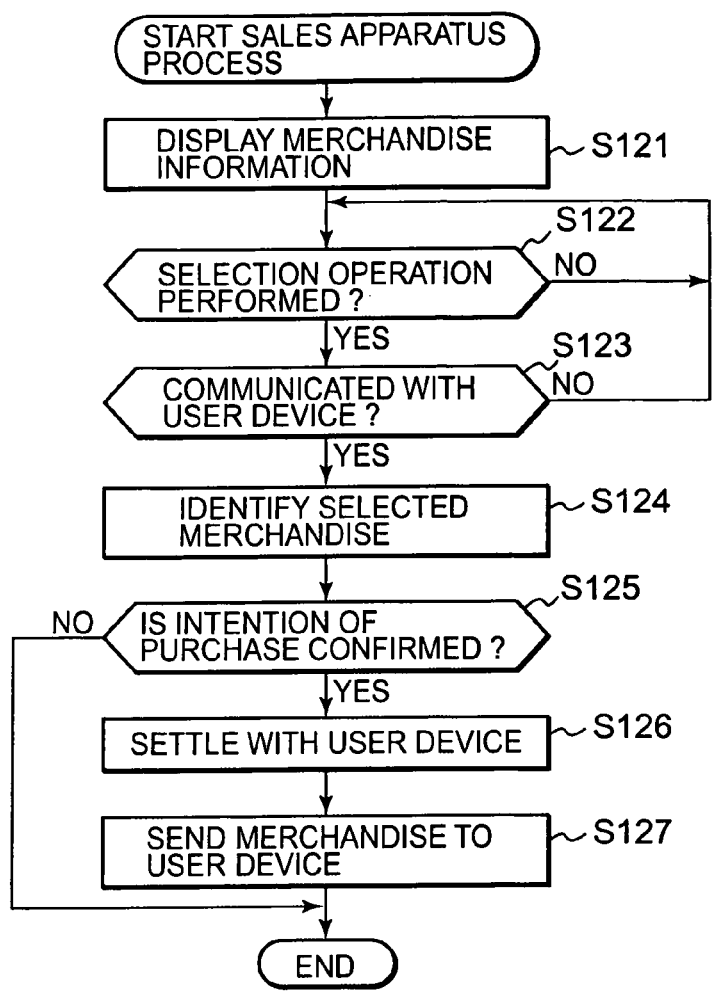
FIG. 42 is a flow chart illustrating the operation of the signal processing section of the third exemplary structure shown in FIG. 38.

Next, with reference to the flow chart shown in FIG. 42, description will be made on the operation of the signal processing section 1001 of the third exemplary structure shown in FIG. 38.

At Step S121, by using advertisement data (images, sentences explaining merchandise, etc) of the merchandise electronic data of merchandise in stock capable of being sold, supplied from the merchandise managing section 1055, the display control section 1051 generates display data for displaying the buttons 1021A to 1021I shown in FIG. 36 and outputs the display data to the display section 1005. For example, if concert tickets or seat reservation tickets of a train or air plane are to be sold as the merchandise electronic data, display data is generated for displaying a seat layout diagram on the screen by replacing the button 1021 with a seat. The display control section 1051 also outputs the layout information to the merchandise identifying section 1054, the layout information indicating the button 1021 of which merchandise is displayed at which position on the screen of the display section 1005.

At Step S122, the operation position judging section 1053 stands by until it is judged from a sensor output of the sensor 1004 that there is a selection operation of the user. If it is judged that there is the selection operation, the process advances to Step S123 whereat the communication control section 1052 generates a start command and outputs the start command to the signal electrode 1002. If there exists a finger or the like of the purchaser near the signal electrode, i.e., if there is a finger or the like near the display section 1005, the start command is transmitted from the signal electrode 1002 to the user device 1100 worn by the purchaser via the body of the purchaser, and it is expected that the device ID is returned in response to the start command.

In accordance with whether the device ID is returned in a predetermined time, the communication control section 1052 judges whether communication with the user device 1100 is established. If the device ID is returned in the predetermined time and it is judged that the communication with the user device 1100 is established, the process advances to Step S124. If the device ID is not returned in the predetermined time and it is judged that the communication with the user device 1100 is not established, the process returns to Step S122 to repeat the succeeding Steps.

At Step S124, the operation position judging section 1053 judges an operation position of the user from a sensor output of the sensor 1004, and outputs the operation position information as the judgment result to the merchandise identifying section 1054. In accordance with the operation position information input from the operation position judging section 1053 and the layout information from the display control section 1051, the merchandise identifying section 1054 identifies the merchandise selected by the purchaser and notifies the merchandise to the merchandise managing section 1055.

At Step S125, the sales apparatus 1000 confirms a purchase will of the purchaser by a predetermined method (e.g., a finger or the like touching the display section 1005 is once detached and then the finger touches again the original position, or a "enter" button is displayed on the display section 1005, and after the "enter" button is touched, the original position is again touched, or other methods). After the purchase will is confirmed, the process advances to Step S126.

At Step S126, the merchandise managing section 1055 responds to the notice from the merchandise identifying section 1054, and notifies a price of the merchandise electronic data to the settlement section 1056 to make the settlement section execute the settlement process. The settlement section 1056 executes the settlement process with the user device 1100 via the communication control section 1052. At Step S127, the merchandise managing section 1055 supplies the merchandise electronic data corresponding to the notice from the merchandise identifying section 1054 to the merchandise output section 1057. The merchandise output section 1057 supplies the merchandise electronic data to the user device 1100 via the communication control section 1052.

If the purchase will cannot be confirmed at Step S125, the processes at Steps S126 and S127 are skipped. The operation of the signal processing section 1001 of the third exemplary structure has been described above.

As described above, according to the third exemplary structure of the signal processing section 1001, after the definite purchase will of the purchaser is confirmed, settlement and merchandise electronic data delivery/reception can be performed between the sales apparatus 1000 and user device 1100 via a finger or the like of the purchaser. In this case, it is sufficient only if the user maintains touching the button displaying the merchandise to be purchased on the display section 1005.

The present invention may be applied not only to the sales apparatus or vending machine for selling merchandise electronic data, but also to a sales apparatus or vending machine for selling ordinary products such as juices, cigarettes, etc.

Next, a sales apparatus or vending machine 1500 according to an embodiment of the present invention will be described with reference to FIG. 43.

The sales apparatus 1500 sells ordinary products (juice, cigarette, etc.), and in addition sells merchandise electronic data (called content data where appropriate) to be sold by the sales apparatus 1000 shown in FIG. 34. Similar to the sales apparatus 1000 shown in FIG. 34, delivery/reception and settlement of products or content data is executed with the user device 1100 worn on the purchaser. Namely, the sales apparatus 1500 deals with products and content data as merchandise.

Figure 43:
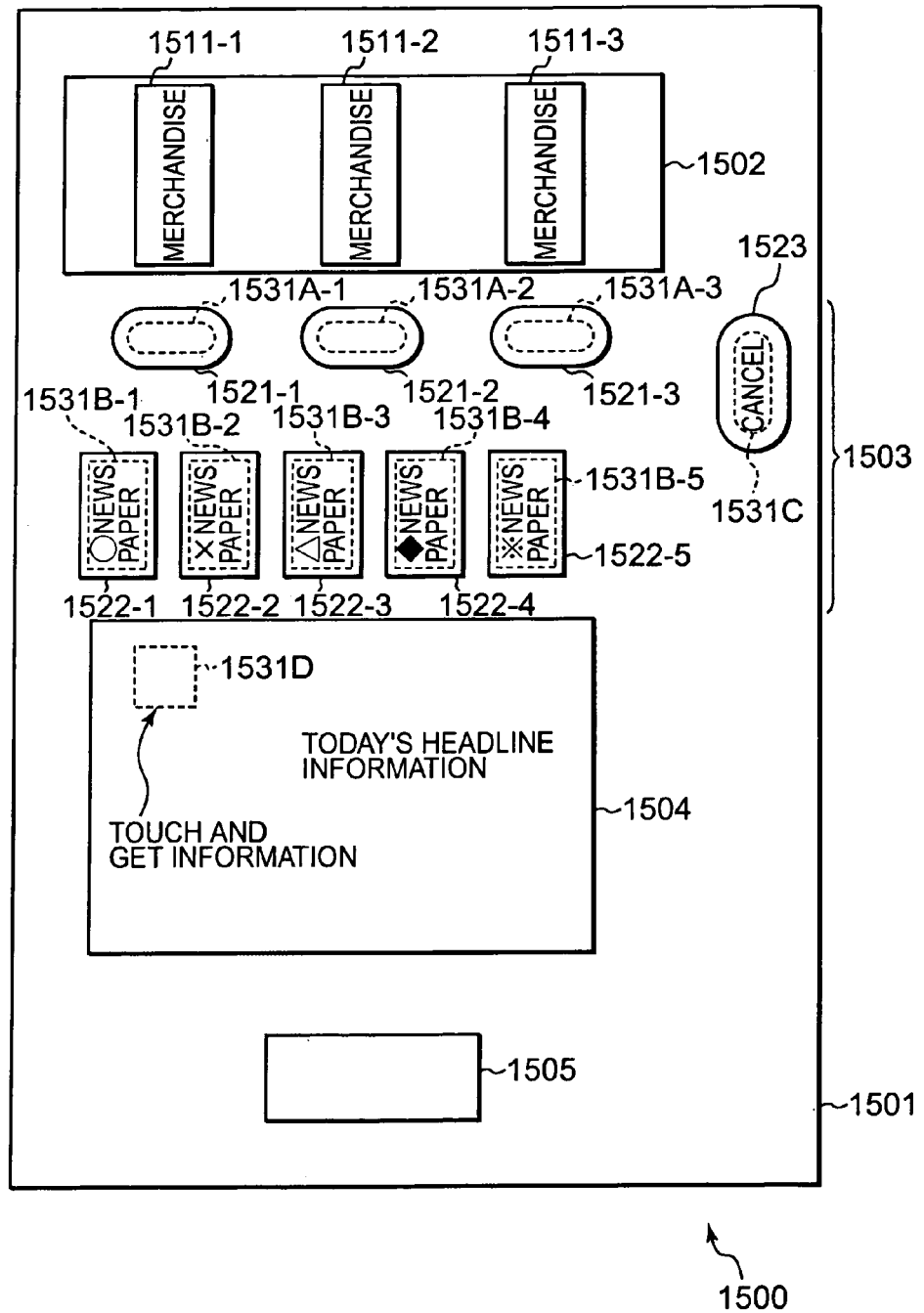
FIG. 43 is a diagram showing an exemplary structure of an outer appearance of a sales apparatus according to an embodiment of the present invention.

FIG. 43 shows an exemplary structure of an outer appearance of the sales apparatus 1500.

Sequentially provided on a front panel 1501 of a housing of the sales apparatus 1500 from the upper portion are: a merchandise presenting section 1502 for presenting merchandise to be sold by the sales apparatus 1500; an operation section 1503 to be operated to return already purchased content data; a display section 1504 for displaying advertisement information on a merchandise (product or content data) to be sold; and a merchandise output port 1505 for picking up a purchased product.

Products 1511-1 to 1511-3 such as juice among the merchandise are exhibited on the merchandise presenting section 1502.

The operation section 1501 includes: merchandise selection buttons 1521-1 to 1521-3 for selecting the products 1511-1 to 1511-3 exhibited on the merchandise presenting section 1502 and to be purchased; content selection buttons 1522-1 to 1522-5 for selecting content data of "□ newspaper", "x newspaper", "∆ newspaper", "□ newspaper" and "* newspaper" to be purchased; and a cancel button 1523 for selecting cancellation of the settled and purchased content data.

These operation buttons constituting the operation section 1503 are each provided with a signal electrode as indicated by a broken line in FIG. 43. Namely, signal electrodes 1531A-1 to 1531A-3 are embedded (built) in the merchandise selection buttons 1521-1 to 1521-3, respectively. Signal electrodes 1531B-1 to 1531B-3 are embedded in the content selection buttons 1522-1 to 1522-3, respectively. A signal electrode 1531C is embedded in the cancel button 1523.

The display section 1504 displays "TODAY'S HEADLINE INFORMATION!" and "TOUCH AND GET INFORMATION!" with an arrow indicating an upper left partial area. The "TODAY'S HEADLINE INFORMATION!" is advertisement information for content data of, e.g., "□ newspaper" extracted and generated from the content data of "□ newspaper". The "TOUCH AND GET INFORMATION!" notifies that if the partial area is touched, data of the advertisement information displayed on the display section 1504 can be acquired from the sales apparatus 1500.

Namely, a signal electrode 1531D is stacked on the upper left partial area of the display section 1504.

Therefore, as a purchaser depresses or touches each operation button of the operation section 1503 and the partial area of the display section 1504, a finger or the like of the purchaser comes near to the signal electrode 1531 of the sales apparatus 1500. It is therefore possible to establish bidirectional communication with the user device 1100 worn by the purchaser via the body of the purchaser corresponding to the communication medium shown in FIG. 33.

In the following, if it is not necessary to distinguish among the signal electrodes 1531A-1 to 1531A-3, signal electrodes 1531B-1 to 1531B-3 and signal electrode 1531D, these signal electrodes are called simply a signal electrode 1531 where appropriate.

In the example shown in FIG. 43, although the signal electrode 1531D is stacked on the upper left partial area of the display section 1504, the stack position and size are not limited thereto, but the signal electrode may be stacked at another position or stacked on the whole area of the display section 1504.

Figure 44:
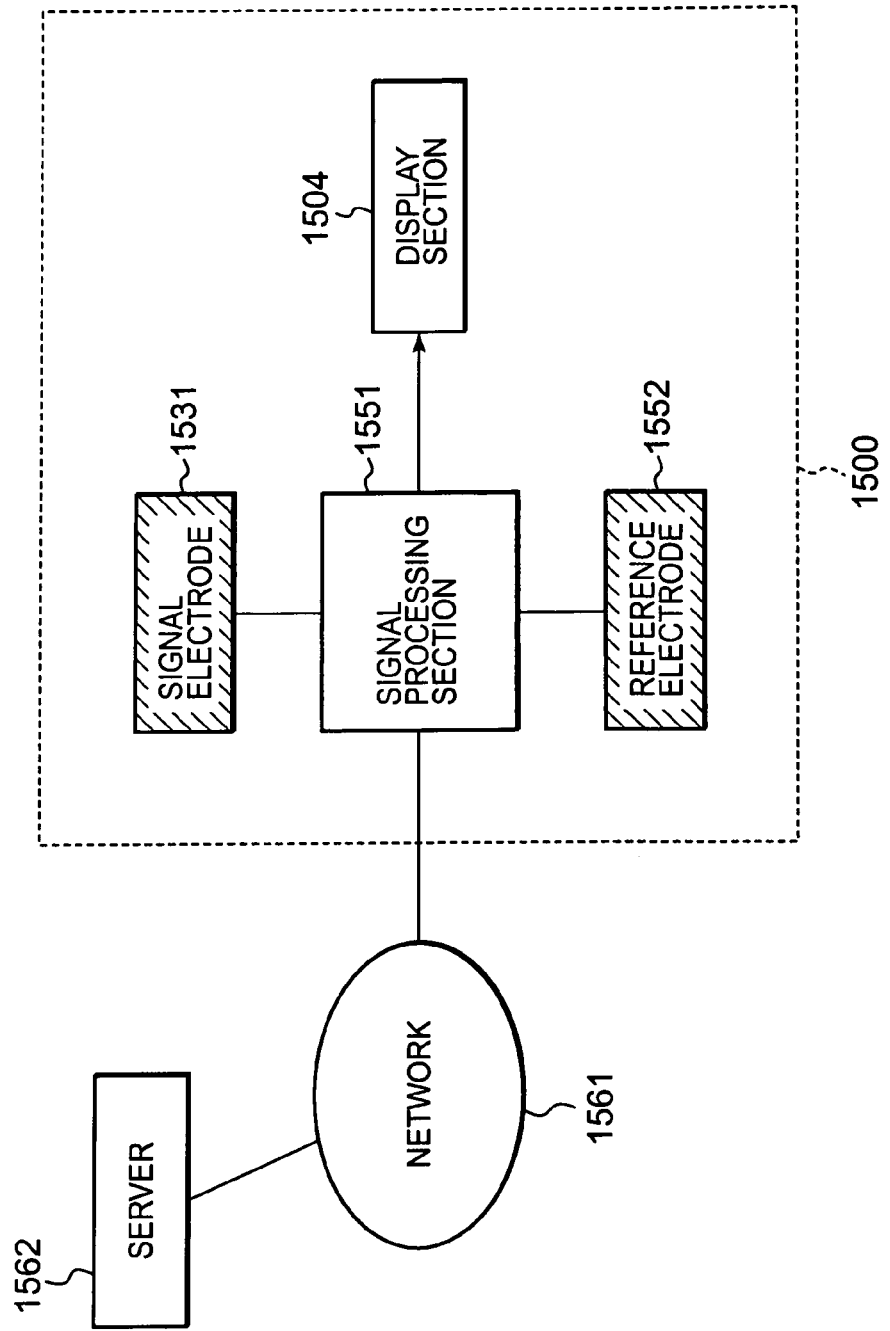
FIG. 44 is a block diagram showing the exemplary electronic structure of the sales apparatus shown in FIG. 43.

FIG. 44 is a diagram showing the electrical internal structure of the sales apparatus 1500.

The sales apparatus 1500 includes a signal processing section 1551, the signal electrode 1531 shown in FIG. 43, a reference electrode 1552 and the display section 1504 shown in FIG. 43.

Similar to the signal processing section 1001 shown in FIG. 34, the signal processing section 1551 is connected to the signal electrode 1531 and reference electrode 1552. The signal electrode 1531 is structured in a manner similar to the signal electrode 1002 shown in FIG. 34. The signal electrode is embedded in each operation button constituting the operation section 1503 or stacked on the display section 1504. The number of electrodes constituting the signal electrode 1531 may be increased. The reference electrode 1552 is structured in a manner similar to the signal electrode 1003 shown in FIG. 34 and its position is optional.

When products and content data are purchased, when purchase is cancelled or when data of advertisement information displayed on the display section 1504 is acquired, it is assumed that the purchaser continues touching the operation button or partial area until a series of processes are completed, the processes including depressing the operation button, touching the partial area of the display section 1504, and settlement and merchandise delivery/reception. In this case, since a finger or the like of the purchaser comes near to the signal electrode 1531, the signal processing section 1551 can establish bidirectional communication with the user device 1100 worn by the purchaser via the body of the purchaser corresponding to the communication medium 130 shown in FIG. 33.

The signal processing section 1551 is connected to a network 1561. Contents data transmitted from a server 1562 of each newspaper company at a predetermined time (e.g., early morning, past the noon, etc.) in each day via the network 1561 is acquired to always store latest content data and supply the latest content data to the purchaser.

FIG. 45 is a diagram showing an exemplary structure of the signal processing section 1551.

The signal processing section 1551 includes a content acquisition section 1581, an advertisement generation section 1582, a display control section 1583, an electrode changeover section 1584, a communication control section 1585, an operation judging section 1586, a merchandise managing section 1587 including a content managing section 1591 and a product managing section 1592, a settlement section 1588, a merchandise output section 1589 and a content delete section 1590.

The content acquisition section 1581 acquires content data transmitted from the server 1562 of each newspaper company at a predetermined time (e.g., early morning, past the noon, etc.) in each day via the network 1561, and stores the acquired content data in the content managing section 1591. The content data may be enciphered. If enciphered, the content data added with advertisement information of a plain text is transmitted.

If information on a merchandise is transmitted from a server (not shown) of a juice maker, the content acquisition section 1581 acquires the information and stores it in the merchandise management section 1592.

The advertisement generation section 1582 generates advertisement information on content data and products from the content data stored in the content managing section 1591 and merchandise information stored in the product managing section 1592, and supplies the generated advertisement information to the display control section 1583.

The advertisement information on merchandise (content data and products) to be sold by the sales apparatus 1500 is displayed randomly, or the advertisement information of content data and products selected for purchase by the purchaser is displayed, for example, under the control of the operation judging section 1586.

Communication with the user device 1100 may be established when a purchaser touches each operation button of the sales apparatus 1500 or when a purchaser touches a button of a signal electrode 1531 buried in the ground in front of the sales apparatus 1500 or stands in front of the sales apparatus 1500 (rides on the ground in which the signal electrode 1531 is buried). In this case, personal information (age, gender) and preference information of the purchaser registered in the user device 1100 may be acquired, the content data and products to be displayed are determined on the basis of the personal information or preference information, and the advertisement information on the determined content data and products may be displayed.

The content acquisition section 1581 may acquire good sales information of content data and products from the server 1562 or a server of a juice maker (not shown in the figure), and store the information in the content managing section 1591 or product managing section 1592. Therefore, the advertisement generation section 1582 supplies the good sales information as the advertisement information on content data and products to the display control section 1583 to display the good sales information.

The advertisement generation section 1582 responds to the notice from the operation judging section 1586 and supplies the advertisement information under display to the communication control section 1585.

By using the advertisement information supplied from the advertisement generation section 1582, the display control section 1583 generates display data for displaying a screen containing advertisement information such as shown in FIG. 43, and makes the display section 1504 display the screen.

The electrode change-over section 1584 connects one of the signal electrodes 1531A-1 to 1531A-3, signal electrodes 1531B-1 to 1531B-3 and signal electrode 1531D constituting the signal electrode 1531 to the communication control section 1585 in the downstream side, and outputs the selection information to the operation judging section 1586, the selection information indicating which one of the signal electrodes 1531A-1 to 1531A-3, signal electrodes 1531B-1 to 1531B-3 and signal electrode 1531D is connected to the communication control section 1585 in the downstream side.

The communication control section 1585 communicates with the user device 1100 via the electrode change-over section 1584 and signal electrode 1531.

In accordance with the position of one of the signal electrodes 1531A-1 to 1531A-3, signal electrodes 1531B-1 to 1531B-3 and signal electrode 1531D indicated by the selection information supplied from the electrode change-over section 1584, the operation judging section 1586 judges a request from the purchaser (purchase of merchandise (content and products), purchase cancellation, or advertisement information acquisition), to thereby control the advertisement generation section 1582, merchandise managing section 1587 or settlement section 1588.

If the selection information from the electrode change-over section 1584 indicates the position of one of the signal electrodes 1531A-1 to 1531A-3, the operation judging section 1586 judges that a request of the purchaser is purchase of a product, identifies the product selected by the purchaser, and notifies the product to the content managing section 1592 of the merchandise managing section 1587.

If the selection information from the electrode change-over section 1584 indicates the position of one of the signal electrodes 1531B-1 to 1531B-3, the operation judging section 1586 judges that a request of the purchaser is purchase of content, identifies the content selected by the purchaser, and notifies the content to the content managing section 1591 of the merchandise managing section 1587.

If the selection information from the electrode change-over section 1584 indicates the position of the signal electrode 1531C, the operation judging section 1586 judges that a request of the purchaser is purchase cancellation, and notifies the device ID of the user device to the settlement section 1588.

If the selection information from the electrode change-over section 1584 indicates the position of the signal electrode 1531D, the operation judging section 1586 judges that a request of the purchaser is acquisition of advertisement information, and notifies the advertisement generation section 1582 of providing the advertisement information under display presently.

The merchandise managing section 1587 includes the content managing section 1591 and product managing section 1592.

The content managing section 1591 holds content data, and stores and manages advertisement information, prices, the numbers of content data in stock (if the number of content data for sale is limited) and the numbers of content data sold (the numbers of sold content data) which are added when necessary. The content managing section 1591 responds to the notice of the identified content data from the operation judging section 1586, notifies a price of the content data to make the settlement section 1588 execute a settlement process, supplies the content data to the merchandise output section 1589, and transmits the content data to the user device 1100.

The product managing section 1592 holds data of advertisement information corresponding to products, prices, the numbers of products in stock, and the numbers of products sold. The product managing section 1592 responds to the notice of the identified product from the operation judging section 1586, notifies a price of the product to make the settlement section 1588 execute a settlement process, notifies the product to the merchandise output section 1589 to make the product be ejected from the merchandise output port 1505.

The numbers of content data sold and the numbers of products sold stored in and managed by the content managing section 1591 and product managing section 1592 are provided from an information provider section (not shown in the figure) to the server 1562 or the like via the network 1561. The server 1562 can calculate statistical sales quantities of the content data and products.

The settlement section 1588 executes the settlement process with the user device 1100 via the communication control section 1585. The settlement section 1588 holds the settled content and the device ID (Identification) of the user device 1100 in a log for a predetermined time. In response to a content purchase cancellation notice from the operation judging section 1586, the settlement section refers to the log to perform a refund settlement, and deletes the content data stored in the user device 1100 by controlling the content delete section 1590.

The merchandise output section 1589 supplies the content data to the user device 1100 via the communication control section 1585, and makes the product indicated by the notice from the merchandise managing section 1592 be ejected from the merchandise output port 1505.

Under the control by the settlement section 1588, the content delete section 1590 deletes the content data stored in the user device 1100 via the communication control section 1585.

Figure 46:
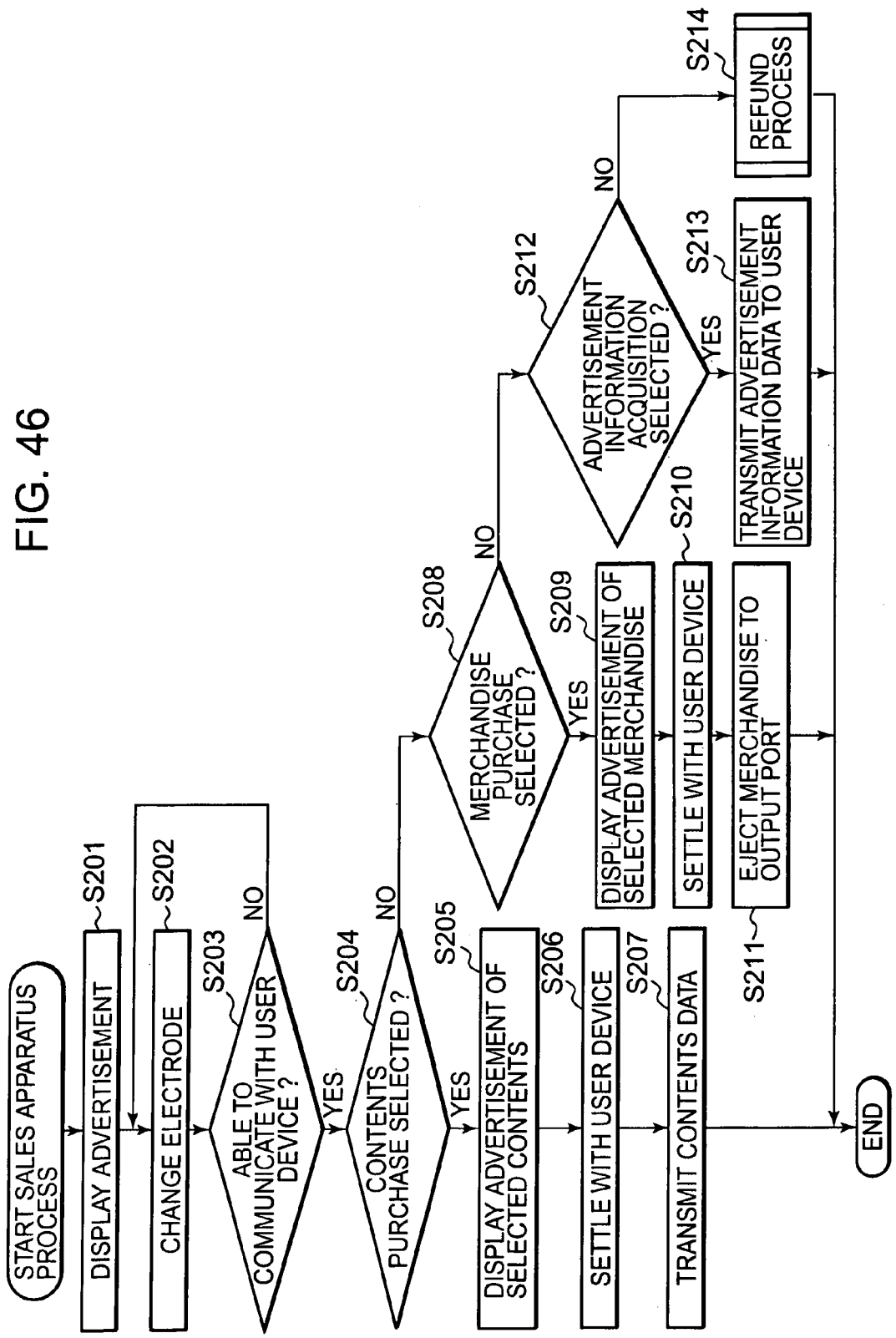
FIG. 46 is a flow chart illustrating the operation of the sales apparatus shown in FIG. 43.

Next, with reference to the flow chart shown in FIG. 46, description will be made on the operation of the sales apparatus 1500 according to an embodiment of the present invention.

At Step S201, the display control section 1583 generates display data for displaying a screen containing advertisement information such as shown in FIG. 43, by using the advertisement information supplied from the advertisement generation section 1582, and makes the display section 1504 display the screen.

For example, if content data is enciphered, as described earlier, advertisement information of a plain text is added and transmitted, so that the advertisement generation section 1582 acquires the advertisement information added to the content data, and supplies the advertisement information to the display control section 1583.

For example, if content data is not enciphered, the advertisement generation section 1582 extracts headline information from the content data, generates advertisement information, and supplies the generated advertisement information to the display control section 1583. For example, if content data is html (HyperText Markup Language), tags of a tile and information having a large character size are extracted as headline information.

By using the advertisement information supplied from the advertisement generation section 1582, the display control section 1583 generates the display data for displaying a screen containing advertisement information, and displays the screen on the display section 1504.

If there is no notice from the operation judging section 1586, advertisement information on the merchandise (content data and products) to be sold by the sales apparatus 1500 is supplied to the display control section 1583 randomly at a predetermined time interval to display the advertisement information.

At Step S202, the electrode change-over section 1584 sequentially selects one of the signal electrodes 1531 and connects the selected signal electrode to the communication control section 1585 in the downstream side. For example, it is assumed that the signal electrode 1531B-1 is selected. The electrode change-over section 1584 outputs the selection information to the operation judging section 1586, the selection information indicating which one of the signal electrodes 1531 is selected.

At Step S203, the communication control section 1585 generates a start command, and outputs the start command to the signal electrode 1531 (in this case, the selected signal electrode 1531B-1) via the electrode change-over section 1584. If there exists a finger or the like of the purchaser near the selected signal electrode 1531B-1, i.e., if there is a finger or the like near the content select button 1522-1, the start command is transmitted from the signal electrode 1531B-1 to the user device 1100 worn by the purchaser via the body of the purchaser, and the device ID is returned in response to the start command.

In accordance with whether the device ID is returned in a predetermined time, the communication control section 1585 judges whether communication with the user device 1100 is established. If the device ID is returned in the predetermined time and it is judged that the communication with the user device 1100 is established, the process advances to Step S204.

In this case, it may be judged from the signal electrode 1531 whether the corresponding operation button or the partial area of the display section 1504 is depressed. Reliability of a judgment of communication can therefore be improved. In this case, only if it is judged that a user continues to depress the corresponding operation button or the partial area of the display section 1504 and it is judged that the device ID is acquired, the process advances to Step S204.

If the device ID is not returned in the predetermined time and it is judged at Step 203 that the communication with the user device 1100 is not established, the process returns to Step S202 to repeat the succeeding Steps.

At Step S204, the operation judging section 1586 judges whether purchase selection of any content data is made, in accordance with the position of the signal electrode 1531 indicated by the selection information from the electrode change-over section 1584. If it is judged at Step S204 that purchase of content data is selected, the process advances to Step S205.

In this example, since the signal electrode 1531B-1, i.e., the content operation button 1522-1 for selecting purchase of the content data of "☐ newspaper", is selected, the operation judging section 1586 judges that content data purchase is selected, and in accordance with the selection information from the electrode change-over section 1584, identifies the content data (i.e., content data of "☐ newspaper") selected by the purchaser, and notifies the content data to the advertisement generation section 1582 and content managing section 1591.

At Step S205, the advertisement generation section 1582 extracts the headline information from the selected content data, generates the advertisement information, and supplies the generated advertisement information to the display control section 1583. By using the advertisement information supplied from the advertisement generation section 1582, the display control section 1583 generates the display data to display the advertisement information (a screen containing the advertisement information) on the display section 1504.

At Step S206, the content managing section 1591 responds to the notice from the operation judging section 1586, and notifies a price of the content data to the settlement section 1588 to make the settlement section execute the settlement process. The settlement section 1588 executes the settlement process with the user device 1100 via the communication control section 1585. In this case, the settlement section 1588 stores the settled content data and the device ID (Identification) of the user device 1100.

At Step S207, the content managing section 1591 supplies the merchandise output section 1589 with the content data corresponding to the notice from the operation judging section 1586. The merchandise output section 1589 transmits the content data to the user device 1100 via the communication control section 1585.

If it is judged at Step S204 that the content data purchase is not selected, the process advances to Step S208, At Step S208, in accordance with the position of the signal electrode 1531 indicated by the selection information from the electrode change-over section 1584, the operation judging section 1586 judges as to purchase of which product is selected. If it is judged at Step S208 that product purchase is selected, the process advances to Step S209.

For example, if the signal electrode 1531A-1, i.e., the merchandise selection button 1521-1 for purchasing the product 1511-1, is selected, the operation judging section 1586 judges that product purchase is selected, in accordance with the selection information from the electrode change-over section 1584, identifies the product (i.e., product 1511-1) selected by the purchaser, and notifies the product to the advertisement generation section 1582 and product managing section 1592.

At Step S209, in accordance with the advertisement data of the selected product, the advertisement generation section 1582 generates advertisement information, and supplies the generated advertisement information to the display control section 1583. By using the advertisement information supplied from the advertisement generation section 1582, the display control section 1583 generates the display data and displays the advertisement of the selected product on the display section 1504.

At Step S210, the product managing section 1592 responds to the notice from the operation judging section 1586, notifies a price of the product to the settlement section 1588 to make the settlement section execute the settlement process. In this case, the product managing section 1592 confirms the number of products in stock corresponding to the notice from the operation judging section 1586, and only if there are products in stock, the settlement process is allowed to be executed. The settlement section 1588 executes the settlement process with the user device 1100 via the communication control section 1585.

At Step S211, the product managing section 1592 notifies the merchandise output section 1589 of the product corresponding to the notice from the operation judging section 1586. The merchandise output section 1589 ejects the product from an accommodation container (not shown in the figure) to the merchandise output port 1505.

If it is judged at Step S208 that product purchase is not selected, the process advances to Step S212.

At Step S212, the operation judging section 1586 judges whether advertisement information acquisition is selected, in accordance with the position of the signal electrode 1531 indicated by the selection information from the electrode change-over section 1584.

For example, if the signal electrode 1531D, i.e., the partial area of the display section 1504 for allowing advertisement information data to be acquired, is selected, the operation judging section 1586 judges that advertisement information acquisition is selected, and in accordance with the selection information from the electrode change-over section 1584, notifies the advertisement generation section 1582 of providing advertisement information under display presently.

At Step S213, under the control by the operation judging section 1586, the advertisement generation section 1582 transmits data of the advertisement information under display presently to the user device 1100 via the communication control section 1585.

If it is judged at Step S212 that advertisement information acquisition is not selected, the process advances to Step S214. Namely, since content data or product purchase is not selected nor acquisition of the advertisement information is selected, the operation judging section 1586 judges that content purchase cancellation is selected, and supplies the device ID of the user device 1100 to the settlement section 1588 to notify a refund process.

Figure 47:
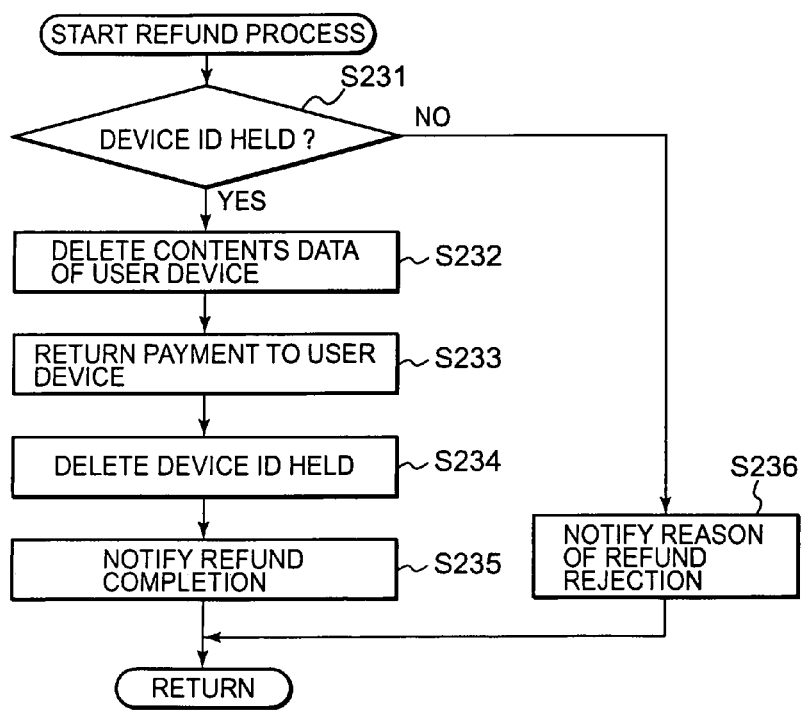
FIG. 47 is a flow chart illustrating a refund process at Step S214 shown in FIG. 46.

At Step S214, the settlement section 1588 executes a content refund process. With reference to the flow chart of FIG. 47, the content refund process will be described.

After the content settlement process, the settlement section 1588 holds the settled content data and the device ID of the user device 1100 in a log for a predetermined time. This log stores the content data for a predetermined time (e.g., 5 minutes), in this time the purchaser purchased inadvertently cannot read the whole content.

At Step S231, the settlement section 1588 judges whether the device ID from the operation judging section 1586 is held in the log, and if it is judged that the device ID is held in the log, notifies the content data corresponding to the device ID to the content delete section 1590.

At Step S232, the content delete section 1590 responds to the notice from the settlement section 1588, and deletes the content data stored in the user device 1100, via the communication control section 1585.

At Step S233, the settlement section 1588 executes a refund settlement process with the user device 1100 via the communication control section 1585, relative to the content data corresponding to the device ID, to thereby return the payment of the content data corresponding to the device ID.

At Step S234, the settlement section 1588 deletes the device ID of the user device 1100 held in the log, and notifies a return payment completion to the operation judging section 1586. In response to this, at Step S235, the operation judging section 1586 controls the display control section 1583 and an audio control section (not shown in the figure), to notify the purchaser of the return payment completion through display and audio output.

If it is judged at Step S231 that the device ID from the operation judging section 1586 is not held in the log, the process advances to Step S236 whereat the settlement section 1588 notifies rejection of return payment to the operation judging section 1586. In response to this, the operation judging section 1586 controls the display control section 1583 and an audio control section (not shown in the figure), to notify the purchaser of reason for rejection of return payment.

In this manner described above, in the sales apparatus 1500, in accordance with one touch or depression of the signal electrode by the purchaser, there are executed settlement and provision of the content data or product, provision of advertisement information of the content data or product, and refund for content data purchase.

Figure 48:
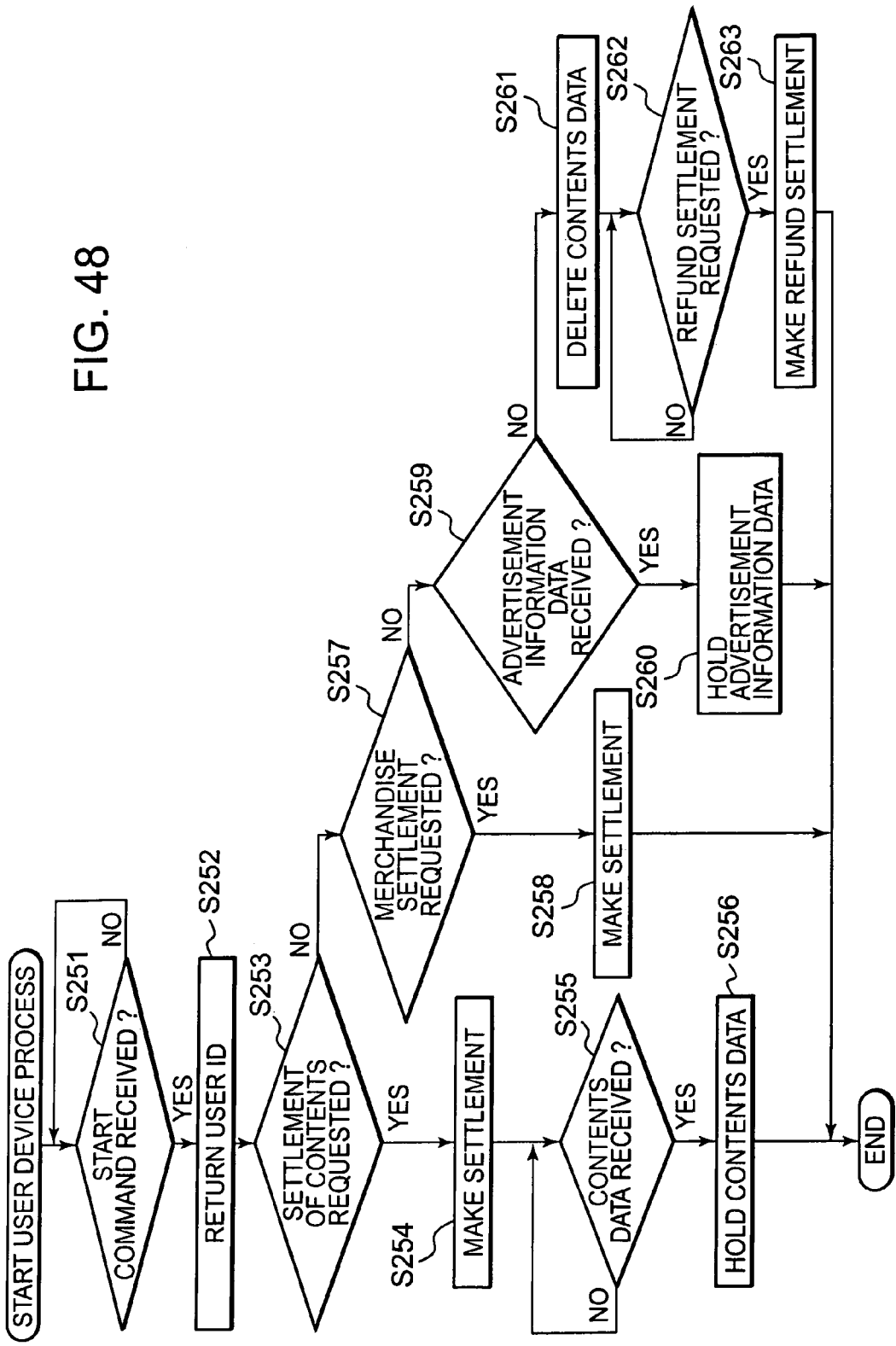
FIG. 48 is a flow chart illustrating the operation of a user device corresponding to the operation of the sales apparatus shown in FIG. 46.

With reference to the flowchart shown in FIG. 48, description will be made on the operation of the user device 1100 to be executed in response to the processes by the above-described sales apparatus.

At Step S251, the communication control section 1111 of the user device 1100 stands by until a start command transmitted from the sales apparatus 1500 is received via the signal electrode 1102.

When the start command is received, the process advances to Step S252 whereat the communication control section 1111 returns a device ID unique to the user device 1100 to the sales apparatus 1500 via the signal electrode 1102. Communication with the sales apparatus 1500 can therefore be established.

At Step S253, the settlement section 1112 judges whether the communication control section 1111 receives a content settlement process request transmitted from the sales apparatus 1500 in communication. When the content settlement process request is received, the flow advances to Step S254 whereat the settlement section 1112 executes a content settlement process.

At Step S255, the merchandise electronic data holding section 1114 judges whether the communication control section 1111 receives the content data transmitted from the sales apparatus 1500 in communication, and stands by until it is judged that the communication control section 1111 receives the content data. When the communication control section 1111 receives the content data, the merchandise electronic data holding section 1114 acquires the received content data from the communication control section 1111, and holds the content data.

If the settlement process request for the content is not received at Step S253, the process advances to Step S257.

At Step S257, the settlement section 1112 judges whether the communication control section 1111 receives a product settlement process request transmitted from the sales apparatus 1500 in communication. When the product settlement process request is received, the process advances to Step S258 whereat the settlement section 1112 executes a product settlement process.

In response to this, the corresponding product is ejected from the merchandise output port 1505 of the sales apparatus 1500.

If the product settlement process request is not received at Step S257, the process advances to Step S259.

At Step S259, the merchandise electronic data holding section 1114 judges whether the communication control section 1111 receives advertisement information data transmitted from the sales apparatus 1500 in communication. If the advertisement information data is received, the process advances to Step S260 whereat the merchandise electronic data holding section 1114 acquires the received advertisement data from the communication control section 1111 and holds the advertisement data.

If the data of the advertisement information cannot be received at Step S259, the process advances to Step S261. Namely, in this case, the communication control section 1111 cannot receive the settlement process request for the content data or product and the data of the advertisement information, and a content delete request is received. Therefore, at Step S261, the merchandise electronic data holding section 1114 deletes the content data of the content for which selection is requested.

At Step S262, the settlement section 1112 judges whether the communication control section 1111 receives the refund settlement process request transmitted from the sales apparatus 1000 in communication, and stands by until the refund settlement process request is received.

If the refund settlement process request is received, the process advances to Step S263 whereat the settlement section 1112 executes the refund settlement process and thereafter terminates the processes by the user device 1100.

As described above, the purchaser can purchase not only a desired product but also the content data of desired content by a single simple operation of depressing or touching a desired button or the partial area of the display section 1504 with a finger.

Further, since the advertisement information added to the content data of content to be soled at the sales apparatus 1500 or the advertisement information extracted and generated from the content data is displayed on the display section 1504, for example, if the content are a newspaper of each company, a number of newspaper advertisements (headlines) can be read instead of the headlines of newspaper sold at a stand, and desired content can be bought after the most interesting headlines are confirmed. Sales quantities can therefore be improved because a purchase desire of the purchaser for merchandise (content data and products) is enhanced.

Furthermore, since the sales apparatus 1500 sells content data in addition to products heretofore sold, an install site, a power source and the like can be more easily secured than a case where the sales apparatus is installed at a new site. The sales apparatus 1500 may replaced a sales apparatus heretofore installed for selling only products such as juice, if the site has a high purchase frequency of products.

The sales apparatus according to an embodiment of the present invention may be realized by only adding sales function for content data to a sales apparatus or vending machine of related art. In this case, although not shown, the sales apparatus is provided with operation buttons having an electronic structure of related art, a money inlet port, a money return port, an electronic money interface, a container unit for change, like a sales apparatus or vending machine of related art.

Figure 49:
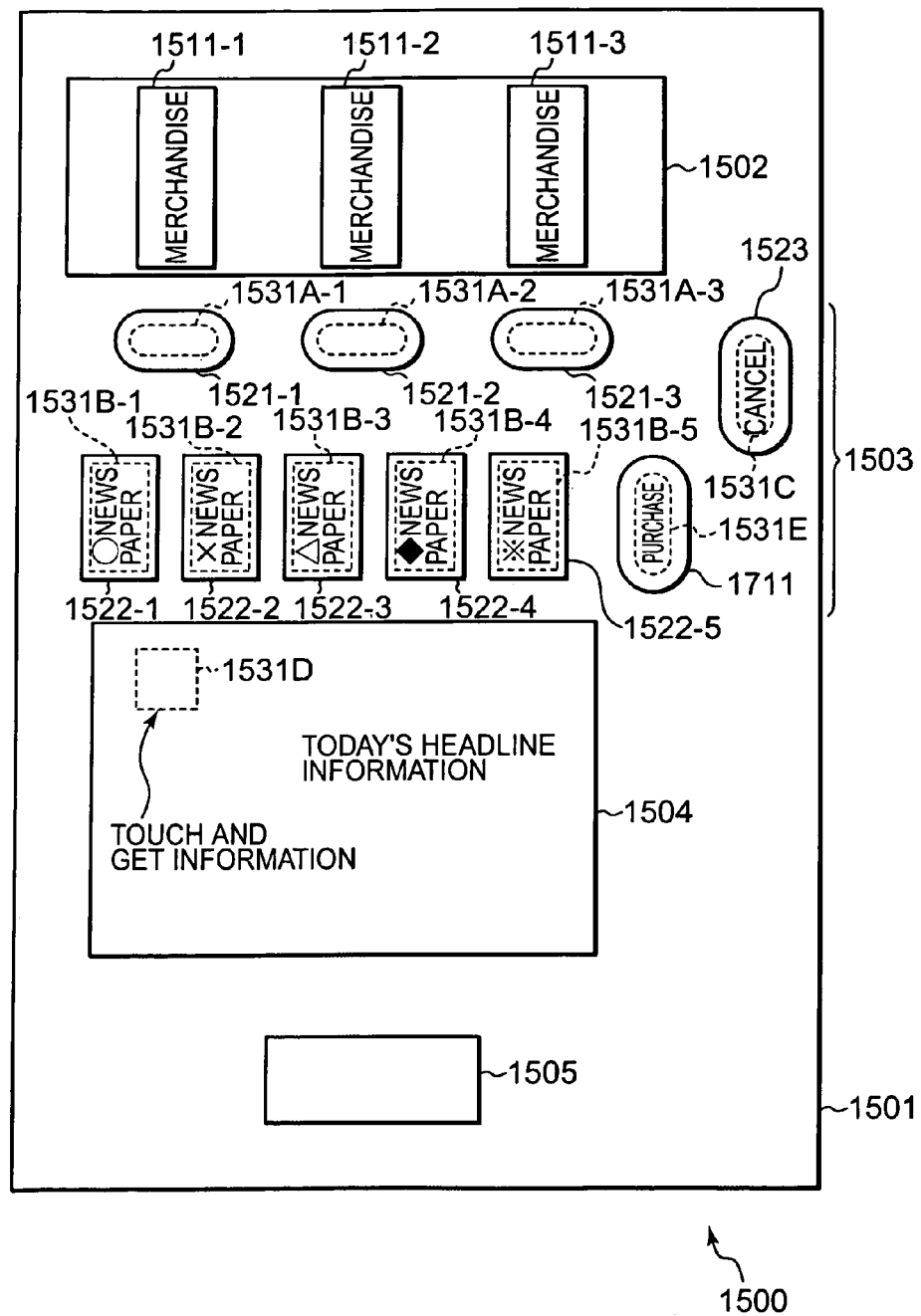
FIG. 49 is a diagram showing another exemplary structure of the outer appearance of the sales apparatus shown in FIG. 43.

The sales apparatus 1500 capable of purchasing a desired product and desired content data with a single operation has been described. With reference to FIG. 49, the description will be made on a sales apparatus or vending machine capable of purchasing a desired product and desired content data with two operations.

A sales apparatus 1500 shown in FIG. 49 is different from the sales apparatus 1500 shown in FIG. 43 only in that the operation section 1503 is provided with a purchase button 1711 embedded with a signal electrode 1531E. Similar to the sales apparatus 1500 shown in FIG. 43, the operation section 1503 is provided with the merchandise selection buttons 1521 to 1521-3 embedded with the signal electrodes 1531A-1 to 1531A-3, the content selection buttons 1522-1 to 1522-3 embedded with the signal electrodes 1531B-1 to 1531B-3, and the cancel button 1523 embedded with the signal electrode 1531C.

The merchandise selection buttons 1521-1 to 1521-3 shown in FIG. 49 are used for selecting products, whereas the content selection buttons 1522-1 to 1522-3 are used for selecting content data. As different from the sales apparatus shown in FIG. 43, as the purchaser depresses the selection button, the product or content data is selected, this selection is stored, and the advertisement of the product or content data is displayed on the display section 1504, without selecting a purchase of the product or content data.

Therefore, after the selection button for the product or content data to be purchased is depressed and the advertisement of the product or content data is viewed, the purchaser depresses the purchase button 1711 to purchase the required product or content data.

Although it is necessary to operate two buttons, the selection button and purchase button, it is possible to avoid an operation miss by the purchaser to be caused by depressing an incorrect selection button which may occur in the sales apparatus 1500 shown in FIG. 43.

The internal electronic structure of the sales apparatus 1500 shown in FIG. 49 and the structure of the signal processing section 1551 are basically similar to those of the sales apparatus 1500 shown in FIG. 43 and described with reference to FIGS. 44 and 45, and the detailed description thereof is omitted.

Next, with reference to the flow chart shown in FIG. 50, description will be made on the operation of the sales apparatus 1500 shown in FIG. 49. Steps S301 to S303 shown in FIG. 50 execute similar processes to those at Steps S201 to S203 shown in FIG. 46, and the detailed description thereof is omitted.

At Step S301, the display control section 1583 generates display data for displaying a screen containing advertisement information, by using the advertisement information supplied from the advertisement generation section 1582, and makes the display section 1504 display the screen.

At Step S302, the electrode change-over section 1584 sequentially selects one of the signal electrodes 1531 and connects the selected signal electrode to the communication control section 1585 in the downstream side. For example, it is assumed that the signal electrode 1531B-1 is selected. The electrode change-over section 1584 outputs the selection information to the operation judging section 1586, the selection information indicating which one of the signal electrodes 1531 is selected.

At Step S303, the communication control section 1585 generates a start command, and outputs the start command to the signal electrode 1531 (in this case, the selected signal electrode 1531B-1) via the electrode change-over section 1584. If there exists a finger or the like of the purchaser near the selected signal electrode 1531B-1, i.e., if there is a finger or the like near the content select button 1522-1, the start command is transmitted from the signal electrode 1531B-1 to the user device 1100 worn by the purchaser via the body of the purchaser, and the device ID is returned in response to the start command.

In accordance with whether the device ID is returned in a predetermined time, the communication control section 1585 judges whether communication with the user device 1100 is established. If the device ID is returned in the predetermined time and it is judged that the communication with the user device 1100 is established, the process advances to Step S304. If the device ID is not returned in the predetermined time and it is judged that the communication with the user device 1100 is not established, the process returns to Step S302 to repeat the succeeding Steps.

At Step S304, the operation judging section 1586 judges whether purchase selection of any content data is made, in accordance with the position of the signal electrode 1531 indicated by the selection information from the electrode change-over section 1584.

In this example, since the signal electrode 1531B-1, i.e., the content operation button 1522-1 for selecting purchase of the content data of "☐ newspaper", is selected, the operation judging section 1586 judges that content purchase is selected, and in accordance with the selection information from the electrode change-over section 1584, identifies the content data (i.e., content of "☐ newspaper") selected by the purchaser, stores the identified content data in correspondence with the device ID, and notifies the content data to the advertisement generation section 1582. Information on the identified content data is overwritten when other content data or another product is selected and identified.

At Step S305, the advertisement generation section 1582 extracts the headline information from the selected content data, generates the advertisement information, and supplies the generated advertisement information to the display control section 1583. By using the advertisement information supplied from the advertisement generation section 1582, the display control section 1583 generates the display data to display the advertisement information of the selected content data on the display section 1504.

If it is judged at Step S304 that purchase of content data is not selected, the process advances to Step S306.

At Step S306, in accordance with the position of the signal electrode 1531 indicated by the selection information from the electrode change-over section 1584, the operation judging section 1586 judges as to purchase of which product is selected.

For example, if the signal electrode 1531A-1, i.e., the merchandise selection button 1521-1 for purchasing the product 1511-1, is selected, the operation judging section 1586 judges that product purchase is selected, in accordance with the selection information from the electrode change-over section 1584, identifies the product (i.e., product 1511-1) selected by the purchaser, stores the identified product in correspondence with the device ID, and notifies the product to the advertisement generation section 1582.

At Step S307, in accordance with the advertisement data of the selected product, the advertisement generation section 1582 generates advertisement information, and supplies the generated advertisement information to the display control section 1583. By using he advertisement information supplied from the advertisement generation section 1582, the display control section 1583 generates the display data and displays the advertisement of the selected product on the display section 1504.

If it is judged at Step S306 that product purchase is selected, the process advances to Step S308.

At Step S308, the operation judging section 1586 judges whether purchase is selected, in accordance with the position of the signal electrode 1531 indicated by the selection information from the electrode change-over section 1584.

Figure 51:
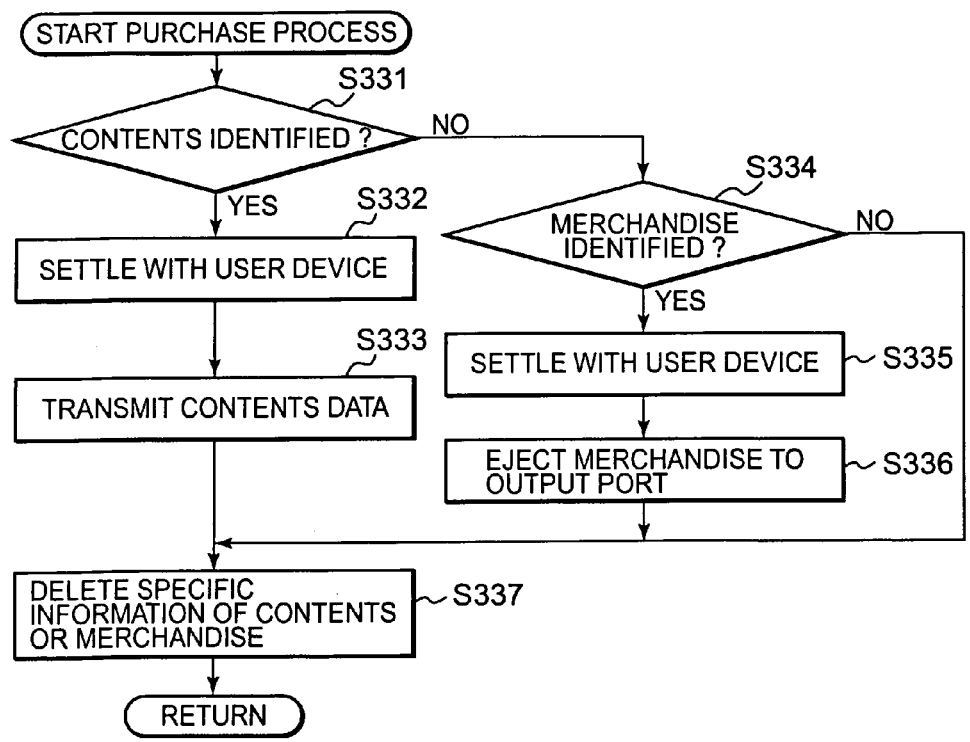
FIG. 51 is a flow chart illustrating a purchase process at Step S309 shown in FIG. 50.

For example, if the signal electrode 1531E, i.e., the purchase button 1711, is selected, the operation judging section 1586 judges that purchase is selected, and at Step S309 executes a purchase process. This purchase process will be described with reference to the flow chart shown in FIG. 51.

At Step S331, the operation judging section 1586 judges whether content data is identified. Namely, if the content data identified at the preceding process Step S304 is stored in correspondence with the device ID of the user device, the operation judging section 1586 judges that the content data is identified, and notifies the identified content data to the content managing section 1591.

At Step S332, the content managing section 1591 responds to the notice from the operation judging section 1586, and notifies a price of the content data to the settlement section 1588 to make the settlement section execute the settlement process. The settlement section 1588 executes the settlement process with the user device 1100 via the communication control section 1585.

At Step S333, the content managing section 1591 supplies the content data corresponding to the notice from the operation judging section 1586 to the merchandise output section 1589. The merchandise output section 1589 transmits the content data to the user device 1100 via the communication control section 1585.

If it is judged at Step S331 that content data is not identified, the process advances to Step S334.

At Step S334, the operation judging section 1586 judges whether a product is identified. Namely, if the product identified at the preceding process Step S306 is stored in correspondence with the device ID of the user device, the operation judging section 1586 judges that the product is identified, and notifies the identified product to the product managing section 1592.

At Step S335, the product managing section 1592 responds to the notice from the operation judging section 1586, and notifies the settlement section 1588 of a price of the product to make the settlement section execute the settlement process. In this case, the product managing section 1592 confirms the number of products in stock corresponding to the notice from the operation judging section 1586, and the settlement process is allowed to be executed, only when there are products in stock.

The settlement section 1588 executes the settlement process with the user device 1100 via the communication control section 1585.

At Step S336, the product managing section 1592 notifies the merchandise output section 1589 of the product corresponding to the notice from the operation judging section 1586. The merchandise output section 1589 ejects the product from an accommodation container (not shown in the figure) to the merchandise output port 1505.

After Step S333 or S336, the process advances to Step S337 whereat the operation judging section 1586 deletes information (i.e., identification information of content data or product) identifying the content data or product stored in correspondence with the device ID of the user device to make the identified content data or product unidentified and thereafter terminate the purchase process.

Figure 50:
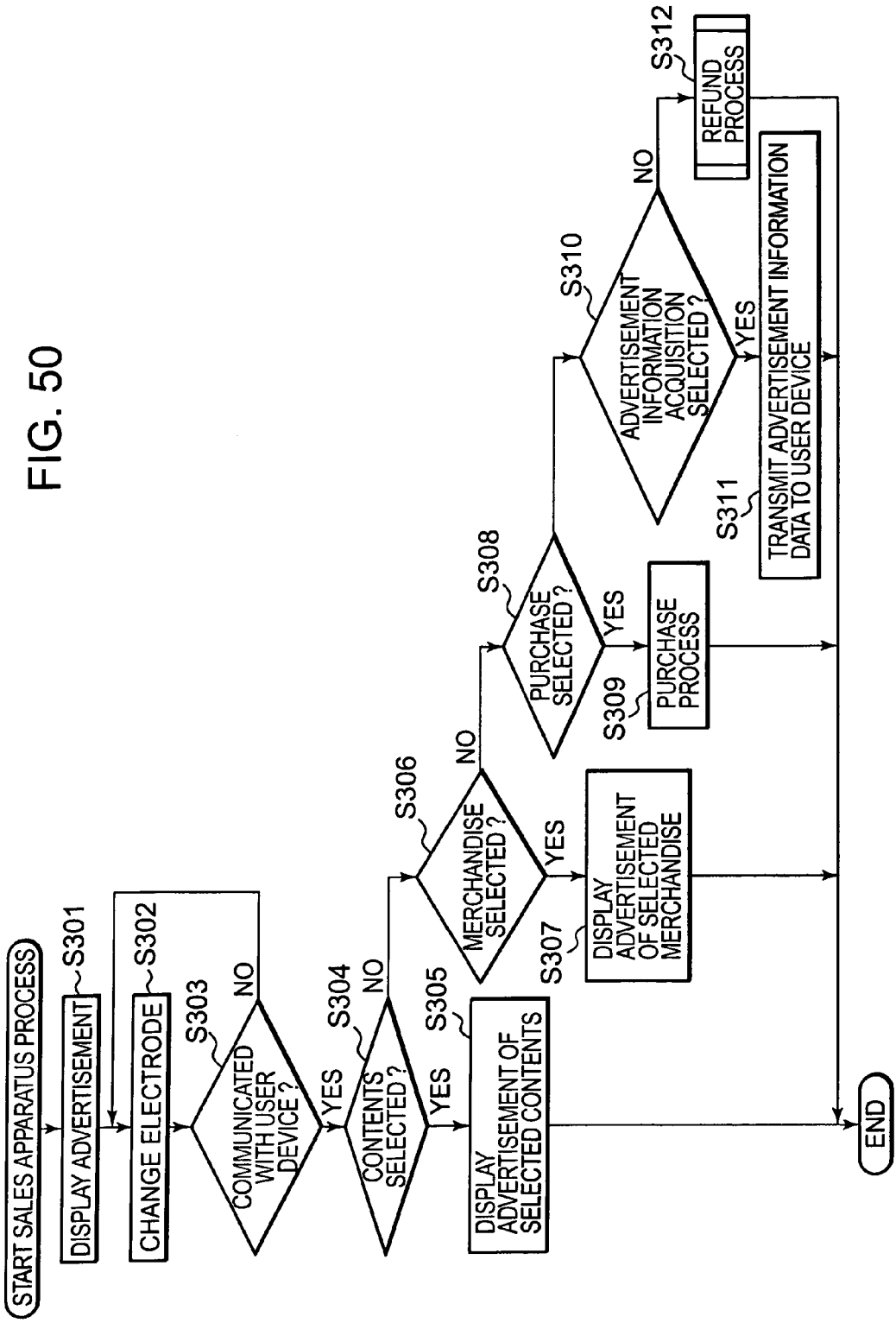
FIG. 50 is a flow chart illustrating the operation of the sales apparatus shown in FIG. 49.

Reverting to FIG. 50, if it is judged that purchase is selected, the process advances to Step S310.

At Step S310, in accordance with the position of the signal electrode 1531 indicated by the selection information from the electrode change-over section 1584, the operation judging section 1586 judges whether advertisement information acquisition is selected.

For example, if the signal electrode 1531D, i.e., the partial area of the display section 1504 capable of acquiring data of advertisement information, is selected, the operation judging section 1586 judges that advertisement information acquisition is selected, and in accordance with the selection information from the electrode change-over section 1584, notifies the advertisement generation section 1582 of providing advertisement information under display presently.

At Step S311, under the control by the operation judging section 1586, the advertisement generation section 1582 supplies data of the advertisement information under display presently to the user device 1100 via the communication control section 1585.

If it is judged at Step S310 that the advertisement information acquisition is not selected, the process advances to Step S312. Namely, purchase of the content data or product is not selected nor the advertisement information acquisition is selected, the operation judging section 1586 judges that purchase cancellation is selected, supplies the device ID of the user device 1100 to the settlement section 1588 to notify a refund request.

At Step S312, the settlement section 1588 executes the refund process for the content data. The refund process for the content data is basically similar to the refund process described with reference to FIG. 47, and the description thereof is omitted to avoid duplication.

In the refund process at Step S312, if the device ID from the operation judging section 1586 is held in the log, the content data stored in the user device 1100 is deleted, and the refund settlement is executed to return the payment for the content data.

As described above, the purchaser can view easily the advertisement since the advertisement of the selected content data or product is displayed by depressing or touching a desired button with a finger and selecting the desired content data or product. Sales quantities can therefore be improved because a purchase desire of the purchaser for merchandise (content data and products) is enhanced.

After the content data or product is selected, the purchase button is depressed or touched with a finer to select purchase of a desired content data or product and execute the purchase process. It is therefore possible to suppress an operation error to be caused by depressing an incorrect operation button.

In the sales apparatus 1500 shown in FIG. 49, the signal electrodes 1531A-1 to 1531A-3 are embedded in the merchandise selection buttons 1521-1 to 1521-3, and the signal electrodes 1531B-1 to 1531B-3 are embedded in the content selection buttons 1522-1 to 1522-3. Instead, the merchandise selection buttons 1521-1 to 1521-3 and content selection buttons 1522-1 to 1522-3 may be electrically connected directly to the operation judging section 1586 of the signal processing section 1551, without being embedding the signal electrode 1531.

In this case, for example, the merchandise selection buttons 1521-1 to 1521-3 and content selection buttons 1522-1 to 1522-3 continues to supply an operation signal corresponding to an operation by the purchaser to the operation judging section 1586 until the next button is depressed.

In accordance with an operation signal from one of the merchandise selection buttons 1521-1 to 1521-3 and content selection buttons 1522-1 to 1522-3, the operation judging section 1586 operates to display an advertisement of the selected content data or product. At Step S331 or S333 shown in FIG. 51, the operation judging section 1586 judges whether the content data or product is identified, from the operation signal from one of the merchandise selection buttons 1521-1 to 1521-3 and content selection buttons 1522-1 to 1522-3.

With this configuration, it is possible to reduce the number of signal electrodes 1531 to be embedded in the operation section 1503. It is therefore possible to manufacture the sales apparatus at a lower cost than the sales apparatus 1500 shown in FIG. 43.

In the above description, although the sales apparatus sells content data in addition to products such as juice heretofore sold. The products are not limited to only juice, but cigarettes, tickets and the like may also be sold. The present invention may be applied to a sales apparatus or vending machine for selling only content data. In this case, as different from the sales apparatus for selling both products and content data, an installation site capable of providing a power source is required to be newly set, and it requires a work for ensuring the installation site.

Similar to a juice sales apparatus of related art, the sales apparatus according to an embodiment of the present invention may provide lotteries. In this case, as different from a sales apparatus or vending machine of related art which gives a privilege of giving another bottle of juice when the lottery hits, a predetermined period and privilege information can be recorded in the user device 1100. For example, it is possible to give a privilege that another bottle of juice is given free of charge at the next time (in the predetermined period) at the same sales apparatus.

Namely, since the purchaser can have one bottle of juice free of charge at any desired time in the predetermined period, the purchaser can have a more beneficial privilege than having two bottles of juice at the same time.

In this specification, steps describing a program recorded in a recording medium contain not only a process to be executed time sequentially in the order of written statements but also a process to be executed parallel or independently without being processed time sequentially.

In this specification, a system is the whole apparatus constituted of a plurality of devices (apparatus). In the foregoing description, the structure described as one apparatus may be divided and constituted of a plurality of apparatus. Conversely, the structure described as a plurality of apparatus may be structured as one apparatus. The structure other than those described above may be added to the structure of each apparatus. If the structure and operation of the whole system is substantially the same, a portion of the structure of an apparatus may be contained in the structure of another apparatus.

The present invention contains subject matter related to Japanese Patent Applications JP 2005-144204 and JP 2005-363357 filed in the Japanese Patent Office on May 17 and Dec. 16, 2005, respectively, the entire content of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A sales method for use by a sales apparatus for selling content to a purchaser wearing a communication terminal, the sales method comprising:
communicating between the communication terminal and the sales apparatus using: dielectric material, including a human body, as a communication medium, and a communication signal transmission path without a physical reference point path;
detecting a content selection of the purchaser, the content being selected by depressing a content selection section of the sales apparatus, the content selection section being configured to allow the purchaser to select content for sale, and comprising a communication section configured to communicate with the communication terminal;
using a processor to identify the content selected by the purchaser;
executing a settlement process for the identified content, wherein the communication terminal communicates with the communication section of the content selection section via the purchaser's body while the purchaser is depressing the content selection section; and
supplying the communication terminal with data of the identified content selected by the purchaser via the communication section and the body of the purchaser depressing the content selection section.

2. A program stored on a computer readable medium, and configured to sell content to a purchaser wearing a communication terminal, the program causing a computer comprising a processor to perform a method comprising:
communicating between the communication terminal and the processor using:
dielectric material, including a human body, as a communication medium, and a communication signal transmission path without a physical reference point path;
detecting a content selection of the purchaser, the content being selected by depressing a content selection section configured to allow the purchaser to select content for sale, the content selection section comprising a communication section configured to communicate with the communication terminal;
using the processor to identify the content selected by the purchaser;
executing a settlement process for the identified content, wherein the communication terminal communicates with the communication section of the content selection section via the purchaser's body while the purchaser is depressing the content selection section; and
supplying the communication terminal with data of the identified content selected by the purchaser via the communication section and the body of the purchaser depressing the content selection section.

3. A sales apparatus for selling content to a purchaser wearing a communication terminal, the apparatus comprising:
a processor comprising:
a content selection section configured to allow the purchaser to select content for sale;
a communication section provided for in the content selection section configured to communicate with the communication terminal using: dielectric material, including a human body, as a communication medium, and a communication signal transmission path without a physical reference point path;
a detection section configured to detect a content selection operation of the purchaser;
an identifying section configured to identify content selected by the purchaser;
a settlement section configured to execute a settlement process for the identified content, wherein the communication terminal communicates with the communication section of the content selection section via the purchaser's body while the purchaser is depressing the content selection section; and
a supply section configured to supply the communication terminal with data of the content selected by the purchaser and identified by the identifying section via the communication section and the body of the purchaser while purchaser is depressing the content selection section,
wherein the content selection section includes a display section configured to display an image corresponding to the selectable content.

4. The processor according to claim 3, wherein:
the communication section is stacked on the display section;
the detection section detects a selection operation of the purchaser, while the purchaser is pointing to the image of the selected content in the display section;
the settlement section executes the settlement process for the content with the communication terminal via the communication section and the human body of the purchaser, while the purchaser is pointing to the image of the selected content; and
the supply section supplies the communication terminal with the data of the selected content, via the communication section and the human body of the purchaser while the purchaser is pointing to the image of the selected content.

5. The processor according to claim 3, further comprising:
a merchandise selection section configured to allow the purchaser to select merchandise for sale, wherein
the detection section is configured to detect a merchandise selection operation of the purchaser, the merchandise being selected by depressing of the merchandise selection section;
a second communication section is provided in the merchandise selection section;
the identifying section identifies the merchandise selected by the purchaser; and
the settlement section executes the settlement process for the identified merchandise, wherein the communication terminal communicates with the second communication section of the merchandise selection section via the body of the purchaser while purchaser is depressing the merchandise selection section.

6. The processor according to claim 3, further comprising:
a cancel selection section configured to cancel a content purchase made by the purchaser, and a data delete section configured to delete data of the content stored in the communication terminal via the communication section and the body of the purchaser, while the purchaser is depressing the cancel selection section, wherein:

the detection section is configured to detect a cancel selection operation of the purchaser, the content being canceled being selected by depressing the cancel selection section;

a second communication section is provided in the cancel selection section;

the identifying section identifies the content of the canceled purchase selected by the purchaser;

the data delete section is configured to delete data of the content identified by the identifying section from the communication terminal via the communication terminal and the body of the purchaser, while the purchaser is depressing the cancel selection section; and the settlement section executes the settlement process for the canceled content, wherein the communication terminal communicates with the second communication section of the cancel selection section via the body of the purchaser while the purchaser is depressing the cancel selection section.

7. The processor according to claim 3, further comprising:
an advertisement display section configured to display an advertisement corresponding to the selectable content; and
a storage section configured to store data of the selectable content.

8. The processor according to claim 7, further comprising:
an advertisement data supply section configured to supply data of the advertisement to the advertisement display section, by using data of the content stored in the storage section, wherein:
the advertisement display section displays the advertisement corresponding to the content, in accordance with the advertisement data supplied from the advertisement data supply section.

9. The processor according to claim 8, wherein:
the advertisement data supply section changes the advertisement data in accordance with preference information acquired from the communication terminal and supplies the changed advertisement data to the advertisement display section via the communication section and the body of the purchaser while the purchaser is depressing the content selection section.

10. The processor according to claim 8, wherein:
the advertisement data supply section acquires the advertisement data from the selectable content stored in the storage section, and supplies the advertisement data to the advertisement display section.

11. The processor according to claim 8, wherein:
the advertisement data supply section extracts predetermined data from the selectable content data stored in the storage section, generates advertisement data, and supplies the generated advertisement data to the advertisement display section.

* * * * *